United States Patent
Yoo et al.

(10) Patent No.: US 12,493,041 B2
(45) Date of Patent: Dec. 9, 2025

(54) APPARATUS FOR DIAGNOSING SOLID CANCERS AND METHOD FOR PROVIDING INFORMATION ON SOLID CANCER DIAGNOSIS

(71) Applicant: InnoBation Bio Co., Ltd., Seoul (KR)

(72) Inventors: Byong Chul Yoo, Goyang-si (KR); Kyung Hee Kim, Seoul (KR); Sang Jae Park, Goyang-si (KR); Sang Myung Woo, Seoul (KR); Young Ju Lee, Seoul (KR); Jun Hwa Lee, Goyang-si (KR); Beom Kyu Choi, Paju-si (KR)

(73) Assignee: InnoBation Bio Co., Ltd., Seoul (KR)

( * ) Notice: Subject to any disclaimer, the term of this patent is extended or adjusted under 35 U.S.C. 154(b) by 1105 days.

(21) Appl. No.: 17/615,506

(22) PCT Filed: Mar. 6, 2020

(86) PCT No.: PCT/KR2020/003158
§ 371 (c)(1),
(2) Date: Nov. 30, 2021

(87) PCT Pub. No.: WO2020/204373
PCT Pub. Date: Oct. 8, 2020

(65) Prior Publication Data
US 2022/0349895 A1 Nov. 3, 2022

(30) Foreign Application Priority Data

Apr. 1, 2019 (KR) .......................... 10-2019-0037756
Feb. 28, 2020 (KR) .......................... 10-2020-0024845

(51) Int. Cl.
*G01N 33/68* (2006.01)
*G01N 30/72* (2006.01)
*G01N 30/88* (2006.01)

(52) U.S. Cl.
CPC ..... *G01N 33/6803* (2013.01); *G01N 30/7233* (2013.01); *G01N 2030/8822* (2013.01)

(58) Field of Classification Search
None
See application file for complete search history.

(56) References Cited

U.S. PATENT DOCUMENTS

| | | | | |
|---|---|---|---|---|
| 11,698,361 B1 * | 7/2023 | Tuytten | .................. | G01N 33/82 |
| | | | | 436/65 |
| 2007/0259445 A1 * | 11/2007 | Cerda | ..................... | G01N 33/74 |
| | | | | 436/173 |
| 2015/0053852 A1 | 2/2015 | Jung et al. | | |
| 2015/0065366 A1 | 3/2015 | McDunn et al. | | |
| 2015/0310169 A1 * | 10/2015 | Loda | ....................... | G16H 50/30 |
| | | | | 702/19 |
| 2016/0266128 A1 * | 9/2016 | Kim | .................. | G01N 33/6815 |
| 2018/0156774 A1 | 6/2018 | Jung et al. | | |
| 2020/0173996 A1 | 6/2020 | Yoo et al. | | |

FOREIGN PATENT DOCUMENTS

| | | | |
|---|---|---|---|
| CN | 108107134 A | * 6/2018 | ............. G01N 30/02 |
| KR | 10-1462206 B1 | 11/2014 | |
| KR | 10-2015-0021651 A | 3/2015 | |
| KR | 10-2018-0035062 A | 4/2018 | |
| KR | 10-2018-0064164 A | 6/2018 | |

OTHER PUBLICATIONS

CN 108107134 Patent application English Translation 2018.*
International Search Report issued for International Application No. PCT/KR2020/003158 on Sep. 1, 2020, 5 pages.

* cited by examiner

*Primary Examiner* — Changhwa J Cheu
(74) *Attorney, Agent, or Firm* — ROTHWELL, FIGG, ERNST & MANBECK, P.C.

(57) ABSTRACT

The present invention relates to an apparatus for diagnosing solid cancers comprising lung cancer, pancreatic cancer, bile duct cancer, colorectal cancer, breast cancer, gastric cancer, brain tumors, kidney cancer, liver cancer, and cervical cancer. More specifically, the apparatus comprises: a concentration measurement unit for measuring the concentration of each of acyl-carnitine (AC), nudifloramide (2PY), and lysophosphatidylcholine (LPC) from a biological sample; a pre-processing unit for pre-processing the measured concentrations; and a diagnosis unit for determining the diagnosis information of cancer through linear discriminant analysis using the pre-processed concentrations.

5 Claims, 3 Drawing Sheets

[FIG. 1]
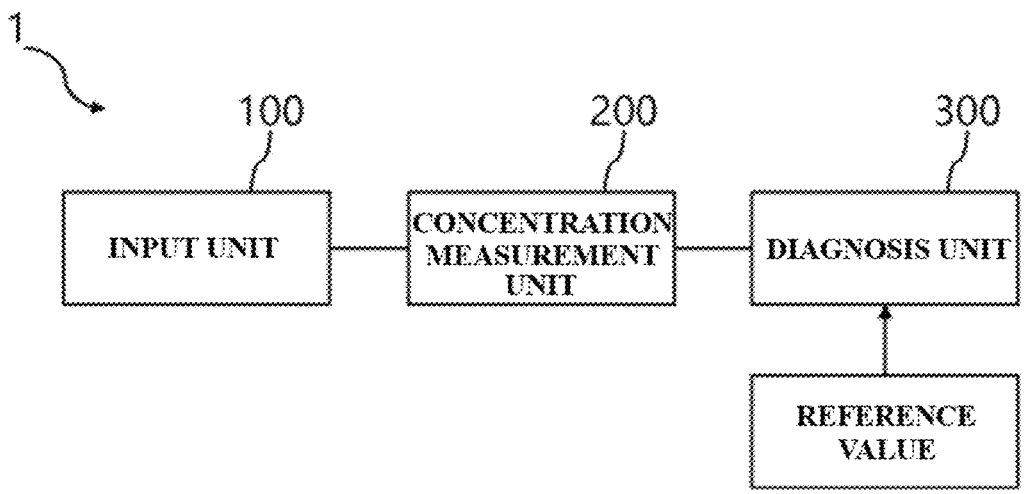
[FIG. 2]
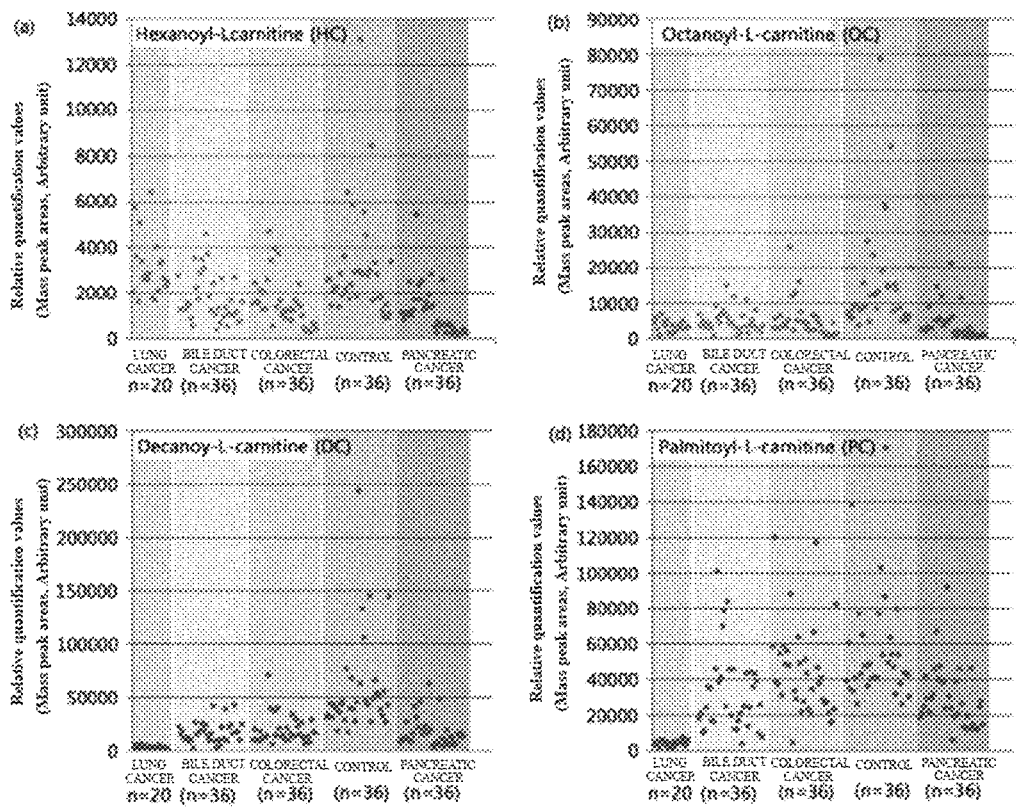

[FIG. 3]
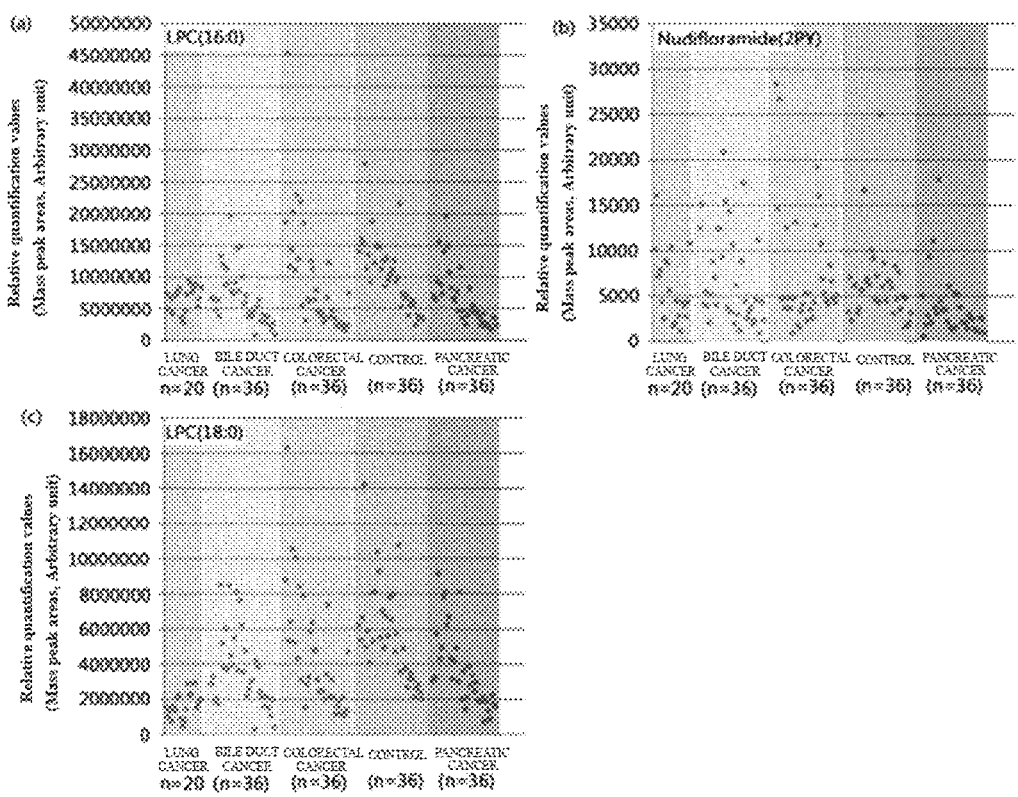

[FIG. 4]
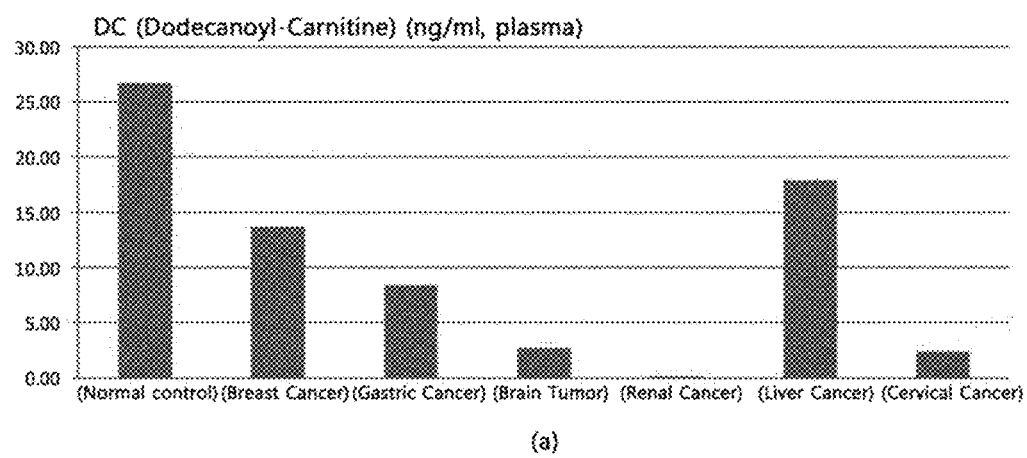
(a)
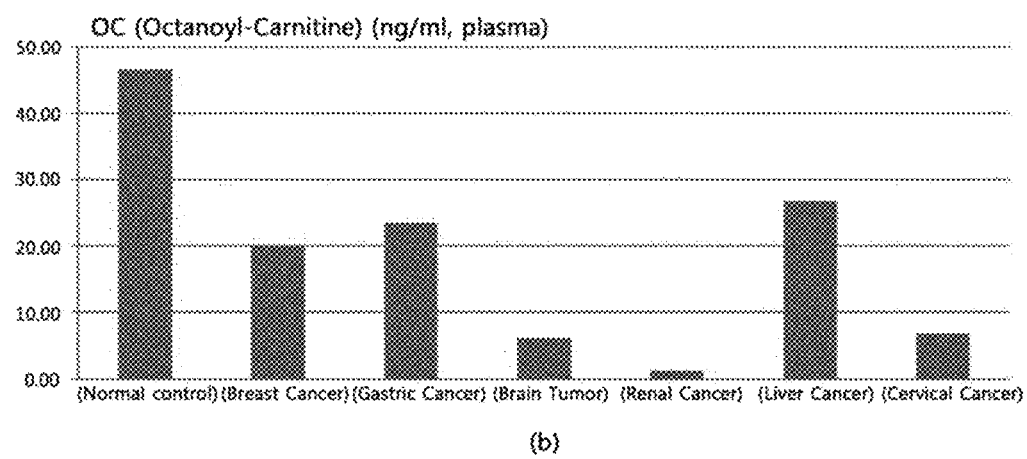
(b)

APPARATUS FOR DIAGNOSING SOLID CANCERS AND METHOD FOR PROVIDING INFORMATION ON SOLID CANCER DIAGNOSIS

The present application is a National Phase Entry from PCT/KR2020/003158, filed Mar. 6, 2020 and designating the United States, which claims priority to Korean Patent Application No. 10-2019-0037756, filed on Apr. 1, 2019, and Korean Patent Application No, 10-2020-0024845, filed on Feb. 28, 2020, all disclosures of which are incorporated herein by reference in their entirety.

TECHNICAL FIELD

The present invention relates to an apparatus for diagnosing solid cancers and a method of providing information for the diagnosis of solid cancers, and more particularly, to an apparatus for diagnosing solid cancers including lung cancer, pancreatic cancer, bile duct cancer, colorectal cancer, breast cancer, gastric cancer, brain tumors, renal cancer, liver cancer and cervical cancer, and a method of providing information for the diagnosis of solid cancers including lung cancer, pancreatic cancer, bile duct cancer, colorectal cancer, breast cancer, gastric cancer, brain tumors, renal cancer, liver cancer and cervical cancer.

BACKGROUND OF THE INVENTION

Cancer is a disease in which cells proliferate indefinitely and disturb normal cell function, and representative examples of cancer include lung cancer, gastric cancer, breast cancer, colorectal cancer and ovarian cancer, which may substantially occur in any tissue.

Early cancer diagnosis was based on external changes in living tissue according to the growth of cancer cells, but recently, diagnosis has been attempted using the detection of trace amounts of biomolecules present in tissue or cells of a living organism, for example, blood, a sugar chain, or DNA. However, the most commonly used cancer diagnosis method is diagnosis using a tissue sample obtained by biopsy, or images.

Among the diagnosis methods, biopsy has disadvantages of causing great pain to a patient, being expensive, and also taking a long time to diagnose. In addition, when a patient actually has cancer, there is a risk of cancer metastasis during biopsy, and in the case of a site from which a tissue sample cannot be obtained through biopsy, it is impossible to diagnose a disease before the removal of suspect tissue through a surgical operation.

BRIEF SUMMARY OF THE INVENTION

Technical Problem

The present invention is directed to providing an apparatus for diagnosing solid cancers including lung cancer, pancreatic cancer, bile duct cancer, colorectal cancer, breast cancer, gastric cancer, brain tumors, renal cancer, liver cancer and cervical cancer with a short analysis time and high accuracy, and a method of providing information for the diagnosis of solid cancers including lung cancer, pancreatic cancer, bile duct cancer, colorectal cancer, breast cancer, gastric cancer, brain tumors, renal cancer, liver cancer and cervical cancer.

Technical Solution

In one aspect, the present invention provides an apparatus for diagnosing solid cancers, which includes a concentration measurement unit for measuring the concentration of each of acyl-carnitine (AC), nudifloramide (2PY) and lysophosphatidylcholine (LPC) from a biological sample; a pre-processing unit for pre-processing the measured concentrations; and a diagnosis unit for determining the information for cancer diagnosis by linear discriminant analysis (LDA) using the pre-processed concentrations.

The acyl-carnitine (AC) includes at least one of dodecanoyl-L-carnitine (DC), hexanoyl-L-carnitine (HC), octanoyl-L-carnitine (OC) and palmitoyl-L-carnitine (PC), the lysophosphatidylcholine (LPC) includes any one of lysophosphatidylcholine 16:0 (LPC16) and lysophosphatidylcholine 18:0 (LPC18), the diagnosis unit operates based on at least one concentration of DC, HC, OC, PC, 2PY, LPC16 and LPC18, and the concentration is a mass peak area. The apparatus may include a determination unit for determining the information for cancer diagnosis by LDA with the mass peak area.

The diagnosis unit may determine information for cancer diagnosis by an arithmetic operation using the pre-processed concentration.

The concentrations are obtained by liquid chromatography-mass spectrometry (LC-MS), and an instrument for mass spectrometry used herein may be any one of Triple TOF, Triple Quadrupole, and MALDI TOF capable of measuring quantity.

Here, the cancer may be any one of solid cancers such as lung cancer, pancreatic cancer, bile duct cancer, colorectal cancer, breast cancer, gastric cancer, brain tumors, renal cancer, liver cancer and cervical cancer.

In another aspect, the present invention provides an apparatus for diagnosing solid cancers, which includes: a concentration measurement unit for measuring a DC concentration from a biological sample; a pre-processing unit for pre-processing the measured concentration; and a diagnosis unit for determining information for cancer diagnosis by linear discriminant analysis (LDA) using the pre-processed concentration.

All measured concentrations including the measured concentration of DC and the concentrations of HC, OC and PC may be used, and all measured concentrations including the measured concentration of DC and further including the concentrations of HC, OC, PC, 2PY, LPC16 and LPC may be used.

The diagnosis unit operates based on the DC, HC, OC and PC concentrations, and based on the DC, HC, OC, PC, 2PY, LPC16 and LPC18 concentrations, and the concentration is a mass peak area. The apparatus may further include a determination unit for determining information for cancer diagnosis using the mass peak area.

The diagnosis unit may determine cancer diagnosis information by an arithmetic operation using the pre-processed concentration.

The concentration is obtained by liquid chromatography-mass spectrometry (LC-MS), and an instrument for mass spectrometry used herein may be any one of Triple TOF, Triple Quadrupole and MALDI TOF capable of measuring quantity.

The cancer may be any one of solid cancers including lung cancer, pancreatic cancer, bile duct cancer, colorectal cancer, breast cancer, gastric cancer, brain tumors, renal cancer, liver cancer and cervical cancer.

In still another aspect, the present invention may provide a method of providing information for cancer diagnosis through LDA with at least one of AC, 2PY and LPC concentrations from a biological sample.

The AC includes at least one of DC, HC, OC and PC, and the LPC may include any one of LPC16 and LPC18.

The concentration may be obtained by mass-spectrometry of a biological sample with a mass peak area, and the concentration may be obtained using LC-MS, and an instrument for mass spectrometry used herein may be any one of Triple TOF, Triple Quadrupole and MALDI TOF capable of measuring quantity.

The cancer may be any one of solid cancers including lung cancer, pancreatic cancer, bile duct cancer, colorectal cancer, breast cancer, gastric cancer, brain tumors, renal cancer, liver cancer and cervical cancer.

In yet another aspect, the present invention may provide a method of diagnosing solid cancers, which includes: obtaining a concentration of each of DC, HC, OC, PC, 2PY, LPC16 and LPC18 from a biological sample; pre-processing the measured concentration; and diagnosing cancer based on a LDA result obtained with the pre-processed DC concentration, a LDA result obtained with the pre-processed DC, HC, OC and PC concentrations, and a LDA result obtained with the pre-processed DC, HC, OC, PC, 2PY, LPC16 and LPC18 concentrations.

Advantageous Effects

The present invention provides an apparatus for diagnosing solid cancers including lung cancer, pancreatic cancer, bile duct cancer, colorectal cancer, breast cancer, gastric cancer, brain tumors, renal cancer, liver cancer and cervical cancer with a short analysis time and high accuracy, and a method of providing information for the diagnosis of solid cancers including lung cancer, pancreatic cancer, bile duct cancer, colorectal cancer, breast cancer, gastric cancer, brain tumors, renal cancer, liver cancer and cervical cancer.

BRIEF DESCRIPTION OF DRAWINGS

FIG. 1 is a block diagram of a cancer diagnosis apparatus according to an embodiment of the present invention.

FIG. 2 shows the relative quantification values (mass peak areas) of four types of ACs in blood from cancer patient groups and a normal control.

FIG. 3 shows the relative quantification values of LPC16, LPC18 and 2PY in blood from cancer patient groups and a normal control.

FIG. 4 shows the absolute quantification values of DC and OC in sera from cancer patient groups and a normal control.

DETAILED DESCRIPTIONS OF THE INVENTION

Hereinafter, detailed description for carrying out the present invent ion will be described based on embodiments with reference to the drawings. These embodiments will be sufficiently described in detail to implement the present invention by those of ordinary skill in the art. It should be understood that various embodiments of the present invention are different but not mutually exclusive. For example, in relation to one embodiment, specific shapes, structures and characteristics described herein may be implemented as another embodiment without departing the spirit and scope of the present invention. In addition, it should be understood that the location or arrangement of individual components in a disclosed embodiment may be changed without departing from the spirit and scope of the present invention. Accordingly, detailed description below will not be limitative, and the scope of the present invention, if properly described, is merely limited by the accompanying claims as well as any scope equivalent to that claimed by the claims. Like reference numerals in the drawings refer to the same or similar functions throughout various aspects.

Unless defined otherwise, all terms (including technical and scientific terms) used herein may be used in a sense that is commonly understood by one of ordinary skill in the art to which the present invention belongs. Also, generally used predefined terms are not ideally or excessively interpreted unless explicitly defined otherwise.

Hereinafter, to easily implement the present invention by those of ordinary skill in the art to which the present invention belongs, the exemplary embodiments of the present invention will be described in detail with reference to the accompanying drawings.

The "biological sample" used herein includes samples such as whole blood, serum, plasma, urine, stool, sputum, saliva, tissue, cells, a cell extract and an in vitro cell culture, but the present invention is not limited thereto. In the following embodiment, sera from cancer patient groups and a normal control were used as biological samples.

The present invention is based on the finding of acyl-carnitine (AC) as an effective marker for solid cancers including lung cancer, pancreatic cancer, bile duct cancer, colorectal cancer, breast cancer, gastric cancer, brain tumors, renal cancer, liver cancer and cervical cancer.

Here, the solid cancer of the present invention may include cervical cancer, esophageal cancer, colon cancer, gastric cancer, hepatocellular carcinoma or breast cancer, which is determined as a solid cancer.

The AC includes at least one of dodecanoyl-L-carnitine (DC), hexanoyl-L-carnitine (HC), octanoyl-L-carnitine (OC) and palmitoyl-L-carnitine (PC).

In addition, the present invention is based on the finding of nudifloramide, (2PY) as an effective marker for solid cancers including lung cancer, pancreatic cancer, bile duct cancer and colorectal cancer.

The official name of 2PY is N-methyl-2-pyridoxone-5-carboxamide (1,6-dihydro-1-methyl-6-oxonicotinamide; 3-carbamoyl-1-methyl-6-pyridone), and its structural formula is as follows.

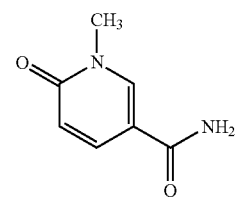

The present invention is based on the finding of lysophosphatidylcholine (LPC) as an effective marker for solid cancers including lung cancer, pancreatic cancer, bile duct cancer or colorectal cancer.

The LPC includes any one of lysophosphatidylcholine 16:0 (LPC16) and lysophosphatidylcholine 18:0 (LPC18).

Four types of ACs (DC, HC, OC and PC) and two types of LPCs (LPC16 and LPC18) were generally observed at low concentrations in patients with solid cancers including lung cancer, pancreatic cancer, bile duct cancer and colorectal cancer, compared with a normal control (FIGS. 2 and 3). 2PY was observed at high concentrations in some bile duct cancer and colorectal cancer patients (FIG. 3).

In addition, DC and OC were generally observed at low concentrations in patients with solid cancers including breast cancer, gastric cancer, brain tumors, renal cancer, liver cancer and cervical cancer, compared with a normal control (FIG. 4).

In the present invention, based on the concentrations of the seven markers, solid cancers including lung cancer, pancreatic cancer, bile duct cancer, colorectal cancer, breast cancer, gastric cancer, brain tumors, renal cancer, liver cancer and cervical cancer are diagnosed, but the present invention is not limited thereto. Here, the concentrations may be measured using mass peak areas by mass spectrometry.

More specifically, the concentrations may be measured by liquid chromatography-mass spectrometry (LC-MS), and an instrument for mass spectrometry used herein may be any one of Triple TOF, Triple Quadrupole and MALDI TOF capable of measuring quantity.

In one embodiment of the present invention, using the concentrations of the 7 markers, solid cancers including lung cancer, pancreatic cancer, bile duct cancer, colorectal cancer, breast cancer, gastric cancer, brain tumors, renal cancer, liver cancer and cervical cancer may be diagnosed. At least one of the concentrations of the four types of ACs, 2PY and the two types of LPCs may be used.

Among the four types of ACs, the measured concentration of DC may be used.

In addition, the measured concentrations of the four types of ACs such as DC, HC, OC and PC are used, and all concentrations including the measured concentrations of 2PY, LPC16 and LPC18 as well as the measured concentrations of the DC, HC, OC and PC may be used.

Solid cancers including lung cancer, pancreatic cancer, bile duct cancer, colorectal cancer, breast cancer, gastric cancer, brain tumors, renal cancer, liver cancer and cervical cancer are diagnosed by LDA using some or all of the concentrations of the seven markers.

According to the present invention described above, solid cancers including lung cancer, pancreatic cancer, bile duct cancer, colorectal cancer, breast cancer, gastric cancer, brain tumors, renal cancer, liver cancer and cervical cancer may be diagnosed by measuring only the concentrations of markers and performing LDA. Therefore, the solid cancers including lung cancer, pancreatic cancer, bile duct cancer, colorectal cancer, breast cancer, gastric cancer, brain tumors, renal cancer, liver cancer and cervical cancer may be rapidly diagnosed.

Hereinafter, the present invention will be described in further detail with reference to the following drawings.

Since the accompanying drawings are merely examples shown to explain the technical idea of the present invention in further detail, the spirit of the present invention is not limited to the drawings containing the spirt of the present invention.

FIG. 1 shows an apparatus for diagnosing solid cancers including lung cancer, pancreatic cancer, bile duct cancer, colorectal cancer, breast cancer, gastric cancer, brain tumors, renal cancer, liver cancer and cervical cancer according to an embodiment of the present invention.

The apparatus 1 for diagnosing solid cancers includes a concentration measurement unit 100, a pre-processing unit 200 and a diagnosis unit 300.

In the concentration measurement unit IOU, mass spectrometry data detected from a biological sample is acquired. The mass spectrometry data may only include data for a marker, and the marker includes DC, and may also include at least one of HC, OC, PC, 2PY, LPC16 and LPC18.

The mass spectrometry data may be a concentration (mass peak area corresponding to a marker) of the marker.

The pre-processing unit 200 performs pre-processing required for the measured mass peak area.

In one embodiment, the logarithmic value of the mass peak area was acquired by pre-processing, and then the data was transferred to the diagnosis unit. In another embodiment, similarly, necessary pre-processing, such as multiplying the measured mass peak area by a suitable scaling factor for normalization, may be performed.

The diagnosis unit 300 determines whether solid cancers including lung cancer, pancreatic cancer, bile duct cancer, colorectal cancer, breast cancer, gastric cancer, brain tumors, renal cancer, liver cancer and cervical cancer are positive or negative through LDA using a concentration of the pre-processed marker. In this procedure, the diagnosis unit 300 may use a DC concentration alone, all of the concentrations of four types of ACs (DC, HC, OC and PC), or all of the concentrations of the 4 types of ACs (DC, HC, OC and PC) and the concentrations of 2PY, LPC16 and LPC18.

In addition, the diagnosis unit 300 may determine information for cancer diagnosis by an arithmetic operation using the concentration of the pre-processed marker.

More specifically, the diagnosis unit 300 may determine whether solid cancers including lung cancer, pancreatic cancer, bile duct cancer, colorectal cancer, breast cancer, gastric cancer, brain tumors, renal cancer, liver cancer and cervical cancer are positive or negative not only through LDA using the concentration of the pro-processed marker but also an arithmetic operation including addition, subtraction, multiplication and division. In this procedure, the diagnosis unit 300 may use a DC concentration alone, all of the concentrations of four types of ACs (DC, HC, OC and PC), or all of the concentrations of the 4 types of ACs (DC, HC, OC and PC) and the concentrations of 2PY, LPC16 and LPC 18.

In addition, the apparatus 1 for diagnosing solid cancers may further include an output unit, which may be a display device a printer.

The apparatus 1 for diagnosing solid cancers described above may be modified in various ways. For example, without necessary pre-processing, the pre-processing unit 200 may be omitted.

The present invention will be described in further detail with reference to the following examples. However, the drawings or examples presented in the specification may be modified in various ways by those of ordinary skill in the art and have various forms, and the description of the specification is not limited to a specific disclosed form, and should be regarded as including all equivalents or substitutes included in the spirit and technical scope of the present invention. In addition, the accompanying drawings are presented to help those of ordinary skill in the art more precisely understand the present invention, and may be exaggerated or reduced compared to those in reality.

EXAMPLES

Example 1. Diagnosis of Lung Cancer, Pancreatic Cancer, Bile Duct Cancer and Colorectal Cancer Collection of Serum Sera were acquired from 36 normal controls, 10 lung cancer patients, 36 bile duct cancer patients, 36 colorectal cancer patients and 36 pancreatic cancer patients.

Preparation for Concentration Measurement 0.95 ml of water and 2 ml of methanol and 0.9 ml of dichloromethane were added to 50 µl of serum and well mixed with shaking, and left on ice for 30 minutes. 1 ml of water and 0.9 ml of dichloromethane were added again and well mixed, and then subjected to centrifugation at room temperature for 10 minutes at 1,500 rpm. After centrifugation, the supernatant was isolated, and dried using nitrogen gas.

Measurement of Metabolite (Marker) Concentration

After the dried metabolite extract was dissolved in 0.1% formic acid, analysis was performed using liquid chromatography-mass spectrometry (LC-MS).

The LC instrument used herein was an Eksigent Ultra LC 110-XL system, and the MS instrument used herein was an AB Sciex Triple TOF 5600+ system. The MS instrument was equipped with a DuoSpray ion source.

First, an analyte was put into an analyzer through an Atlantis T3 Sentry Guard Cartridge (3 mm, 2.1 10 mm; Waters) connected to the Eksigent Ultra LC 110-XL system, and isolated in an Atlantis T3 column (3 mm, 2.1 100 mm; Waters).

As a solvent, a two-step linear gradient (solvent A, 0.1% FA in water; solvent B, 100% acetonitrile with 1% solvent B for 2 min, 1 to 30% B for 6 min, 30 to 90% B for 8 min, 90% B for 4 min, 90 to 1% B for 1 min and 9 min in 1% B) was used.

The MS instrument performed tandem mass spectrometry (MS/MS) of the 10 most frequent parent ions (mass tolerance, 50 mDa collision energy, 35%), along with one full scan (50 to 1,200 m/z range).

Among mass spectra at the same time zones as that at which metabolites corresponding to 4 types of ACs, 2PY and two types of LPCs pass through liquid chromatography, a mass peak area having the same mass value was calculated.

Analysis Result

FIG. 2 shows the relative quantification values (mass peak areas) of four types of ACs in blood from cancer patient groups and a normal control. The relative quantification values in blood of HC, OC, DC and PC were obtained using mass spectrometry.

It can be seen that the four types of ACs are present at generally lower amounts in blood from lung cancer, pancreatic cancer, bile duct cancer and colorectal cancer patient groups compared to the normal control.

In addition, it can be seen that, among the four types of ACs, OC and DC, compared to HC and PC, are present generally at lower amounts in blood from the lung cancer, pancreatic cancer, bile duct cancer and colorectal cancer patient groups.

FIG. 3 shows the relative quantification values of LPC16, LPC18 and 2PY in blood from cancer patient groups and a normal control. The relative quantification values of LPC16, LPC18 and 2PY in blood were also acquired using mass spectrometry.

It can be seen that LPC16 and LPC18 are present generally at lower amounts in blood from the lung cancer, pancreatic cancer, bile duct cancer, colorectal cancer patient groups, compared to the normal control, and 2PY is present at a high amount in blood of some of the bile duct cancer patients and colorectal cancer patients.

TABLE 1

|  |  | TRUE | |
|---|---|---|---|
|  |  | Control | Lung cancer |
| PREDICTED | Control | 36 | 0 |
|  | Lung cancer | 0 | 10 |
|  |  | 100.00% SPECIFICITY | 100.00% SENSITIVITY |
|  |  | TRUE | |
|  |  | Control | Bile duct cancer |
| PREDICTED | Control | 34 | 4 |
|  | Bile duct cancer | 2 | 32 |
|  |  | 94.44% SPECIFICITY | 88.89% SENSITIVITY |
|  |  | TRUE | |
|  |  | Control | Colorectal cancer |
| PREDICTED | Control | 32 | 7 |
|  | Colorectal cancer | 4 | 29 |
|  |  | 88.89% SPECIFICITY | 80.56% SENSITIVITY |
|  |  | TRUE | |
|  |  | Control | Pancreatic cancer |
| PREDICTED | Control | 34 | 6 |
|  | Pancreatic cancer | 2 | 30 |
|  |  | 94.44% SPECIFICITY | 83.33% SENSITIVITY |

Table 1 shows the capability of screening by cancer type when LDA was performed only using the relative quantification value of DC in blood. For LDA, prior probability was considered as the ratio of the number of samples. Only using the relative quantity of DC in blood, the capability of screening by cancer type was very excellent, and it was able to be confirmed that, in the case of lung cancer, both sensitivity and specificity were measured to be 100%.

TABLE 2

|  |  | TRUE | |
|---|---|---|---|
|  |  | Control | Lung cancer |
| PREDICTED | Control | 36 | 0 |
|  | Lung cancer | 0 | 10 |
|  |  | 100.00% SPECIFICITY | 100.00% SENSITIVITY |
|  |  | TRUE | |
|  |  | Control | Bile duct cancer |
| PREDICTED | Control | 33 | 4 |
|  | Bile duct cancer | 3 | 32 |
|  |  | 91.67% SPECIFICITY | 88.89% SENSITIVITY |
|  |  | TRUE | |
|  |  | Control | Colorectal cancer |
| PREDICTED | Control | 34 | 7 |
|  | Colorectal cancer | 2 | 29 |
|  |  | 94.44% | 80.56% |

TABLE 2-continued

|  |  | SPECIFICITY | SENSITIVITY |
|---|---|---|---|
|  |  | TRUE | |
|  |  | Control | Pancreatic cancer |
| PREDICTED | Control | 34 | 5 |
|  | Pancreatic cancer | 2 | 31 |
|  |  | 94.44% SPECIFICITY | 86.11% SENSITIVITY |

Table 2 shows the capability of screening by cancer type when LDA was performed only using the relative quantification values of four types of ACs including DC. When all of the relative quantification values of the four types of ACs in blood were used, it was able to be confirmed that the capacity of screening pancreatic cancer was slightly increased.

TABLE 3

|  |  | TRUE | |
|---|---|---|---|
|  |  | Control | Lung cancer |
| PREDICTED | Control | 36 | 0 |
|  | Lung cancer | 0 | 10 |
|  |  | 100.00% SPECIFICITY | 100.00% SENSITIVITY |
|  |  | TRUE | |
|  |  | Control | Bile duct cancer |
| PREDICTED | Control | 35 | 2 |
|  | Bile duct cancer | 1 | 34 |

TABLE 3-continued

|  |  | 97.22% SPECIFICITY | 94.44% SENSITIVITY |
|---|---|---|---|
|  |  | TRUE | |
|  |  | Control | Colorectal cancer |
| PREDICTED | Control | 33 | 4 |
|  | Colorectal cancer | 3 | 32 |
|  |  | 91.67% SPECIFICITY | 88.89% SENSITIVITY |
|  |  | TRUE | |
|  |  | Control | Pancreatic cancer |
| PREDICTED | Control | 33 | 6 |
|  | Pancreatic cancer | 3 | 30 |
|  |  | 91.67% SPECIFICITY | 83.33% SENSITIVITY |

In Table 3, when all of the relative quantification values of the four types of AC, LPC1.6, LPC18 and 2PY in blood were used, the capability of screening for bile duct cancer and colorectal cancer was slightly increased.

In addition Table 4 below shows that the relative quantification values (mass peak areas) of HC in blood from cancer patient groups and a normal control, Table 5 below shows that the relative quantification values (mass peak areas) of OC in blood from cancer patient groups and a normal control, Table 6 below shows that the relative quantification values (mass peak areas) of DC in blood from cancer patient groups and a normal control, and Table 7 below shows the relative quantification values (mass peak areas) of PC in blood from cancer patient groups and a normal control, which is the data of FIG. 2.

TABLE 4

| Sample Index | Sample Name | Component Name | Area | Height | Retention Time | Width at 50% |
|---|---|---|---|---|---|---|
| 1 | Hu_Normal_Serum_1_4_10 ul | Hexanoyl-L-carnitine | 23090.83946 | 3615.360925 | 7.760525194 | 0.083050854 |
| 8 | HC + MeOH_1_4_10 ul | Hexanoyl-L-carnitine | 8053741.823 | 1126712.472 | 7.737390478 | 0.101477147 |
| 15 | HC + Serum_1_4_10 ul | Hexanoyl-L-carnitine | 10786688.21 | 1446986.445 | 7.743644729 | 0.107921371 |
| 22 | OC + MeOH_1_4_10 ul | Hexanoyl-L-carnitine | 2738.614421 | 454.392959 | 7.74485542 | 0.089958869 |
| 29 | OC + Serum_1_4_10 ul | Hexanoyl-L-carnitine | 3165.759513 | 516.4004404 | 7.740078871 | 0.08391711 |
| 36 | DC + MeOH_1_4_10 ul | Hexanoyl-L-carnitine | 6122.218192 | 1119.591214 | 7.761633893 | 0.083681503 |
| 43 | DC + Serum_1_4_10 ul | Hexanoyl-L-carnitine | 4059.60568 | 703.2450012 | 7.744043311 | 0.085157781 |
| 50 | PC + Serum_1_4_10 ul | Hexanoyl-L-carnitine | 1847.238278 | 254.4399482 | 7.748193397 | 0.093159708 |
| 57 | PC + Serum_sup_10 ul | Hexanoyl-L-carnitine | 5752.112495 | 893.0642907 | 7.742940282 | 0.076878106 |
| 64 | 2PY_0100 | Hexanoyl-L-carnitine | 26.50346388 | 8.00981365 | 7.597464338 | 0.057428032 |
| 71 | Serum + 2PY_0100 | Hexanoyl-L-carnitine | 1465.842482 | 433.7626607 | 7.879351008 | 0.051921585 |
| 78 | LPC16_0100 | Hexanoyl-L-carnitine | 43.68467926 | 9.808509583 | 7.52374907 | 0.063305044 |
| 85 | Serum + LPC16_0100 | Hexanoyl-L-carnitine | 1284.616483 | 300.6867673 | 7.888722352 | 0.066489568 |
| 92 | LPC18_0100 | Hexanoyl-L-carnitine | 37.20017994 | 14.20175423 | 7.538001218 | 0.044549896 |

TABLE 4-continued

| Index | Sample Name | Component Name | Area | Height | Retention Time | Width at 50% |
|---|---|---|---|---|---|---|
| 99 | Serum + LPC18_0100 | Hexanoyl-L-carnitine | 1370.937171 | 372.4969872 | 7.889777255 | 0.05668363 |
| 106 | 06-1(1_4) | Hexanoyl-L-carnitine | 2064.867337 | 265.331088 | 7.788357156 | 0.112703289 |
| 113 | 06-2(1_4) | Hexanoyl-L-carnitine | 5767.952382 | 705.8958152 | 7.782441106 | 0.105350443 |
| 120 | 07-1(1_4) | Hexanoyl-L-carnitine | 3628.217101 | 295.4369063 | 7.772283749 | 0.131284505 |
| 127 | 07-2(1_4) | Hexanoyl-L-carnitine | 1629.132594 | 191.9586524 | 7.776297842 | 0.137354704 |
| 134 | 08-1(1_4) | Hexanoyl-L-carnitine | 5099.867754 | 606.0443752 | 7.776949746 | 0.102686004 |
| 141 | 08-2(1_4) | Hexanoyl-L-carnitine | 3418.736953 | 390.6117418 | 7.778417997 | 0.111281648 |
| 148 | 09-1(1_4) | Hexanoyl-L-carnitine | 2618.546827 | 257.3377818 | 7.763377997 | 0.120874637 |
| 155 | 09-2(1_4) | Hexanoyl-L-carnitine | 2772.406414 | 302.8478227 | 7.767827533 | 0.120764197 |
| 162 | 10-1(1_4) | Hexanoyl-L-carnitine | 2591.615878 | 233.3254149 | 7.759230096 | 0.181951932 |
| 169 | 10-2(1_4) | Hexanoyl-L-carnitine | 2859.182583 | 203.5884754 | 7.750615125 | 0.216180181 |
| 176 | 11-1(1_4) | Hexanoyl-L-carnitine | 6428.198738 | 572.5205002 | 7.757089546 | 0.120497812 |
| 183 | 11-2(1_4) | Hexanoyl-L-carnitine | 1798.948728 | 171.3576612 | 7.756075891 | 0.131342644 |
| 190 | 12-1(1_4) | Hexanoyl-L-carnitine | 1710.127321 | 194.7083905 | 7.75127873 | 0.123627829 |
| 197 | 12-2(1_4) | Hexanoyl-L-carnitine | 4029.103225 | 341.4539615 | 7.760227306 | 0.113671644 |
| 204 | 13-1(1_4) | Hexanoyl-L-carnitine | 2105.829352 | 287.5800263 | 7.755615824 | 0.09914843 |
| 211 | 13-2(1_4) | Hexanoyl-L-carnitine | 3306.02068 | 344.1284638 | 7.752353068 | 0.115509783 |
| 218 | 14-1(1_4) | Hexanoyl-L-carnitine | 3400.518211 | 413.0395723 | 7.754946081 | 0.104215053 |
| 225 | 14-2(1_4) | Hexanoyl-L-carnitine | 2654.789788 | 362.5715013 | 7.749466775 | 0.099329594 |
| 232 | 15-1(1_4) | Hexanoyl-L-carnitine | 2311.383247 | 257.5313207 | 7.738272223 | 0.110760655 |
| 239 | 15-2(1_4) | Hexanoyl-L-carnitine | 2501.686064 | 272.5914235 | 7.737078618 | 0.107650743 |
| 246 | BDC01 | Hexanoyl-L-carnitine | 2761.012375 | 415.9017213 | 7.764640031 | 0.093626377 |
| 253 | BDC02 | Hexanoyl-L-carnitine | 1282.08251 | 166.2348574 | 7.76168662 | 0.113357574 |
| 260 | BDC03 | Hexanoyl-L-carnitine | 1310.181695 | 157.9658094 | 7.753138895 | 0.109197042 |
| 267 | BDC04 | Hexanoyl-L-carnitine | 1306.45445 | 182.2535564 | 7.752735528 | 0.100353605 |
| 274 | BDC05 | Hexanoyl-L-carnitine | 1289.005744 | 176.9282369 | 7.757295589 | 0.103549924 |
| 281 | BDC06 | Hexanoyl-L-carnitine | 1570.997585 | 164.1181037 | 7.755999979 | 0.106769635 |
| 288 | BDC07 | Hexanoyl-L-carnitine | 1459.619815 | 217.105954 | 7.763156655 | 0.094724984 |
| 295 | BDC08 | Hexanoyl-L-carnitine | 888.7414514 | 111.8264433 | 7.755009676 | 0.127218907 |
| 302 | BDC09 | Hexanoyl-L-carnitine | 573.6602793 | 84.64307179 | 7.746540694 | 0.1104795 |
| 309 | BDC10 | Hexanoyl-L-carnitine | 3532.22551 | 545.4519505 | 7.76966459 | 0.096838768 |
| 316 | BDC11 | Hexanoyl-L-carnitine | 2232.183198 | 356.0692048 | 7.768349336 | 0.089656847 |
| 323 | BDC12 | Hexanoyl-L-carnitine | 1761.519957 | 320.6942702 | 7.771790794 | 0.087469093 |
| 330 | BDC13 | Hexanoyl-L-carnitine | 2894.627019 | 487.1058638 | 7.762412586 | 0.093590079 |
| 337 | BDC14 | Hexanoyl-L-carnitine | 3491.347829 | 624.8794771 | 7.765607502 | 0.084612798 |
| 344 | BDC15 | Hexanoyl-L-carnitine | 3098.188901 | 530.0647262 | 7.768540037 | 0.090640449 |
| 351 | BDC16 | Hexanoyl-L-carnitine | 4602.571395 | 794.8796491 | 7.771130622 | 0.093211866 |
| 358 | BDC17 | Hexanoyl-L-carnitine | 3716.251855 | 620.0427247 | 7.765874131 | 0.089114984 |

TABLE 4-continued

| Index | Sample Name | Component Name | Area | Height | Retention Time | Width at 50% |
|---|---|---|---|---|---|---|
| 365 | BDC18 | Hexanoyl-L-carnitine | 1854.836893 | 357.3627844 | 7.770945002 | 0.07935352 |
| 372 | BDC19 | Hexanoyl-L-carnitine | 1262.216699 | 188.3487898 | 7.770878348 | 0.096493231 |
| 379 | BDC20 | Hexanoyl-L-carnitine | 2445.963396 | 368.5349269 | 7.772709078 | 0.090555089 |
| 386 | BDC21 | Hexanoyl-L-carnitine | 1093.962992 | 153.7734893 | 7.774236598 | 0.100479205 |
| 393 | BDC22 | Hexanoyl-L-carnitine | 389.3944888 | 66.02782874 | 7.747910748 | 0.093772181 |
| 400 | BDC23 | Hexanoyl-L-carnitine | 1337.538669 | 214.9122971 | 7.768712668 | 0.094741657 |
| 407 | BDC24 | Hexanoyl-L-carnitine | 698.5295299 | 98.06756537 | 7.758531421 | 0.100641846 |
| 414 | BDC25 | Hexanoyl-L-carnitine | 2642.596359 | 422.7360082 | 7.772510774 | 0.087420469 |
| 421 | BDC26 | Hexanoyl-L-carnitine | 995.3087658 | 168.2610895 | 7.768557901 | 0.088658493 |
| 428 | BDC27 | Hexanoyl-L-carnitine | 1373.045854 | 222.1627796 | 7.765963876 | 0.094572778 |
| 435 | BDC28 | Hexanoyl-L-carnitine | 575.2951926 | 98.13360924 | 7.773452781 | 0.085816022 |
| 442 | BDC29 | Hexanoyl-L-carnitine | 1112.231105 | 197.4382434 | 7.774009472 | 0.088576872 |
| 449 | BDC30 | Hexanoyl-L-carnitine | 1682.375543 | 276.7288608 | 7.773152179 | 0.092044174 |
| 456 | BDC31 | Hexanoyl-L-carnitine | 1020.874303 | 170.3845638 | 7.772706412 | 0.088876978 |
| 463 | BDC32 | Hexanoyl-L-carnitine | 2695.311029 | 471.0392148 | 7.778381552 | 0.088851263 |
| 470 | BDC33 | Hexanoyl-L-carnitine | 1187.727076 | 205.5248568 | 7.788000153 | 0.091845314 |
| 477 | BDC34 | Hexanoyl-L-carnitine | 735.4959469 | 135.5039281 | 7.773578799 | 0.081584263 |
| 484 | BDC35 | Hexanoyl-L-carnitine | 785.4887911 | 136.3304419 | 7.768257355 | 0.087765905 |
| 491 | BDC36 | Hexanoyl-L-carnitine | 1626.288994 | 316.5363354 | 7.767135379 | 0.06990127 |
| 498 | CRC01 | Hexanoyl-L-carnitine | 1546.527464 | 234.3618045 | 7.764587603 | 0.0943712 |
| 505 | CRC02 | Hexanoyl-L-carnitine | 2457.719933 | 329.9176655 | 7.764765786 | 0.098799927 |
| 512 | CRC03 | Hexanoyl-L-carnitine | 1630.704176 | 268.338114 | 7.769158204 | 0.086646377 |
| 519 | CRC04 | Hexanoyl-L-carnitine | 1557.080174 | 207.0998217 | 7.759741387 | 0.094329052 |
| 526 | CRC05 | Hexanoyl-L-carnitine | 2138.95568 | 332.3140637 | 7.755385868 | 0.092868395 |
| 533 | CRC06 | Hexanoyl-L-carnitine | 1274.972253 | 213.318282 | 7.759279517 | 0.08979741 |
| 540 | CRC07 | Hexanoyl-L-carnitine | 2052.801685 | 326.3954202 | 7.774094798 | 0.091007554 |
| 547 | CRC08 | Hexanoyl-L-carnitine | 1328.906555 | 233.2820858 | 7.77125467 | 0.089074089 |
| 554 | CRC09 | Hexanoyl-L-carnitine | 2587.86113 | 413.5152767 | 7.767953516 | 0.088426122 |
| 561 | CRC10 | Hexanoyl-L-carnitine | 4710.279046 | 769.0555078 | 7.767107502 | 0.092753805 |
| 568 | CRC11 | Hexanoyl-L-carnitine | 3448.659038 | 533.3321753 | 7.769887326 | 0.098871047 |
| 575 | CRC12 | Hexanoyl-L-carnitine | 573.3876662 | 84.53108654 | 7.759726989 | 0.102040292 |
| 582 | CRC13 | Hexanoyl-L-carnitine | 3961.508934 | 652.4885352 | 7.762714645 | 0.093805018 |
| 589 | CRC14 | Hexanoyl-L-carnitine | 1403.953271 | 227.8542087 | 7.765302239 | 0.096316739 |
| 596 | CRC15 | Hexanoyl-L-carnitine | 3732.858368 | 558.1967093 | 7.777392618 | 0.099227599 |
| 603 | CRC16 | Hexanoyl-L-carnitine | 1683.133665 | 253.085191 | 7.768724114 | 0.094615069 |
| 610 | CRC17 | Hexanoyl-L-carnitine | 1043.861839 | 143.1570184 | 7.767928232 | 0.095458522 |
| 617 | CRC18 | Hexanoyl-L-carnitine | 1229.849647 | 187.0178128 | 7.764912944 | 0.100766617 |
| 624 | CRC19 | Hexanoyl-L-carnitine | 902.3810821 | 160.6970373 | 7.783231694 | 0.082782207 |

TABLE 4-continued

| Index | Sample Name | Component Name | Area | Height | Retention Time | Width at 50% |
|---|---|---|---|---|---|---|
| 631 | CRC20 | Hexanoyl-L-carnitine | 1218.685789 | 217.1757228 | 7.776851812 | 0.086204908 |
| 638 | CRC21 | Hexanoyl-L-carnitine | 1304.250795 | 249.1524558 | 7.775161282 | 0.082357863 |
| 645 | CRC22 | Hexanoyl-L-carnitine | 831.8456989 | 203.3722448 | 7.777836581 | 0.052363706 |
| 652 | CRC23 | Hexanoyl-L-carnitine | 1264.432894 | 253.1322945 | 7.781733523 | 0.070665432 |
| 659 | CRC24 | Hexanoyl-L-carnitine | 1701.15885 | 327.5771542 | 7.789326517 | 0.078782788 |
| 666 | CRC25 | Hexanoyl-L-carnitine | 1553.112855 | 311.6523978 | 7.781905335 | 0.071548846 |
| 673 | CRC26 | Hexanoyl-L-carnitine | 2408.215249 | 476.7620393 | 7.794801826 | 0.082598726 |
| 680 | CRC27 | Hexanoyl-L-carnitine | 1413.639893 | 248.2619785 | 7.780479544 | 0.085444964 |
| 687 | CRC28 | Hexanoyl-L-carnitine | 1032.208402 | 185.0759959 | 7.773716791 | 0.078022517 |
| 694 | CRC29 | Hexanoyl-L-carnitine | 482.1322163 | 89.45826498 | 7.784024039 | 0.072886776 |
| 701 | CRC30 | Hexanoyl-L-carnitine | 350.228889 | 60.51013675 | 7.767991525 | 0.083082429 |
| 708 | CRC31 | Hexanoyl-L-carnitine | 419.5323166 | 89.02738763 | 7.756994615 | 0.072197706 |
| 715 | CRC32 | Hexanoyl-L-carnitine | 306.7245824 | 50.90368425 | 7.773867039 | 0.106298807 |
| 722 | CRC33 | Hexanoyl-L-carnitine | 268.3767316 | 46.35371565 | 7.773921464 | 0.082294574 |
| 729 | CRC34 | Hexanoyl-L-carnitine | 673.0411258 | 146.1255657 | 7.786929655 | 0.074211893 |
| 736 | CRC35 | Hexanoyl-L-carnitine | 629.0349403 | 169.56864 | 7.766270283 | 0.058219958 |
| 743 | CRC36 | Hexanoyl-L-carnitine | 423.9432435 | 96.67335491 | 7.78872123 | 0.059634498 |
| 750 | CTL01 | Hexanoyl-L-carnitine | 2570.34684 | 358.4127726 | 7.757318864 | 0.098114978 |
| 757 | CTL02 | Hexanoyl-L-carnitine | 2621.28373 | 359.8333181 | 7.758667496 | 0.098420879 |
| 764 | CTL03 | Hexanoyl-L-carnitine | 1450.042627 | 225.3670565 | 7.760228978 | 0.089524802 |
| 771 | CTL04 | Hexanoyl-L-carnitine | 2082.622142 | 283.203053 | 7.759540679 | 0.097464949 |
| 778 | CTL05 | Hexanoyl-L-carnitine | 2254.419193 | 340.8374999 | 7.761747107 | 0.097456091 |
| 785 | CTL06 | Hexanoyl-L-carnitine | 2273.241717 | 350.2180534 | 7.757267542 | 0.093092836 |
| 792 | CTL07 | Hexanoyl-L-carnitine | 1414.288614 | 173.4185752 | 7.764832452 | 0.099747435 |
| 799 | CTL08 | Hexanoyl-L-carnitine | 2860.559979 | 393.1152195 | 7.759347244 | 0.09461818 |
| 806 | CTL09 | Hexanoyl-L-carnitine | 1889.328265 | 248.6927784 | 7.76168486 | 0.095769708 |
| 813 | CTL10 | Hexanoyl-L-carnitine | 3615.323876 | 562.3282272 | 7.753867303 | 0.097698203 |
| 820 | CTL11 | Hexanoyl-L-carnitine | 2184.702401 | 314.3293637 | 7.764807895 | 0.100386455 |
| 827 | CTL12 | Hexanoyl-L-carnitine | 6424.213899 | 879.628019 | 7.762485061 | 0.094212711 |
| 834 | CTL13 | Hexanoyl-L-carnitine | 1768.776129 | 212.8049934 | 7.760910527 | 0.103009802 |
| 841 | CTL14 | Hexanoyl-L-carnitine | 2374.757559 | 323.6483859 | 7.771863485 | 0.098572747 |
| 848 | CTL15 | Hexanoyl-L-carnitine | 5868.953572 | 804.1748687 | 7.774733971 | 0.096904018 |
| 855 | CTL16 | Hexanoyl-L-carnitine | 2907.016683 | 414.1630498 | 7.769457425 | 0.0954492 |
| 862 | CTL17 | Hexanoyl-L-carnitine | 1841.723722 | 282.3791131 | 7.761875958 | 0.097046601 |
| 869 | CTL18 | Hexanoyl-L-carnitine | 2963.454228 | 467.5782102 | 7.769389684 | 0.088384363 |
| 876 | CTL19 | Hexanoyl-L-carnitine | 13104.71581 | 2079.408889 | 7.770624159 | 0.092531511 |
| 883 | CTL20 | Hexanoyl-L-carnitine | 2861.986242 | 447.8333783 | 7.766428979 | 0.097866356 |
| 890 | CTL21 | Hexanoyl-L-carnitine | 5565.030737 | 910.7406613 | 7.772922037 | 0.092828374 |

TABLE 4-continued

| Index | Sample Name | Component Name | Area | Height | Retention Time | Width at 50% |
|---|---|---|---|---|---|---|
| 897 | CTL22 | Hexanoyl-L-carnitine | 4550.439333 | 759.6128352 | 7.781485359 | 0.086908033 |
| 904 | CTL23 | Hexanoyl-L-carnitine | 2763.017924 | 464.3847886 | 7.76359346 | 0.091527801 |
| 911 | CTL24 | Hexanoyl-L-carnitine | 3004.626966 | 475.4419901 | 7.770826278 | 0.094729508 |
| 918 | CTL25 | Hexanoyl-L-carnitine | 8443.052934 | 1299.699516 | 7.782951957 | 0.09885866 |
| 925 | CTL26 | Hexanoyl-L-carnitine | 1673.919995 | 271.5104684 | 7.779458281 | 0.095918379 |
| 932 | CTL27 | Hexanoyl-L-carnitine | 3334.745827 | 497.4468183 | 7.770807543 | 0.08843326 |
| 939 | CTL28 | Hexanoyl-L-carnitine | 2823.497331 | 449.0208125 | 7.770857502 | 0.089337174 |
| 946 | CTL29 | Hexanoyl-L-carnitine | 1804.227464 | 296.4064793 | 7.778895206 | 0.090209836 |
| 953 | CTL30 | Hexanoyl-L-carnitine | 1837.462325 | 313.3869227 | 7.772157837 | 0.089055273 |
| 960 | CTL31 | Hexanoyl-L-carnitine | 1228.201872 | 217.1795302 | 7.774170788 | 0.089942938 |
| 967 | CTL32 | Hexanoyl-L-carnitine | 992.1642578 | 169.9032742 | 7.770872587 | 0.083871731 |
| 974 | CTL33 | Hexanoyl-L-carnitine | 1506.203275 | 270.1456512 | 7.783465244 | 0.08962422 |
| 981 | CTL34 | Hexanoyl-L-carnitine | 911.8958353 | 144.8967455 | 7.770490068 | 0.089623728 |
| 988 | CTL35 | Hexanoyl-L-carnitine | 1118.973798 | 188.7594575 | 7.781845096 | 0.089403968 |
| 995 | CTL36 | Hexanoyl-L-carnitine | 3408.373672 | 627.3723565 | 7.773083384 | 0.087837891 |
| 1002 | PRC01 | Hexanoyl-L-carnitine | 1172.859217 | 157.4158821 | 7.770409061 | 0.109910377 |
| 1009 | PRC02 | Hexanoyl-L-carnitine | 865.0967227 | 115.1892949 | 7.763074084 | 0.100428911 |
| 1016 | PRC03 | Hexanoyl-L-carnitine | 1046.337614 | 146.7211472 | 7.76657337 | 0.109264383 |
| 1023 | PRC04 | Hexanoyl-L-carnitine | 1161.134891 | 135.6854819 | 7.756676893 | 0.10959371 |
| 1030 | PRC05 | Hexanoyl-L-carnitine | 2479.520513 | 338.8028479 | 7.77085328 | 0.100169191 |
| 1037 | PRC06 | Hexanoyl-L-carnitine | 1033.803167 | 109.7419901 | 7.764308998 | 0.113853698 |
| 1044 | PRC07 | Hexanoyl-L-carnitine | 1248.283742 | 145.6098337 | 7.761937406 | 0.102343356 |
| 1051 | PRC08 | Hexanoyl-L-carnitine | 1736.570603 | 236.2134834 | 7.765576844 | 0.096694025 |
| 1058 | PRC09 | Hexanoyl-L-carnitine | 5453.974924 | 842.216603 | 7.76479962 | 0.086640348 |
| 1065 | PRC10 | Hexanoyl-L-carnitine | 2353.613317 | 356.3222756 | 7.771862808 | 0.097589157 |
| 1072 | PRC11 | Hexanoyl-L-carnitine | 1742.036452 | 252.5116402 | 7.759929218 | 0.097141662 |
| 1079 | PRC12 | Hexanoyl-L-carnitine | 2541.048952 | 393.4462402 | 7.77579326 | 0.098411558 |
| 1086 | PRC13 | Hexanoyl-L-carnitine | 1313.057716 | 199.9219774 | 7.765104706 | 0.095095952 |
| 1093 | PRC14 | Hexanoyl-L-carnitine | 1574.814526 | 214.3791032 | 7.772858632 | 0.098579573 |
| 1100 | PRC15 | Hexanoyl-L-carnitine | 1345.21573 | 219.1206588 | 7.766035011 | 0.093666349 |
| 1107 | PRC16 | Hexanoyl-L-carnitine | 1943.160505 | 333.5770512 | 7.766538572 | 0.090149839 |
| 1114 | PRC17 | Hexanoyl-L-carnitine | 2836.428215 | 432.3856708 | 7.770452582 | 0.094681186 |
| 1121 | PRC18 | Hexanoyl-L-carnitine | 1468.011182 | 247.6258175 | 7.778895598 | 0.09017927 |
| 1128 | PRC19 | Hexanoyl-L-carnitine | 531.2727907 | 79.4833947 | 7.766801252 | 0.104589301 |
| 1135 | PRC20 | Hexanoyl-L-carnitine | 280.4564557 | 60.43606456 | 7.770003369 | 0.069984427 |
| 1142 | PRC21 | Hexanoyl-L-carnitine | 749.0439112 | 117.509915 | 7.778832921 | 0.099618339 |
| 1149 | PRC22 | Hexanoyl-L-carnitine | 551.0775869 | 85.35222841 | 7.764739657 | 0.094258036 |
| 1156 | PRC23 | Hexanoyl-L-carnitine | 2583.491729 | 448.4531906 | 7.779569634 | 0.083928794 |

TABLE 4-continued

| Index | Sample Name | Component Name | Area | Height | Retention Time | Width at 50% |
|---|---|---|---|---|---|---|
| 1163 | PRC24 | Hexanoyl-L-carnitine | 658.1310266 | 103.1541076 | 7.770507016 | 0.093601364 |
| 1170 | PRC25 | Hexanoyl-L-carnitine | 263.8730211 | 41.16261266 | 7.781221782 | 0.095593108 |
| 1177 | PRC26 | Hexanoyl-L-carnitine | 569.9882216 | 97.75555262 | 7.77600012 | 0.085209499 |
| 1184 | PRC27 | Hexanoyl-L-carnitine | 683.2893148 | 111.474227 | 7.769135809 | 0.090647359 |
| 1191 | PRC28 | Hexanoyl-L-carnitine | 211.3817162 | 39.14049378 | 7.767611597 | 0.074583692 |
| 1198 | PRC29 | Hexanoyl-L-carnitine | 500.0523909 | 87.34514378 | 7.762102512 | 0.08954038 |
| 1205 | PRC30 | Hexanoyl-L-carnitine | 355.1408123 | 58.97665543 | 7.783626138 | 0.083328283 |
| 1212 | PRC31 | Hexanoyl-L-carnitine | 159.9153556 | 26.88823588 | 7.774304025 | 0.09450426 |
| 1219 | PRC32 | Hexanoyl-L-carnitine | 225.1830645 | 43.72340843 | 7.77783102 | 0.085935203 |
| 1226 | PRC33 | Hexanoyl-L-carnitine | 255.5582516 | 52.21520424 | 7.771594158 | 0.069469141 |
| 1233 | PRC34 | Hexanoyl-L-carnitine | 411.9309986 | 85.97059941 | 7.779558856 | 0.062601015 |
| 1240 | PRC35 | Hexanoyl-L-carnitine | 419.5460538 | 83.9534036 | 7.784652801 | 0.0794292 |
| 1247 | PRC36 | Hexanoyl-L-carnitine | 254.2312401 | 49.44498975 | 7.777658891 | 0.080103828 |

TABLE 5

| Index | Sample Name | Component Name | Area | Height | Retention Time | Width at 50% |
|---|---|---|---|---|---|---|
| 2 | Hu_Normal_Serum_1_4_10 ul | Octanoyl-L-carnitine | 97495.22171 | 16716.43425 | 9.73614755 | 0.078235493 |
| 9 | HC + MeOH_1_4_10 ul | Octanoyl-L-carnitine | 14883.93302 | 2611.29135 | 9.696352567 | 0.077825918 |
| 16 | HC + Serum_1_4_10 ul | Octanoyl-L-carnitine | 16403.19005 | 3022.863635 | 9.693488753 | 0.078680297 |
| 23 | OC + MeOH_1_4_10 ul | Octanoyl-L-carnitine | 8652746.126 | 1252205.429 | 9.683525051 | 0.097696439 |
| 30 | OC + Serum_1_4_10 ul | Octanoyl-L-carnitine | 13380468 | 1776845.012 | 9.683568318 | 0.105068334 |
| 37 | DC + MeOH_1_4_10 ul | Octanoyl-L-carnitine | 8553.736417 | 1489.964243 | 9.693666347 | 0.073932641 |
| 44 | DC + Serum_1_4_10 ul | Octanoyl-L-carnitine | 19542.99159 | 3570.089271 | 9.689616092 | 0.07395859 |
| 51 | PC + Serum_1_4_10 ul | Octanoyl-L-carnitine | 10418.76669 | 1806.155075 | 9.693043449 | 0.075715099 |
| 58 | PC + Serum_sup_10 ul | Octanoyl-L-carnitine | 33889.19298 | 6285.815286 | 9.690445076 | 0.071169 |
| 65 | 2PY_0100 | Octanoyl-L-carnitine | 18.38847301 | 7.97297035 | 9.617183628 | 0.039561356 |
| 72 | Serum + 2PY_0100 | Octanoyl-L-carnitine | 6470.24193 | 1607.777877 | 9.801838686 | 0.066773307 |
| 79 | LPC16_0100 | Octanoyl-L-carnitine | 11.43824503 | 5.229478358 | 9.792531701 | 0.042721309 |
| 86 | Serum + LPC16_0100 | Octanoyl-L-carnitine | 6368.408501 | 1510.187872 | 9.819869118 | 0.065523299 |
| 93 | LPC18_0100 | Octanoyl-L-carnitine | 21.91620525 | 5.183645864 | 9.79518767 | 0.065147689 |
| 100 | Serum + LPC18_0100 | Octanoyl-L-carnitine | 5696.150961 | 1338.955973 | 9.823312611 | 0.064315044 |
| 107 | 06-1(1_4) | Octanoyl-L-carnitine | 4489.318659 | 857.1401974 | 9.716095509 | 0.068487151 |
| 114 | 06-2(1_4) | Octanoyl-L-carnitine | 6011.226171 | 965.2480184 | 9.725037833 | 0.084421605 |
| 121 | 07-1(1_4) | Octanoyl-L-carnitine | 2762.930339 | 493.1283232 | 9.715316996 | 0.078131066 |
| 128 | 07-2(1_4) | Octanoyl-L-carnitine | 894.0795812 | 141.1134929 | 9.732325021 | 0.085266671 |
| 135 | 08-1(1_4) | Octanoyl-L-carnitine | 6984.329868 | 1188.588509 | 9.708373186 | 0.083635432 |
| 142 | 08-2(1_4) | Octanoyl-L-carnitine | 4648.41193 | 813.4909827 | 9.712451088 | 0.081268567 |

TABLE 5-continued

| Index | Sample Name | Component Name | Area | Height | Retention Time | Width at 50% |
|---|---|---|---|---|---|---|
| 149 | 09-1(1_4) | Octanoyl-L-carnitine | 4015.712038 | 622.2073576 | 9.719377774 | 0.092198537 |
| 156 | 09-2(1_4) | Octanoyl-L-carnitine | 5340.895242 | 885.835266 | 9.701048763 | 0.084610976 |
| 163 | 10-1(1_4) | Octanoyl-L-carnitine | 1791.383089 | 290.0771504 | 9.722322268 | 0.079873491 |
| 170 | 10-2(1_4) | Octanoyl-L-carnitine | 1342.932868 | 219.7985768 | 9.708894874 | 0.085276596 |
| 177 | 11-1(1_4) | Octanoyl-L-carnitine | 3844.297153 | 547.6846997 | 9.708512679 | 0.095984211 |
| 184 | 11-2(1_4) | Octanoyl-L-carnitine | 1841.730911 | 245.6245873 | 9.713297807 | 0.098264656 |
| 191 | 12-1(1_4) | Octanoyl-L-carnitine | 2170.481293 | 389.7784845 | 9.703543392 | 0.081902491 |
| 198 | 12-2(1_4) | Octanoyl-L-carnitine | 3059.475524 | 509.0956452 | 9.684246827 | 0.079526218 |
| 205 | 13-1(1_4) | Octanoyl-L-carnitine | 3967.486585 | 653.953821 | 9.692182693 | 0.081897935 |
| 212 | 13-2(1_4) | Octanoyl-L-carnitine | 2965.264619 | 506.3127294 | 9.69620265 | 0.078017733 |
| 219 | 14-1(1_4) | Octanoyl-L-carnitine | 5097.783894 | 951.8707265 | 9.687515011 | 0.078564735 |
| 226 | 14-2(1_4) | Octanoyl-L-carnitine | 2968.894125 | 505.1659856 | 9.674355201 | 0.071861415 |
| 233 | 15-1(1_4) | Octanoyl-L-carnitine | 3169.173521 | 530.2137667 | 9.683393005 | 0.075970358 |
| 240 | 15-2(1_4) | Octanoyl-L-carnitine | 3569.685214 | 666.4279132 | 9.677097404 | 0.070956497 |
| 247 | BDC01 | Octanoyl-L-carnitine | 6921.961156 | 1036.354666 | 9.713075956 | 0.091645904 |
| 254 | BDC02 | Octanoyl-L-carnitine | 3836.665172 | 541.8429347 | 9.70348319 | 0.090320564 |
| 261 | BDC03 | Octanoyl-L-carnitine | 5085.515772 | 834.1902487 | 9.705533181 | 0.091303188 |
| 268 | BDC04 | Octanoyl-L-carnitine | 3205.866333 | 562.6032196 | 9.70248938 | 0.08297146 |
| 275 | BDC05 | Octanoyl-L-carnitine | 3885.517486 | 736.0355573 | 9.702361097 | 0.077998232 |
| 282 | BDC06 | Octanoyl-L-carnitine | 4507.00178 | 620.3312467 | 9.706240673 | 0.092517697 |
| 289 | BDC07 | Octanoyl-L-carnitine | 2908.248042 | 455.9068381 | 9.71041032 | 0.093459597 |
| 296 | BDC08 | Octanoyl-L-carnitine | 3175.862246 | 438.7914546 | 9.706121576 | 0.094325699 |
| 303 | BDC09 | Octanoyl-L-carnitine | 905.2716484 | 159.3727617 | 9.7022132 | 0.082103166 |
| 310 | BDC10 | Octanoyl-L-carnitine | 9170.01885 | 1792.620716 | 9.705534206 | 0.078816359 |
| 317 | BDC11 | Octanoyl-L-carnitine | 6245.260228 | 1052.492292 | 9.70816333 | 0.074261617 |
| 324 | BDC12 | Octanoyl-L-carnitine | 4632.03778 | 735.4312427 | 9.713263699 | 0.087251972 |
| 331 | BDC13 | Octanoyl-L-carnitine | 6969.928779 | 1220.447445 | 9.701727733 | 0.083374503 |
| 338 | BDC14 | Octanoyl-L-carnitine | 8011.032557 | 1520.103272 | 9.708322132 | 0.075277448 |
| 345 | BDC15 | Octanoyl-L-carnitine | 7094.576707 | 1352.035761 | 9.70715905 | 0.075444564 |
| 352 | BDC16 | Octanoyl-L-carnitine | 15075.59388 | 2693.460546 | 9.711868762 | 0.07424641 |
| 359 | BDC17 | Octanoyl-L-carnitine | 5994.829855 | 1114.374143 | 9.710504755 | 0.084230387 |
| 366 | BDC18 | Octanoyl-L-carnitine | 4362.611603 | 818.0654433 | 9.710422489 | 0.073478202 |
| 373 | BDC19 | Octanoyl-L-carnitine | 4580.990599 | 742.7724113 | 9.719824138 | 0.091784094 |
| 380 | BDC20 | Octanoyl-L-carnitine | 11847.46953 | 1861.985197 | 9.719048469 | 0.088799603 |
| 387 | BDC21 | Octanoyl-L-carnitine | 3156.306338 | 498.3551625 | 9.72277751 | 0.091806519 |
| 394 | BDC22 | Octanoyl-L-carnitine | 786.5911579 | 132.3134385 | 9.718740332 | 0.090149427 |
| 401 | BDC23 | Octanoyl-L-carnitine | 2921.977023 | 473.1801199 | 9.717752898 | 0.096449756 |
| 408 | BDC24 | Octanoyl-L-carnitine | 1570.97031 | 262.6876749 | 9.710286939 | 0.090531505 |

TABLE 5-continued

| Index | Sample Name | Component Name | Area | Height | Retention Time | Width at 50% |
|---|---|---|---|---|---|---|
| 415 | BDC25 | Octanoyl-L-carnitine | 6478.255613 | 1106.340284 | 9.714859666 | 0.088955581 |
| 422 | BDC26 | Octanoyl-L-carnitine | 3454.420355 | 524.0910027 | 9.719242203 | 0.093314432 |
| 429 | BDC27 | Octanoyl-L-carnitine | 11089.53018 | 1678.971983 | 9.715279234 | 0.092772833 |
| 436 | BDC28 | Octanoyl-L-carnitine | 1575.621847 | 385.4245822 | 9.71477265 | 0.057469959 |
| 443 | BDC29 | Octanoyl-L-carnitine | 3873.06694 | 753.3547552 | 9.716264588 | 0.08032528 |
| 450 | BDC30 | Octanoyl-L-carnitine | 5259.980084 | 964.6082577 | 9.7170447 | 0.080640336 |
| 457 | BDC31 | Octanoyl-L-carnitine | 3581.905662 | 554.8246478 | 9.721215304 | 0.090487652 |
| 464 | BDC32 | Octanoyl-L-carnitine | 8104.926736 | 1304.21452 | 9.726013896 | 0.089484424 |
| 471 | BDC33 | Octanoyl-L-carnitine | 2611.813034 | 475.2215036 | 9.719079541 | 0.08249195 |
| 478 | BDC34 | Octanoyl-L-carnitine | 2616.969579 | 498.3977321 | 9.719182286 | 0.078850914 |
| 485 | BDC35 | Octanoyl-L-carnitine | 1760.764618 | 375.5963328 | 9.713019082 | 0.066208392 |
| 492 | BDC36 | Octanoyl-L-carnitine | 3669.440834 | 657.7256155 | 9.717229041 | 0.084178282 |
| 499 | CRC01 | Octanoyl-L-carnitine | 3095.246431 | 643.660693 | 9.701133993 | 0.068784171 |
| 506 | CRC02 | Octanoyl-L-carnitine | 5786.358245 | 1206.489161 | 9.710644413 | 0.070279727 |
| 513 | CRC03 | Octanoyl-L-carnitine | 3153.421366 | 632.3627558 | 9.709390495 | 0.072313871 |
| 520 | CRC04 | Octanoyl-L-carnitine | 2921.54875 | 577.8842183 | 9.69821571 | 0.080352059 |
| 527 | CRC05 | Octanoyl-L-carnitine | 6584.023297 | 1111.853115 | 9.703512734 | 0.07622675 |
| 534 | CRC06 | Octanoyl-L-carnitine | 3794.4225 | 646.1273218 | 9.701723236 | 0.075218456 |
| 541 | CRC07 | Octanoyl-L-carnitine | 4265.365633 | 827.1702268 | 9.709738716 | 0.07718803 |
| 548 | CRC08 | Octanoyl-L-carnitine | 3287.392198 | 608.1283635 | 9.71234348 | 0.081400827 |
| 555 | CRC09 | Octanoyl-L-carnitine | 5290.632889 | 1006.146035 | 9.710068903 | 0.07072056 |
| 562 | CRC10 | Octanoyl-L-carnitine | 25768.22378 | 4038.949004 | 9.714190901 | 0.089528837 |
| 569 | CRC11 | Octanoyl-L-carnitine | 12118.84773 | 1857.049015 | 9.71223713 | 0.090576587 |
| 576 | CRC12 | Octanoyl-L-carnitine | 2448.955078 | 363.4270976 | 9.713672662 | 0.091797153 |
| 583 | CRC13 | Octanoyl-L-carnitine | 13000.9472 | 2136.548932 | 9.710509116 | 0.092151669 |
| 590 | CRC14 | Octanoyl-L-carnitine | 5172.978904 | 954.7344253 | 9.704409541 | 0.08097662 |
| 597 | CRC15 | Octanoyl-L-carnitine | 16190.25052 | 2473.886461 | 9.72024872 | 0.090178851 |
| 604 | CRC16 | Octanoyl-L-carnitine | 7583.279636 | 1189.929155 | 9.70547504 | 0.088340771 |
| 611 | CRC17 | Octanoyl-L-carnitine | 4772.547233 | 798.4720996 | 9.714396083 | 0.089505872 |
| 618 | CRC18 | Octanoyl-L-carnitine | 4812.35237 | 827.1481877 | 9.711983594 | 0.090220804 |
| 625 | CRC19 | Octanoyl-L-carnitine | 2892.930325 | 542.0093208 | 9.724757922 | 0.079758722 |
| 632 | CRC20 | Octanoyl-L-carnitine | 4334.885479 | 877.615301 | 9.716932771 | 0.077658577 |
| 639 | CRC21 | Octanoyl-L-carnitine | 2259.405188 | 478.2945064 | 9.714614596 | 0.067552942 |
| 646 | CRC22 | Octanoyl-L-carnitine | 2474.30417 | 492.3749855 | 9.725014218 | 0.072705889 |
| 653 | CRC23 | Octanoyl-L-carnitine | 6792.002472 | 1320.478072 | 9.725121372 | 0.080775033 |
| 660 | CRC24 | Octanoyl-L-carnitine | 2623.98304 | 481.8808812 | 9.729252039 | 0.080585633 |
| 667 | CRC25 | Octanoyl-L-carnitine | 6143.104942 | 1237.04714 | 9.720626174 | 0.079853352 |
| 674 | CRC26 | Octanoyl-L-carnitine | 4789.762086 | 978.5966008 | 9.714238432 | 0.070926694 |

TABLE 5-continued

| Index | Sample Name | Component Name | Area | Height | Retention Time | Width at 50% |
|---|---|---|---|---|---|---|
| 681 | CRC27 | Octanoyl-L-carnitine | 4048.767056 | 981.6688866 | 9.712710789 | 0.060122622 |
| 688 | CRC28 | Octanoyl-L-carnitine | 1979.102932 | 372.9988318 | 9.707758821 | 0.081103472 |
| 695 | CRC29 | Octanoyl-L-carnitine | 1745.141527 | 372.1433923 | 9.724905886 | 0.061891507 |
| 702 | CRC30 | Octanoyl-L-carnitine | 889.9412086 | 205.369641 | 9.710673515 | 0.067140535 |
| 709 | CRC31 | Octanoyl-L-carnitine | 1302.409313 | 314.8741455 | 9.708118252 | 0.059677635 |
| 716 | CRC32 | Octanoyl-L-carnitine | 906.6519232 | 230.3183804 | 9.711806059 | 0.055282419 |
| 723 | CRC33 | Octanoyl-L-carnitine | 573.7147057 | 132.3135927 | 9.732393724 | 0.066347208 |
| 730 | CRC34 | Octanoyl-L-carnitine | 4595.842374 | 728.5768718 | 9.728420118 | 0.102659007 |
| 737 | CRC35 | Octanoyl-L-carnitine | 1311.865748 | 299.0137572 | 9.720515888 | 0.061799153 |
| 744 | CRC36 | Octanoyl-L-carnitine | 1322.800752 | 299.715148 | 9.708288237 | 0.061159448 |
| 751 | CTL01 | Octanoyl-L-carnitine | 7290.952182 | 1286.163905 | 9.712968891 | 0.076065746 |
| 758 | CTL02 | Octanoyl-L-carnitine | 6019.76135 | 1176.162417 | 9.707937216 | 0.078020751 |
| 765 | CTL03 | Octanoyl-L-carnitine | 7845.939927 | 1403.87264 | 9.70614057 | 0.079719881 |
| 772 | CTL04 | Octanoyl-L-carnitine | 5777.251494 | 904.8550091 | 9.709142093 | 0.087632353 |
| 779 | CTL05 | Octanoyl-L-carnitine | 9266.195907 | 1536.304757 | 9.711142036 | 0.083777283 |
| 786 | CTL06 | Octanoyl-L-carnitine | 9566.653169 | 1595.871826 | 9.709688772 | 0.083031445 |
| 793 | CTL07 | Octanoyl-L-carnitine | 3896.717497 | 736.0594892 | 9.716484835 | 0.082305659 |
| 800 | CTL08 | Octanoyl-L-carnitine | 8309.687729 | 1294.545676 | 9.701753452 | 0.089083416 |
| 807 | CTL09 | Octanoyl-L-carnitine | 8500.182834 | 1430.349798 | 9.711071172 | 0.080306999 |
| 814 | CTL10 | Octanoyl-L-carnitine | 15817.30933 | 2545.123611 | 9.703954524 | 0.087430235 |
| 821 | CTL11 | Octanoyl-L-carnitine | 9266.728826 | 1485.800308 | 9.710281644 | 0.08262743 |
| 828 | CTL12 | Octanoyl-L-carnitine | 27397.11078 | 4900.389093 | 9.702806544 | 0.076442683 |
| 835 | CTL13 | Octanoyl-L-carnitine | 4984.208443 | 875.02109 | 9.714301427 | 0.079144791 |
| 842 | CTL14 | Octanoyl-L-carnitine | 12418.28553 | 2167.386555 | 9.717016311 | 0.079412847 |
| 849 | CTL15 | Octanoyl-L-carnitine | 23597.85592 | 3830.207532 | 9.713990834 | 0.085227766 |
| 856 | CTL16 | Octanoyl-L-carnitine | 12612.4145 | 1974.172048 | 9.710144898 | 0.084296755 |
| 863 | CTL17 | Octanoyl-L-carnitine | 8460.553197 | 1485.41091 | 9.699399715 | 0.085550084 |
| 870 | CTL18 | Octanoyl-L-carnitine | 13352.55321 | 2141.377235 | 9.70889134 | 0.087935994 |
| 877 | CTL19 | Octanoyl-L-carnitine | 78876.37862 | 12015.69291 | 9.711566323 | 0.092216308 |
| 884 | CTL20 | Octanoyl-L-carnitine | 19321.84387 | 3233.237088 | 9.712398165 | 0.084503799 |
| 891 | CTL21 | Octanoyl-L-carnitine | 37973.36979 | 6421.765767 | 9.711804438 | 0.092210824 |
| 898 | CTL22 | Octanoyl-L-carnitine | 36709.60545 | 5647.601227 | 9.716778733 | 0.091028782 |
| 905 | CTL23 | Octanoyl-L-carnitine | 15121.92322 | 2361.769317 | 9.710069272 | 0.089201192 |
| 912 | CTL24 | Octanoyl-L-carnitine | 14629.71433 | 2273.856517 | 9.715284854 | 0.089285372 |
| 919 | CTL25 | Octanoyl-L-carnitine | 54061.92923 | 8201.756438 | 9.720037875 | 0.092333081 |
| 926 | CTL26 | Octanoyl-L-carnitine | 7712.54734 | 1265.779374 | 9.721811946 | 0.090214461 |
| 933 | CTL27 | Octanoyl-L-carnitine | 15375.36763 | 2378.856909 | 9.70714297 | 0.09031395 |
| 940 | CTL28 | Octanoyl-L-carnitine | 13920.83804 | 2595.88056 | 9.716223848 | 0.08317849 |

TABLE 5-continued

| Index | Sample Name | Component Name | Area | Height | Retention Time | Width at 50% |
|---|---|---|---|---|---|---|
| 947 | CTL29 | Octanoyl-L-carnitine | 8556.859711 | 1440.44131 | 9.723006578 | 0.091797255 |
| 954 | CTL30 | Octanoyl-L-carnitine | 8701.786393 | 1343.650843 | 9.711972828 | 0.089710114 |
| 961 | CTL31 | Octanoyl-L-carnitine | 5358.47608 | 939.8083945 | 9.71631668 | 0.087756969 |
| 968 | CTL32 | Octanoyl-L-carnitine | 5024.588694 | 880.5656761 | 9.714464668 | 0.083169457 |
| 975 | CTL33 | Octanoyl-L-carnitine | 6796.058885 | 1293.979715 | 9.719746499 | 0.06890701 |
| 982 | CTL34 | Octanoyl-L-carnitine | 5198.89875 | 932.5940065 | 9.712572036 | 0.078399014 |
| 989 | CTL35 | Octanoyl-L-carnitine | 6626.187487 | 1184.035239 | 9.720420164 | 0.086085612 |
| 996 | CTL36 | Octanoyl-L-carnitine | 19988.32368 | 3903.77015 | 9.724924365 | 0.083114211 |
| 1003 | PRC01 | Octanoyl-L-carnitine | 2710.332283 | 488.1792297 | 9.719776616 | 0.080221936 |
| 1010 | PRC02 | Octanoyl-L-carnitine | 2485.898737 | 408.746286 | 9.709115828 | 0.088904772 |
| 1017 | PRC03 | Octanoyl-L-carnitine | 2180.487994 | 392.4396167 | 9.712430982 | 0.086384323 |
| 1024 | PRC04 | Octanoyl-L-carnitine | 3396.248357 | 585.7738358 | 9.706228034 | 0.087805856 |
| 1031 | PRC05 | Octanoyl-L-carnitine | 9150.443297 | 1600.220047 | 9.714983046 | 0.077786319 |
| 1038 | PRC06 | Octanoyl-L-carnitine | 2909.41206 | 603.1865811 | 9.707167967 | 0.065188813 |
| 1045 | PRC07 | Octanoyl-L-carnitine | 2957.586533 | 591.8450946 | 9.708112107 | 0.069905435 |
| 1052 | PRC08 | Octanoyl-L-carnitine | 5144.946703 | 1013.288227 | 9.709221843 | 0.069182223 |
| 1059 | PRC09 | Octanoyl-L-carnitine | 14727.39788 | 2333.362744 | 9.708368154 | 0.087179032 |
| 1066 | PRC10 | Octanoyl-L-carnitine | 5232.325752 | 983.4797022 | 9.719770024 | 0.0823851 |
| 1073 | PRC11 | Octanoyl-L-carnitine | 5812.389896 | 939.4403639 | 9.714570598 | 0.083056171 |
| 1080 | PRC12 | Octanoyl-L-carnitine | 12092.84569 | 2144.0552 | 9.725784451 | 0.074485813 |
| 1087 | PRC13 | Octanoyl-L-carnitine | 3908.451334 | 670.3818406 | 9.720836771 | 0.087461249 |
| 1094 | PRC14 | Octanoyl-L-carnitine | 4898.234712 | 814.8080475 | 9.720586639 | 0.080356507 |
| 1101 | PRC15 | Octanoyl-L-carnitine | 4879.686354 | 799.9536934 | 9.710533197 | 0.076214268 |
| 1108 | PRC16 | Octanoyl-L-carnitine | 5490.339444 | 936.5827947 | 9.716986642 | 0.087115405 |
| 1115 | PRC17 | Octanoyl-L-carnitine | 21267.76036 | 3633.2871 | 9.714712933 | 0.088219166 |
| 1122 | PRC18 | Octanoyl-L-carnitine | 6289.458516 | 1113.201748 | 9.723127849 | 0.08454296 |
| 1129 | PRC19 | Octanoyl-L-carnitine | 1788.366851 | 273.4281488 | 9.717200341 | 0.09272419 |
| 1136 | PRC20 | Octanoyl-L-carnitine | 792.6193698 | 156.8469584 | 9.719723462 | 0.069667989 |
| 1143 | PRC21 | Octanoyl-L-carnitine | 2075.065541 | 366.2037757 | 9.720138534 | 0.087179341 |
| 1150 | PRC22 | Octanoyl-L-carnitine | 1817.053549 | 321.95673 | 9.715129575 | 0.079030137 |
| 1157 | PRC23 | Octanoyl-L-carnitine | 11673.10872 | 2024.39209 | 9.717172708 | 0.079845235 |
| 1164 | PRC24 | Octanoyl-L-carnitine | 1808.51559 | 311.6579355 | 9.722612662 | 0.089909359 |
| 1171 | PRC25 | Octanoyl-L-carnitine | 645.2664198 | 148.3561556 | 9.725494747 | 0.066089047 |
| 1178 | PRC26 | Octanoyl-L-carnitine | 1601.222066 | 317.2401676 | 9.708194659 | 0.067975432 |
| 1185 | PRC27 | Octanoyl-L-carnitine | 3260.908301 | 656.2405604 | 9.713188866 | 0.071060374 |
| 1192 | PRC28 | Octanoyl-L-carnitine | 360.0585239 | 73.92325316 | 9.720618577 | 0.073249368 |
| 1199 | PRC29 | Octanoyl-L-carnitine | 1789.126018 | 303.5069116 | 9.708812468 | 0.085680328 |
| 1206 | PRC30 | Octanoyl-L-carnitine | 989.0520423 | 202.9479049 | 9.713373674 | 0.073404759 |

TABLE 5-continued

| Sample Index | Sample Name | Component Name | Area | Height | Retention Time | Width at 50% |
|---|---|---|---|---|---|---|
| 1213 | PRC31 | Octanoyl-L-carnitine | 445.0508427 | 98.60330783 | 9.726742265 | 0.060618415 |
| 1220 | PRC32 | Octanoyl-L-carnitine | 654.8251752 | 142.787599 | 9.723163419 | 0.063708257 |
| 1227 | PRC33 | Octanoyl-L-carnitine | 698.9025492 | 149.6512797 | 9.719893487 | 0.070358768 |
| 1234 | PRC34 | Octanoyl-L-carnitine | 1103.070496 | 236.4376134 | 9.714546183 | 0.063925245 |
| 1241 | PRC35 | Octanoyl-L-carnitine | 1263.666002 | 305.9180343 | 9.725630429 | 0.0613262 |
| 1248 | PRC36 | Octanoyl-L-carnitine | 957.7634121 | 208.7551858 | 9.724522308 | 0.067618579 |

TABLE 6

| Sample Index | Sample Name | Component Name | Area | Height | Retention Time | Width at 50% |
|---|---|---|---|---|---|---|
| 3 | Hu_Normal_Serum_1_4_10 uL | Dodecanoyl-L-carnitine | 1905.984931 | 188.0244346 | 10.94870567 | 0.174255847 |
| 10 | HC + MeOH_1_4_10 uL | Dodecanoyl-L-carnitine | 1683.449345 | 196.7432859 | 10.93581272 | 0.143901086 |
| 17 | HC + Serum_1_4_10 uL | Dodecanoyl-L-carnitine | 2226.26717 | 225.7754448 | 10.93658016 | 0.134736464 |
| 24 | OC + MeOH_1_4_10 uL | Dodecanoyl-L-carnitine | 1208.424974 | 201.3395714 | 10.83564785 | 0.114948978 |
| 31 | OC + Serum_1_4_10 uL | Dodecanoyl-L-carnitine | 1640.620907 | 272.8542079 | 10.8462299 | 0.110568138 |
| 38 | DC + MeOH_1_4_10 uL | Dodecanoyl-L-carnitine | 9191.59363 | 1423.07424 | 10.83870026 | 0.078005833 |
| 45 | DC + Serum_1_4_10 uL | Dodecanoyl-L-carnitine | 10956.45626 | 1578.909224 | 10.82660029 | 0.093063526 |
| 52 | PC + Serum_1_4_10 uL | Dodecanoyl-L-carnitine | 1834.529767 | 190.3576662 | 10.92750874 | 0.179796428 |
| 59 | PC + Serum_sup_10 uL | Dodecanoyl-L-carnitine | 3274.860112 | 380.1826385 | 10.84001536 | 0.13558708 |
| 66 | 2PY_0100 | Dodecanoyl-L-carnitine | 58.60329276 | 8.307445762 | 10.83722483 | 0.145514506 |
| 73 | Serum + 2PY_0100 | Dodecanoyl-L-carnitine | 2015.760073 | 618.1211065 | 11.01361938 | 0.053291229 |
| 80 | LPC16_0100 | Dodecanoyl-L-carnitine | 36.71866501 | 5.891262274 | 10.84183528 | 0.106467839 |
| 87 | Serum + LPC16_0100 | Dodecanoyl-L-carnitine | 4081.32272 | 1135.919099 | 11.0213724 | 0.059897516 |
| 94 | LPC18_0100 | Dodecanoyl-L-carnitine | 44.39155157 | 7.170650591 | 10.81364469 | 0.117948228 |
| 101 | Serum + LPC18_0100 | Dodecanoyl-L-carnitine | 5502.795278 | 1468.015267 | 11.03203246 | 0.06367131 |
| 108 | 06-1(1_4) | Dodecanoyl-L-carnitine | 3427.701986 | 685.2960771 | 10.85810045 | 0.081589396 |
| 115 | 06-2(1_4) | Dodecanoyl-L-carnitine | 5496.005216 | 1045.003632 | 10.85912371 | 0.084161029 |
| 122 | 07-1(1_4) | Dodecanoyl-L-carnitine | 2615.443039 | 497.8607101 | 10.84761179 | 0.083294373 |
| 129 | 07-2(1_4) | Dodecanoyl-L-carnitine | 743.5545491 | 159.6718825 | 10.85297913 | 0.065622625 |
| 136 | 08-1(1_4) | Dodecanoyl-L-carnitine | 6238.721993 | 1081.065296 | 10.84665522 | 0.094104267 |
| 143 | 08-2(1_4) | Dodecanoyl-L-carnitine | 3565.598923 | 680.8025564 | 10.84737868 | 0.082112865 |
| 150 | 09-1(1_4) | Dodecanoyl-L-carnitine | 3241.819651 | 539.6040534 | 10.85869757 | 0.094718419 |
| 157 | 09-2(1_4) | Dodecanoyl-L-carnitine | 4787.442857 | 818.7671723 | 10.85382432 | 0.098731606 |
| 164 | 10-1(1_4) | Dodecanoyl-L-carnitine | 1468.794657 | 262.7185422 | 10.84963246 | 0.089694577 |
| 171 | 10-2(1_4) | Dodecanoyl-L-carnitine | 1299.375407 | 246.8883756 | 10.83800338 | 0.087162233 |
| 178 | 11-1(1_4) | Dodecanoyl-L-carnitine | 3931.742551 | 727.5302284 | 10.84641187 | 0.084120651 |
| 185 | 11-2(1_4) | Dodecanoyl-L-carnitine | 1812.643135 | 322.4627844 | 10.84132146 | 0.086504988 |
| 192 | 12-1(1_4) | Dodecanoyl-L-carnitine | 1774.528093 | 319.1687659 | 10.85266746 | 0.089335634 |

TABLE 6-continued

| Index | Sample Name | Component Name | Area | Height | Retention Time | Width at 50% |
|---|---|---|---|---|---|---|
| 199 | 12-2(1_4) | Dodecanoyl-L-carnitine | 2273.222086 | 407.3369199 | 10.84765617 | 0.087330614 |
| 206 | 13-1(1_4) | Dodecanoyl-L-carnitine | 5099.143707 | 934.8870529 | 10.84328369 | 0.081515835 |
| 213 | 13-2(1_4) | Dodecanoyl-L-carnitine | 2362.000346 | 394.7933186 | 10.85204463 | 0.096662694 |
| 220 | 14-1(1_4) | Dodecanoyl-L-carnitine | 3442.532989 | 586.2623095 | 10.84587674 | 0.092980141 |
| 227 | 14-2(1_4) | Dodecanoyl-L-carnitine | 2686.044898 | 476.5003058 | 10.82912739 | 0.088033801 |
| 234 | 15-1(1_4) | Dodecanoyl-L-carnitine | 1464.688085 | 257.3839798 | 10.84171173 | 0.091081355 |
| 241 | 15-2(1_4) | Dodecanoyl-L-carnitine | 1872.828981 | 343.3874874 | 10.82339276 | 0.07997057 |
| 248 | BDC01 | Dodecanoyl-L-carnitine | 22831.66564 | 3984.135554 | 10.83962372 | 0.085404689 |
| 255 | BDC02 | Dodecanoyl-L-carnitine | 15139.26063 | 2434.115907 | 10.83734583 | 0.084500412 |
| 262 | BDC03 | Dodecanoyl-L-carnitine | 18942.54688 | 3527.565594 | 10.84390159 | 0.073069071 |
| 269 | BDC04 | Dodecanoyl-L-carnitine | 11318.89913 | 1691.433459 | 10.83512125 | 0.091394804 |
| 276 | BDC05 | Dodecanoyl-L-carnitine | 11024.65834 | 1882.801359 | 10.8348912 | 0.090374037 |
| 283 | BDC06 | Dodecanoyl-L-carnitine | 12386.97269 | 2052.220215 | 10.84068904 | 0.089926138 |
| 290 | BDC07 | Dodecanoyl-L-carnitine | 9024.613083 | 1381.679913 | 10.8453871 | 0.088024887 |
| 297 | BDC08 | Dodecanoyl-L-carnitine | 10093.66687 | 1893.771061 | 10.84124607 | 0.068892433 |
| 304 | BDC09 | Dodecanoyl-L-carnitine | 2518.634794 | 496.4220333 | 10.83803296 | 0.077667717 |
| 311 | BDC10 | Dodecanoyl-L-carnitine | 26809.04926 | 5263.731567 | 10.84251666 | 0.068495854 |
| 318 | BDC11 | Dodecanoyl-L-carnitine | 15343.57524 | 2462.902761 | 10.84184312 | 0.088781994 |
| 325 | BDC12 | Dodecanoyl-L-carnitine | 16794.15614 | 3096.397849 | 10.85081462 | 0.081791468 |
| 332 | BDC13 | Dodecanoyl-L-carnitine | 19224.4727 | 3525.340317 | 10.84311121 | 0.074782753 |
| 339 | BDC14 | Dodecanoyl-L-carnitine | 25545.76537 | 4221.938751 | 10.85070216 | 0.088072588 |
| 346 | BDC15 | Dodecanoyl-L-carnitine | 18856.85693 | 3592.723674 | 10.84639336 | 0.070617916 |
| 353 | BDC16 | Dodecanoyl-L-carnitine | 24520.88171 | 4125.391195 | 10.84705814 | 0.089016036 |
| 360 | BDC17 | Dodecanoyl-L-carnitine | 13965.33847 | 2338.319284 | 10.84677463 | 0.090608303 |
| 367 | BDC18 | Dodecanoyl-L-carnitine | 9793.117298 | 1722.830343 | 10.84871207 | 0.079418907 |
| 374 | BDC19 | Dodecanoyl-L-carnitine | 16195.82601 | 3119.481063 | 10.85440728 | 0.076976416 |
| 381 | BDC20 | Dodecanoyl-L-carnitine | 42129.51179 | 6591.562792 | 10.85447872 | 0.088674996 |
| 388 | BDC21 | Dodecanoyl-L-carnitine | 9285.710751 | 1586.574942 | 10.85705573 | 0.090657425 |
| 395 | BDC22 | Dodecanoyl-L-carnitine | 2602.440829 | 327.9455285 | 10.84881939 | 0.102125846 |
| 402 | BDC23 | Dodecanoyl-L-carnitine | 9634.008649 | 1825.504889 | 10.8529256 | 0.075809489 |
| 409 | BDC24 | Dodecanoyl-L-carnitine | 4917.609503 | 908.6818574 | 10.84784928 | 0.075337206 |
| 416 | BDC25 | Dodecanoyl-L-carnitine | 22289.29724 | 4284.454022 | 10.85266927 | 0.081647749 |
| 423 | BDC26 | Dodecanoyl-L-carnitine | 11249.86581 | 1821.102978 | 10.85517496 | 0.090731083 |
| 430 | BDC27 | Dodecanoyl-L-carnitine | 39243.15327 | 6741.474703 | 10.85111649 | 0.083070692 |
| 437 | BDC28 | Dodecanoyl-L-carnitine | 9256.717044 | 1621.724738 | 10.85005463 | 0.086879483 |
| 444 | BDC29 | Dodecanoyl-L-carnitine | 22649.89239 | 3866.877918 | 10.85164572 | 0.080801475 |
| 451 | BDC30 | Dodecanoyl-L-carnitine | 24193.9997 | 4000.632393 | 10.85348927 | 0.08791583 |
| 458 | BDC31 | Dodecanoyl-L-carnitine | 16092.3013 | 2645.457951 | 10.85404877 | 0.092972822 |

TABLE 6-continued

| Index | Sample Name | Component Name | Area | Height | Retention Time | Width at 50% |
|---|---|---|---|---|---|---|
| 465 | BDC32 | Dodecanoyl-L-carnitine | 42521.6882 | 7001.324776 | 10.86162379 | 0.08605538 |
| 472 | BDC33 | Dodecanoyl-L-carnitine | 18092.70992 | 3249.522343 | 10.85729951 | 0.072362387 |
| 479 | BDC34 | Dodecanoyl-L-carnitine | 17900.15708 | 3087.151345 | 10.85795964 | 0.086685061 |
| 486 | BDC35 | Dodecanoyl-L-carnitine | 9928.131613 | 1632.065317 | 10.85210086 | 0.085017059 |
| 493 | BDC36 | Dodecanoyl-L-carnitine | 24868.43453 | 4298.696432 | 10.85745161 | 0.080159535 |
| 500 | CRC01 | Dodecanoyl-L-carnitine | 10015.2643 | 1647.588634 | 10.84138601 | 0.082097947 |
| 507 | CRC02 | Dodecanoyl-L-carnitine | 20657.51998 | 3561.427183 | 10.84030407 | 0.081679212 |
| 514 | CRC03 | Dodecanoyl-L-carnitine | 10644.31575 | 1731.816915 | 10.84010118 | 0.087570152 |
| 521 | CRC04 | Dodecanoyl-L-carnitine | 9247.425417 | 1659.285536 | 10.83952499 | 0.080358068 |
| 528 | CRC05 | Dodecanoyl-L-carnitine | 18228.47886 | 2951.757224 | 10.83647538 | 0.083590736 |
| 535 | CRC06 | Dodecanoyl-L-carnitine | 10152.59791 | 1938.436607 | 10.83737038 | 0.069065002 |
| 542 | CRC07 | Dodecanoyl-L-carnitine | 12716.6625 | 2244.360843 | 10.84621846 | 0.072585191 |
| 549 | CRC08 | Dodecanoyl-L-carnitine | 12347.8165 | 2332.523647 | 10.8496358 | 0.07122447 |
| 556 | CRC09 | Dodecanoyl-L-carnitine | 14039.25934 | 2180.62499 | 10.84509936 | 0.090661863 |
| 563 | CRC10 | Dodecanoyl-L-carnitine | 70889.20723 | 11451.80817 | 10.84550717 | 0.084373683 |
| 570 | CRC11 | Dodecanoyl-L-carnitine | 39991.50676 | 6835.191376 | 10.84386905 | 0.081925517 |
| 577 | CRC12 | Dodecanoyl-L-carnitine | 6143.812706 | 962.7123197 | 10.84867571 | 0.090530183 |
| 584 | CRC13 | Dodecanoyl-L-carnitine | 37422.83502 | 6151.233748 | 10.84802666 | 0.08470011 |
| 591 | CRC14 | Dodecanoyl-L-carnitine | 14169.933 | 2343.354437 | 10.8423331 | 0.08990324 |
| 598 | CRC15 | Dodecanoyl-L-carnitine | 39885.85292 | 6497.369489 | 10.85588251 | 0.091030397 |
| 605 | CRC16 | Dodecanoyl-L-carnitine | 21326.7067 | 3372.997255 | 10.84205753 | 0.088998114 |
| 612 | CRC17 | Dodecanoyl-L-carnitine | 13413.91197 | 2357.607268 | 10.848598 | 0.083355156 |
| 619 | CRC18 | Dodecanoyl-L-carnitine | 14144.93495 | 2833.731965 | 10.84927197 | 0.075136554 |
| 626 | CRC19 | Dodecanoyl-L-carnitine | 10347.99036 | 1855.749592 | 10.85823127 | 0.074433889 |
| 633 | CRC20 | Dodecanoyl-L-carnitine | 21409.9207 | 4424.888846 | 10.8517661 | 0.064798774 |
| 640 | CRC21 | Dodecanoyl-L-carnitine | 10372.87205 | 1808.125568 | 10.85300413 | 0.076607754 |
| 647 | CRC22 | Dodecanoyl-L-carnitine | 16529.74259 | 2868.205538 | 10.85866058 | 0.08219953 |
| 654 | CRC23 | Dodecanoyl-L-carnitine | 34052.0257 | 5998.912229 | 10.85868266 | 0.07646165 |
| 661 | CRC24 | Dodecanoyl-L-carnitine | 13643.75648 | 2691.461773 | 10.86263476 | 0.064910538 |
| 668 | CRC25 | Dodecanoyl-L-carnitine | 29821.07104 | 5672.91931 | 10.85968627 | 0.069474342 |
| 675 | CRC26 | Dodecanoyl-L-carnitine | 23326.70759 | 4225.399169 | 10.85871435 | 0.079939877 |
| 682 | CRC27 | Dodecanoyl-L-carnitine | 15188.5637 | 2464.285712 | 10.84785538 | 0.083168944 |
| 689 | CRC28 | Dodecanoyl-L-carnitine | 26735.17154 | 5000.587836 | 10.84914525 | 0.083138467 |
| 696 | CRC29 | Dodecanoyl-L-carnitine | 11887.42746 | 2062.630655 | 10.8608084 | 0.076752788 |
| 703 | CRC30 | Dodecanoyl-L-carnitine | 6680.161813 | 1221.92179 | 10.85373352 | 0.085339537 |
| 710 | CRC31 | Dodecanoyl-L-carnitine | 12770.11923 | 2144.461154 | 10.84751589 | 0.086309351 |
| 717 | CRC32 | Dodecanoyl-L-carnitine | 12739.00822 | 2584.124901 | 10.84997613 | 0.078634114 |
| 724 | CRC33 | Dodecanoyl-L-carnitine | 8036.580462 | 1701.644867 | 10.85965961 | 0.063374906 |

TABLE 6-continued

| Index | Sample Name | Component Name | Area | Height | Retention Time | Width at 50% |
|---|---|---|---|---|---|---|
| 731 | CRC34 | Dodecanoyl-L-carnitine | 28885.15189 | 5343.215535 | 10.85419718 | 0.087858199 |
| 738 | CRC35 | Dodecanoyl-L-carnitine | 17788.90799 | 3287.301916 | 10.85207732 | 0.086339924 |
| 745 | CRC36 | Dodecanoyl-L-carnitine | 16586.56473 | 3190.89581 | 10.85196903 | 0.07969002 |
| 752 | CTL01 | Dodecanoyl-L-carnitine | 31411.7002 | 5734.828035 | 10.83967437 | 0.076292185 |
| 759 | CTL02 | Dodecanoyl-L-carnitine | 33464.95363 | 6257.987688 | 10.83798742 | 0.076112619 |
| 766 | CTL03 | Dodecanoyl-L-carnitine | 44217.75131 | 7757.473301 | 10.83315007 | 0.077934103 |
| 773 | CTL04 | Dodecanoyl-L-carnitine | 31207.82845 | 4977.333022 | 10.84453346 | 0.08330747 |
| 780 | CTL05 | Dodecanoyl-L-carnitine | 42923.65712 | 7327.442185 | 10.83831444 | 0.085193529 |
| 787 | CTL06 | Dodecanoyl-L-carnitine | 39433.61547 | 7687.904853 | 10.84256103 | 0.069095509 |
| 794 | CTL07 | Dodecanoyl-L-carnitine | 18696.94019 | 3505.02934 | 10.8497947 | 0.074054589 |
| 801 | CTL08 | Dodecanoyl-L-carnitine | 35888.12753 | 6729.217135 | 10.84162382 | 0.072981233 |
| 808 | CTL09 | Dodecanoyl-L-carnitine | 43518.12301 | 8385.365249 | 10.8417664 | 0.066710687 |
| 815 | CTL10 | Dodecanoyl-L-carnitine | 46084.15539 | 7624.107357 | 10.84379567 | 0.078923651 |
| 822 | CTL11 | Dodecanoyl-L-carnitine | 28902.76359 | 4708.460272 | 10.84125812 | 0.087536704 |
| 829 | CTL12 | Dodecanoyl-L-carnitine | 77121.91853 | 13427.0158 | 10.83875285 | 0.074475965 |
| 836 | CTL13 | Dodecanoyl-L-carnitine | 17115.61769 | 3356.478606 | 10.84701593 | 0.06999591 |
| 843 | CTL14 | Dodecanoyl-L-carnitine | 39539.04914 | 7154.634042 | 10.8509493 | 0.075800718 |
| 850 | CTL15 | Dodecanoyl-L-carnitine | 67913.95876 | 11878.40489 | 10.84832895 | 0.081965 |
| 857 | CTL16 | Dodecanoyl-L-carnitine | 39261.06134 | 6588.892435 | 10.84497264 | 0.087889943 |
| 864 | CTL17 | Dodecanoyl-L-carnitine | 28135.98112 | 4759.681585 | 10.841119 | 0.089400433 |
| 871 | CTL18 | Dodecanoyl-L-carnitine | 45572.186 | 7485.382978 | 10.84232263 | 0.087605766 |
| 878 | CTL19 | Dodecanoyl-L-carnitine | 244252.2126 | 42370.6337 | 10.84845244 | 0.073733556 |
| 885 | CTL20 | Dodecanoyl-L-carnitine | 62982.76945 | 10690.99657 | 10.8514728 | 0.081920964 |
| 892 | CTL21 | Dodecanoyl-L-carnitine | 133280.8578 | 22801.03592 | 10.85128706 | 0.084021206 |
| 899 | CTL22 | Dodecanoyl-L-carnitine | 106514.217 | 17947.84727 | 10.8526918 | 0.079981154 |
| 906 | CTL23 | Dodecanoyl-L-carnitine | 47077.42025 | 7508.29221 | 10.84536176 | 0.087753642 |
| 913 | CTL24 | Dodecanoyl-L-carnitine | 43191.42915 | 7878.872523 | 10.84837651 | 0.0780358 |
| 920 | CTL25 | Dodecanoyl-L-carnitine | 145426.2915 | 24215.58158 | 10.85295257 | 0.088585602 |
| 927 | CTL26 | Dodecanoyl-L-carnitine | 27395.15181 | 4676.269647 | 10.85432529 | 0.085862667 |
| 934 | CTL27 | Dodecanoyl-L-carnitine | 49199.41095 | 8275.882657 | 10.84608898 | 0.088105304 |
| 941 | CTL28 | Dodecanoyl-L-carnitine | 66454.23979 | 11409.70161 | 10.85344268 | 0.083876694 |
| 948 | CTL29 | Dodecanoyl-L-carnitine | 54305.70219 | 9433.76422 | 10.85695168 | 0.082916233 |
| 955 | CTL30 | Dodecanoyl-L-carnitine | 51791.03497 | 8891.15523 | 10.84787579 | 0.077149695 |
| 962 | CTL31 | Dodecanoyl-L-carnitine | 38346.62657 | 6389.38547 | 10.85395272 | 0.079107828 |
| 969 | CTL32 | Dodecanoyl-L-carnitine | 32521.62303 | 5609.697911 | 10.84807183 | 0.079133182 |
| 976 | CTL33 | Dodecanoyl-L-carnitine | 55666.59503 | 10155.55372 | 10.85067924 | 0.078216598 |
| 983 | CTL34 | Dodecanoyl-L-carnitine | 27183.52073 | 4407.358056 | 10.84673248 | 0.081910205 |
| 990 | CTL35 | Dodecanoyl-L-carnitine | 42665.78924 | 7729.038073 | 10.85809201 | 0.079561258 |

TABLE 6-continued

| Index | Sample Name | Component Name | Area | Height | Retention Time | Width at 50% |
|---|---|---|---|---|---|---|
| 997 | CTL36 | Dodecanoyl-L-carnitine | 144762.3838 | 22472.549 | 10.85897485 | 0.084767289 |
| 1004 | PRC01 | Dodecanoyl-L-carnitine | 8364.487519 | 1587.946249 | 10.84936935 | 0.068140755 |
| 1011 | PRC02 | Dodecanoyl-L-carnitine | 10691.61279 | 1983.799359 | 10.83996776 | 0.071114593 |
| 1018 | PRC03 | Dodecanoyl-L-carnitine | 10281.88823 | 1704.65673 | 10.84752728 | 0.069807072 |
| 1025 | PRC04 | Dodecanoyl-L-carnitine | 12535.01512 | 2298.829808 | 10.8436585 | 0.072696151 |
| 1032 | PRC05 | Dodecanoyl-L-carnitine | 27410.24726 | 5202.764602 | 10.8485282 | 0.069648557 |
| 1039 | PRC06 | Dodecanoyl-L-carnitine | 9598.608139 | 1612.611704 | 10.84679283 | 0.078061816 |
| 1046 | PRC07 | Dodecanoyl-L-carnitine | 9134.787008 | 1570.374979 | 10.84539876 | 0.077025667 |
| 1053 | PRC08 | Dodecanoyl-L-carnitine | 16466.37312 | 2771.957757 | 10.84223095 | 0.075778172 |
| 1060 | PRC09 | Dodecanoyl-L-carnitine | 41628.3205 | 7155.493727 | 10.85037518 | 0.077281945 |
| 1067 | PRC10 | Dodecanoyl-L-carnitine | 31058.83195 | 5087.203902 | 10.85535083 | 0.08216737 |
| 1074 | PRC11 | Dodecanoyl-L-carnitine | 21927.91892 | 4366.217029 | 10.84736641 | 0.067933888 |
| 1081 | PRC12 | Dodecanoyl-L-carnitine | 46162.22875 | 8888.751384 | 10.86083698 | 0.070189101 |
| 1088 | PRC13 | Dodecanoyl-L-carnitine | 15826.25352 | 2928.687388 | 10.84978635 | 0.070658605 |
| 1095 | PRC14 | Dodecanoyl-L-carnitine | 19295.92313 | 3372.69975 | 10.85435549 | 0.082089141 |
| 1102 | PRC15 | Dodecanoyl-L-carnitine | 23496.49123 | 4469.16577 | 10.84745475 | 0.067900941 |
| 1109 | PRC16 | Dodecanoyl-L-carnitine | 16308.11656 | 2704.871106 | 10.85362436 | 0.081360895 |
| 1116 | PRC17 | Dodecanoyl-L-carnitine | 62870.54073 | 11034.41438 | 10.85049985 | 0.083015642 |
| 1123 | PRC18 | Dodecanoyl-L-carnitine | 19910.61285 | 3269.11175 | 10.85747627 | 0.089333094 |
| 1130 | PRC19 | Dodecanoyl-L-carnitine | 5440.22536 | 939.7635941 | 10.85246736 | 0.091710627 |
| 1137 | PRC20 | Dodecanoyl-L-carnitine | 3331.125186 | 509.4334726 | 10.85492559 | 0.091286046 |
| 1144 | PRC21 | Dodecanoyl-L-carnitine | 7403.213274 | 1182.986164 | 10.85533523 | 0.092501225 |
| 1151 | PRC22 | Dodecanoyl-L-carnitine | 6395.836837 | 1142.648079 | 10.85111027 | 0.080308401 |
| 1158 | PRC23 | Dodecanoyl-L-carnitine | 48489.00075 | 8452.208534 | 10.8547798 | 0.081873408 |
| 1165 | PRC24 | Dodecanoyl-L-carnitine | 11306.32116 | 1760.84043 | 10.85908024 | 0.084609376 |
| 1172 | PRC25 | Dodecanoyl-L-carnitine | 4000.022884 | 707.8364438 | 10.8585595 | 0.080517003 |
| 1179 | PRC26 | Dodecanoyl-L-carnitine | 8948.642017 | 1529.824089 | 10.84725967 | 0.088241904 |
| 1186 | PRC27 | Dodecanoyl-L-carnitine | 19412.87515 | 3222.930961 | 10.85002611 | 0.086709872 |
| 1193 | PRC28 | Dodecanoyl-L-carnitine | 5455.878969 | 1034.550081 | 10.85804925 | 0.076191717 |
| 1200 | PRC29 | Dodecanoyl-L-carnitine | 13083.84816 | 2222.178074 | 10.84856583 | 0.088775285 |
| 1207 | PRC30 | Dodecanoyl-L-carnitine | 10340.09544 | 1756.861192 | 10.86301176 | 0.086202944 |
| 1214 | PRC31 | Dodecanoyl-L-carnitine | 5303.014278 | 1152.171601 | 10.85703362 | 0.064855101 |
| 1221 | PRC32 | Dodecanoyl-L-carnitine | 6830.330565 | 1278.427317 | 10.8585502 | 0.085099466 |
| 1228 | PRC33 | Dodecanoyl-L-carnitine | 16159.53435 | 2663.647489 | 10.8550104 | 0.085721508 |
| 1235 | PRC34 | Dodecanoyl-L-carnitine | 13509.2411 | 2319.857269 | 10.85869254 | 0.090109294 |
| 1242 | PRC35 | Dodecanoyl-L-carnitine | 16419.78275 | 3353.261586 | 10.85725976 | 0.071360267 |
| 1249 | PRC36 | Dodecanoyl-L-carnitine | 13509.35115 | 2555.404211 | 10.8529699 | 0.077799302 |

TABLE 7

| Index | Sample Name | Component Name | Area | Height | Retention Time | Width at 50% |
|---|---|---|---|---|---|---|
| 4 | Hu_Normal_Serum_1_4_10 uL | Palmitoyl-L-carnitine | 1809.753932 | 275.8812916 | 13.24779582 | 0.104924676 |
| 11 | HC + MeOH_1_4_10 uL | Palmitoyl-L-carnitine | 5112.268574 | 539.9936856 | 13.24087768 | 0.117087832 |
| 18 | HC + Serum_1_4_10 uL | Palmitoyl-L-carnitine | 3035.547058 | 432.6913996 | 13.24430389 | 0.107243483 |
| 25 | OC + MeOH_1_4_10 uL | Palmitoyl-L-carnitine | 1938.34346 | 259.780592 | 13.24451238 | 0.121282121 |
| 32 | OC + Serum_1_4_10 uL | Palmitoyl-L-carnitine | 2732.758646 | 418.4851085 | 13.24254239 | 0.100813975 |
| 39 | DC + MeOH_1_4_10 uL | Palmitoyl-L-carnitine | 13904.67881 | 1620.19413 | 13.2502028 | 0.111999359 |
| 46 | DC + Serum_1_4_10 uL | Palmitoyl-L-carnitine | 769.5302761 | 121.3590331 | 13.24112379 | 0.090504992 |
| 53 | PC + Serum_1_4_10 uL | Palmitoyl-L-carnitine | 63792964.19 | 7635885.571 | 13.22412131 | 0.114498083 |
| 60 | PC + Serum_sup_10 uL | Palmitoyl-L-carnitine | 187425474.5 | 10251649.8 | 13.23913569 | 0.307244624 |
| 67 | 2PY_0100 | Palmitoyl-L-carnitine | 152.7068083 | 30.31491691 | 13.41361001 | 0.073081755 |
| 74 | Serum + 2PY_0100 | Palmitoyl-L-carnitine | 1223.970057 | 389.7143439 | 13.34623144 | 0.048135537 |
| 81 | LPC16_0100 | Palmitoyl-L-carnitine | 43.27413307 | 9.777540212 | 13.40720946 | 0.067861827 |
| 88 | Serum + LPC16_0100 | Palmitoyl-L-carnitine | 337.7515654 | 94.27285798 | 13.35883741 | 0.053393769 |
| 95 | LPC18_0100 | Palmitoyl-L-carnitine | 42.04038529 | 13.54903474 | 13.42277459 | 0.046002984 |
| 102 | Serum + LPC18_0100 | Palmitoyl-L-carnitine | 629.8446278 | 190.7100495 | 13.36034445 | 0.052114532 |
| 109 | 06-1(1_4) | Palmitoyl-L-carnitine | 3535.032074 | 609.9304542 | 13.24333046 | 0.084605157 |
| 116 | 06-2(1_4) | Palmitoyl-L-carnitine | 4767.491049 | 829.7970285 | 13.24621343 | 0.093248337 |
| 123 | 07-1(1_4) | Palmitoyl-L-carnitine | 4194.899165 | 729.0125844 | 13.24238535 | 0.084337108 |
| 130 | 07-2(1_4) | Palmitoyl-L-carnitine | 1440.638439 | 236.7690741 | 13.25160764 | 0.087284167 |
| 137 | 08-1(1_4) | Palmitoyl-L-carnitine | 5909.052405 | 916.837952 | 13.23966969 | 0.094708587 |
| 144 | 08-2(1_4) | Palmitoyl-L-carnitine | 6010.396282 | 980.770855 | 13.24278847 | 0.08990143 |
| 151 | 09-1(1_4) | Palmitoyl-L-carnitine | 3772.058356 | 612.7187015 | 13.24331961 | 0.088061519 |
| 158 | 09-2(1_4) | Palmitoyl-L-carnitine | 4579.141364 | 688.0381542 | 13.24207855 | 0.102718551 |
| 165 | 10-1(1_4) | Palmitoyl-L-carnitine | 1786.407427 | 276.1245396 | 13.24953963 | 0.097580456 |
| 172 | 10-2(1_4) | Palmitoyl-L-carnitine | 1401.333525 | 175.5323995 | 13.23906423 | 0.128746631 |
| 179 | 11-1(1_4) | Palmitoyl-L-carnitine | 4061.139816 | 618.3964127 | 13.23857593 | 0.107638342 |
| 186 | 11-2(1_4) | Palmitoyl-L-carnitine | 2124.479403 | 334.3677296 | 13.22789388 | 0.099252945 |
| 193 | 12-1(1_4) | Palmitoyl-L-carnitine | 5360.191178 | 763.2953664 | 13.23539652 | 0.107053973 |
| 200 | 12-2(1_4) | Palmitoyl-L-carnitine | 4447.9882 | 693.9481815 | 13.23332518 | 0.098460316 |
| 207 | 13-1(1_4) | Palmitoyl-L-carnitine | 5633.864413 | 865.736835 | 13.23295619 | 0.095361356 |
| 214 | 13-2(1_4) | Palmitoyl-L-carnitine | 4173.582604 | 584.826312 | 13.23566824 | 0.109611898 |
| 221 | 14-1(1_4) | Palmitoyl-L-carnitine | 7569.874833 | 1056.053697 | 13.23160887 | 0.105224981 |
| 228 | 14-2(1_4) | Palmitoyl-L-carnitine | 4612.802867 | 644.948878 | 13.2211821 | 0.112621948 |
| 235 | 15-1(1_4) | Palmitoyl-L-carnitine | 3294.143425 | 471.7853532 | 13.22893526 | 0.102623351 |
| 242 | 15-2(1_4) | Palmitoyl-L-carnitine | 6124.418003 | 844.2872339 | 13.22087336 | 0.109636297 |
| 249 | BDC01 | Palmitoyl-L-carnitine | 18226.19822 | 2405.936346 | 13.23598734 | 0.100876565 |
| 256 | BDC02 | Palmitoyl-L-carnitine | 21155.80478 | 3071.184774 | 13.24005942 | 0.094869514 |
| 263 | BDC03 | Palmitoyl-L-carnitine | 10078.24437 | 1439.409466 | 13.24629569 | 0.105018826 |

TABLE 7-continued

| Index | Sample Name | Component Name | Area | Height | Retention Time | Width at 50% |
|---|---|---|---|---|---|---|
| 270 | BDC04 | Palmitoyl-L-carnitine | 11501.74586 | 1646.930314 | 13.22817057 | 0.103747482 |
| 277 | BDC05 | Palmitoyl-L-carnitine | 24246.80935 | 3825.585952 | 13.2439807 | 0.088825713 |
| 284 | BDC06 | Palmitoyl-L-carnitine | 35891.14166 | 4638.511901 | 13.23181609 | 0.112284529 |
| 291 | BDC07 | Palmitoyl-L-carnitine | 35273.64455 | 4137.36259 | 13.22872016 | 0.12758912 |
| 298 | BDC08 | Palmitoyl-L-carnitine | 16863.8338 | 2368.100508 | 13.23714252 | 0.101262446 |
| 305 | BDC09 | Palmitoyl-L-carnitine | 16556.10759 | 2072.862728 | 13.23311041 | 0.113406875 |
| 312 | BDC10 | Palmitoyl-L-carnitine | 46026.29566 | 5346.555374 | 13.24023906 | 0.124424029 |
| 319 | BDC11 | Palmitoyl-L-carnitine | 101099.2903 | 11896.38569 | 13.22666144 | 0.12105071 |
| 326 | BDC12 | Palmitoyl-L-carnitine | 38525.11842 | 5067.778999 | 13.25216796 | 0.108453094 |
| 333 | BDC13 | Palmitoyl-L-carnitine | 41420.40181 | 5327.776546 | 13.2400862 | 0.108129729 |
| 340 | BDC14 | Palmitoyl-L-carnitine | 70152.77297 | 8832.226795 | 13.24659588 | 0.107207722 |
| 347 | BDC15 | Palmitoyl-L-carnitine | 78539.80328 | 10180.72543 | 13.24274138 | 0.106944914 |
| 354 | BDC16 | Palmitoyl-L-carnitine | 24814.96733 | 2778.406215 | 13.24476101 | 0.120450433 |
| 361 | BDC17 | Palmitoyl-L-carnitine | 84036.28215 | 10285.28837 | 13.24592918 | 0.107244934 |
| 368 | BDC18 | Palmitoyl-L-carnitine | 45786.95888 | 6299.658729 | 13.24932573 | 0.104842869 |
| 375 | BDC19 | Palmitoyl-L-carnitine | 19736.61988 | 2841.171636 | 13.25790114 | 0.091022634 |
| 382 | BDC20 | Palmitoyl-L-carnitine | 45869.87045 | 6349.903713 | 13.26080131 | 0.097898908 |
| 389 | BDC21 | Palmitoyl-L-carnitine | 12398.06495 | 1878.853026 | 13.26643468 | 0.097269518 |
| 396 | BDC22 | Palmitoyl-L-carnitine | 11783.56553 | 1705.003005 | 13.25619642 | 0.103342118 |
| 403 | BDC23 | Palmitoyl-L-carnitine | 17081.9781 | 2606.465379 | 13.26609636 | 0.092986813 |
| 410 | BDC24 | Palmitoyl-L-carnitine | 21154.44557 | 2827.834128 | 13.25431062 | 0.104398125 |
| 417 | BDC25 | Palmitoyl-L-carnitine | 4005.353254 | 600.8750293 | 13.26157165 | 0.098107237 |
| 424 | BDC26 | Palmitoyl-L-carnitine | 24982.24305 | 3780.314803 | 13.25892683 | 0.088970495 |
| 431 | BDC27 | Palmitoyl-L-carnitine | 43560.26557 | 6052.563868 | 13.2609848 | 0.099952858 |
| 438 | BDC28 | Palmitoyl-L-carnitine | 13930.53042 | 2037.915586 | 13.25598364 | 0.092519942 |
| 445 | BDC29 | Palmitoyl-L-carnitine | 24315.15841 | 4143.054224 | 13.25843065 | 0.075108782 |
| 452 | BDC30 | Palmitoyl-L-carnitine | 44533.74428 | 6354.829152 | 13.26515766 | 0.100927269 |
| 459 | BDC31 | Palmitoyl-L-carnitine | 36020.12621 | 4964.486361 | 13.25885178 | 0.095717354 |
| 466 | BDC32 | Palmitoyl-L-carnitine | 43083.16949 | 6438.151132 | 13.26418864 | 0.093737504 |
| 473 | BDC33 | Palmitoyl-L-carnitine | 39464.09803 | 6118.978806 | 13.26224417 | 0.091754401 |
| 480 | BDC34 | Palmitoyl-L-carnitine | 9884.059606 | 1539.734942 | 13.26698985 | 0.082333966 |
| 487 | BDC35 | Palmitoyl-L-carnitine | 25764.05457 | 3926.178147 | 13.25459004 | 0.088554865 |
| 494 | BDC36 | Palmitoyl-L-carnitine | 7616.518929 | 1131.939769 | 13.27176902 | 0.098726609 |
| 501 | CRC01 | Palmitoyl-L-carnitine | 58799.4907 | 6509.078573 | 13.23086647 | 0.124298917 |
| 508 | CRC02 | Palmitoyl-L-carnitine | 120517.3621 | 13154.37217 | 13.23158132 | 0.128658777 |
| 515 | CRC03 | Palmitoyl-L-carnitine | 38834.9221 | 4552.721502 | 13.23256735 | 0.112295775 |
| 522 | CRC04 | Palmitoyl-L-carnitine | 37424.64232 | 4272.8137 | 13.23258898 | 0.118636386 |
| 529 | CRC05 | Palmitoyl-L-carnitine | 54828.42919 | 6590.700707 | 13.22981339 | 0.111808825 |

TABLE 7-continued

| Index | Sample Name | Component Name | Area | Height | Retention Time | Width at 50% |
|---|---|---|---|---|---|---|
| 536 | CRC06 | Palmitoyl-L-carnitine | 31368.81746 | 3639.403709 | 13.22305281 | 0.12596469 |
| 543 | CRC07 | Palmitoyl-L-carnitine | 59006.07483 | 7186.504209 | 13.23963656 | 0.115422046 |
| 550 | CRC08 | Palmitoyl-L-carnitine | 48800.8739 | 5901.635881 | 13.24132043 | 0.118056058 |
| 557 | CRC09 | Palmitoyl-L-carnitine | 56268.10631 | 6297.243575 | 13.2333586 | 0.128232864 |
| 564 | CRC10 | Palmitoyl-L-carnitine | 48205.14956 | 6808.452316 | 13.24825621 | 0.100910163 |
| 571 | CRC11 | Palmitoyl-L-carnitine | 88315.40751 | 12160.26754 | 13.24952794 | 0.100446333 |
| 578 | CRC12 | Palmitoyl-L-carnitine | 4546.270051 | 685.2482365 | 13.25844625 | 0.096383678 |
| 585 | CRC13 | Palmitoyl-L-carnitine | 33716.86943 | 4584.231478 | 13.25304429 | 0.104785368 |
| 592 | CRC14 | Palmitoyl-L-carnitine | 29084.28898 | 4512.900227 | 13.24659874 | 0.08842411 |
| 599 | CRC15 | Palmitoyl-L-carnitine | 64137.31947 | 9190.731417 | 13.25534973 | 0.095370015 |
| 606 | CRC16 | Palmitoyl-L-carnitine | 49380.20516 | 6471.86577 | 13.24743799 | 0.106486406 |
| 613 | CRC17 | Palmitoyl-L-carnitine | 21941.01046 | 3032.727995 | 13.25425996 | 0.105609305 |
| 620 | CRC18 | Palmitoyl-L-carnitine | 27649.30771 | 3879.31151 | 13.25041398 | 0.100041599 |
| 627 | CRC19 | Palmitoyl-L-carnitine | 51646.71355 | 7305.341788 | 13.26780507 | 0.103593196 |
| 634 | CRC20 | Palmitoyl-L-carnitine | 43484.09044 | 6076.442385 | 13.25290029 | 0.100115884 |
| 641 | CRC21 | Palmitoyl-L-carnitine | 23431.85846 | 3326.364886 | 13.26404235 | 0.098864431 |
| 648 | CRC22 | Palmitoyl-L-carnitine | 20927.06739 | 2894.214241 | 13.26805498 | 0.098659509 |
| 655 | CRC23 | Palmitoyl-L-carnitine | 34756.04091 | 4711.851808 | 13.26420426 | 0.102571382 |
| 662 | CRC24 | Palmitoyl-L-carnitine | 67216.27136 | 10253.85528 | 13.27053267 | 0.090913752 |
| 669 | CRC25 | Palmitoyl-L-carnitine | 117603.4709 | 13503.33039 | 13.27041831 | 0.121675026 |
| 676 | CRC26 | Palmitoyl-L-carnitine | 46935.9801 | 6840.108686 | 13.26546308 | 0.090152082 |
| 683 | CRC27 | Palmitoyl-L-carnitine | 37821.20009 | 4804.355466 | 13.26131533 | 0.10651689 |
| 690 | CRC28 | Palmitoyl-L-carnitine | 40963.82398 | 5841.136896 | 13.24864043 | 0.08818054 |
| 697 | CRC29 | Palmitoyl-L-carnitine | 28783.24315 | 4317.447704 | 13.26090875 | 0.085796544 |
| 704 | CRC30 | Palmitoyl-L-carnitine | 26669.80443 | 3515.493971 | 13.25837315 | 0.095743088 |
| 711 | CRC31 | Palmitoyl-L-carnitine | 27355.40887 | 4010.31783 | 13.25257385 | 0.093797454 |
| 718 | CRC32 | Palmitoyl-L-carnitine | 21443.74299 | 3265.838661 | 13.25855638 | 0.084592363 |
| 725 | CRC33 | Palmitoyl-L-carnitine | 15601.88939 | 2047.595323 | 13.26536297 | 0.101065215 |
| 732 | CRC34 | Palmitoyl-L-carnitine | 16650.80516 | 2335.580793 | 13.26382589 | 0.091721958 |
| 739 | CRC35 | Palmitoyl-L-carnitine | 23542.37614 | 3133.992087 | 13.26029144 | 0.096387205 |
| 746 | CRC36 | Palmitoyl-L-carnitine | 82586.68598 | 13212.51411 | 13.25841561 | 0.087608524 |
| 753 | CTL01 | Palmitoyl-L-carnitine | 39560.20939 | 3982.662189 | 13.23308943 | 0.136969353 |
| 760 | CTL02 | Palmitoyl-L-carnitine | 60493.27777 | 6443.35341 | 13.23416922 | 0.128175418 |
| 767 | CTL03 | Palmitoyl-L-carnitine | 35122.27218 | 4218.147465 | 13.22909607 | 0.112476573 |
| 774 | CTL04 | Palmitoyl-L-carnitine | 138754.9897 | 18138.03245 | 13.23032589 | 0.107006641 |
| 781 | CTL05 | Palmitoyl-L-carnitine | 33794.1719 | 3671.10094 | 13.22420516 | 0.133166353 |
| 788 | CTL06 | Palmitoyl-L-carnitine | 40991.78632 | 4702.102917 | 13.22582237 | 0.112719312 |

TABLE 7-continued

| Index | Sample Name | Component Name | Area | Height | Retention Time | Width at 50% |
|---|---|---|---|---|---|---|
| 795 | CTL07 | Palmitoyl-L-carnitine | 26335.81883 | 2966.599805 | 13.22787071 | 0.123924022 |
| 802 | CTL08 | Palmitoyl-L-carnitine | 77059.88135 | 10149.73898 | 13.23337208 | 0.100327737 |
| 809 | CTL09 | Palmitoyl-L-carnitine | 43238.63926 | 5705.648401 | 13.22763695 | 0.105789884 |
| 816 | CTL10 | Palmitoyl-L-carnitine | 65139.47427 | 7932.896921 | 13.23192304 | 0.118927179 |
| 823 | CTL11 | Palmitoyl-L-carnitine | 47800.67555 | 6282.850219 | 13.24053673 | 0.107300522 |
| 830 | CTL12 | Palmitoyl-L-carnitine | 48124.64761 | 6000.502121 | 13.22786003 | 0.11787813 |
| 837 | CTL13 | Palmitoyl-L-carnitine | 36632.95391 | 4910.56534 | 13.23895084 | 0.10849431 |
| 844 | CTL14 | Palmitoyl-L-carnitine | 48816.51064 | 6216.572562 | 13.24255587 | 0.111971716 |
| 851 | CTL15 | Palmitoyl-L-carnitine | 40539.81741 | 4382.732061 | 13.23278019 | 0.133697042 |
| 858 | CTL16 | Palmitoyl-L-carnitine | 41448.36285 | 5337.937627 | 13.23668452 | 0.10692827 |
| 865 | CTL17 | Palmitoyl-L-carnitine | 40726.50233 | 4585.486665 | 13.22529432 | 0.132208199 |
| 872 | CTL18 | Palmitoyl-L-carnitine | 41094.10943 | 4727.067193 | 13.22474471 | 0.135272824 |
| 879 | CTL19 | Palmitoyl-L-carnitine | 77212.94534 | 9717.413953 | 13.25293406 | 0.109473486 |
| 886 | CTL20 | Palmitoyl-L-carnitine | 103149.4924 | 14144.69508 | 13.25386499 | 0.099102949 |
| 893 | CTL21 | Palmitoyl-L-carnitine | 54068.82787 | 6989.425746 | 13.25667919 | 0.103733522 |
| 900 | CTL22 | Palmitoyl-L-carnitine | 86737.26613 | 12080.54362 | 13.25639773 | 0.099426196 |
| 907 | CTL23 | Palmitoyl-L-carnitine | 170877.317 | 23450.63251 | 13.24598942 | 0.101083467 |
| 914 | CTL24 | Palmitoyl-L-carnitine | 49677.15152 | 6740.060669 | 13.25165604 | 0.097221604 |
| 921 | CTL25 | Palmitoyl-L-carnitine | 63826.78924 | 8392.024684 | 13.25819883 | 0.106397764 |
| 928 | CTL26 | Palmitoyl-L-carnitine | 54283.08455 | 7394.98732 | 13.25886807 | 0.102052549 |
| 935 | CTL27 | Palmitoyl-L-carnitine | 47206.09807 | 6088.463736 | 13.24844175 | 0.106650661 |
| 942 | CTL28 | Palmitoyl-L-carnitine | 31830.49664 | 4696.474645 | 13.26392265 | 0.092841094 |
| 949 | CTL29 | Palmitoyl-L-carnitine | 79765.74694 | 10921.62868 | 13.26399334 | 0.104503539 |
| 956 | CTL30 | Palmitoyl-L-carnitine | 54285.92058 | 6979.674626 | 13.25545993 | 0.107985229 |
| 963 | CTL31 | Palmitoyl-L-carnitine | 37916.09131 | 4680.240981 | 13.25850252 | 0.117378872 |
| 970 | CTL32 | Palmitoyl-L-carnitine | 26433.88356 | 3860.920956 | 13.25464797 | 0.091814645 |
| 977 | CTL33 | Palmitoyl-L-carnitine | 43985.69418 | 6531.257256 | 13.25536169 | 0.098435891 |
| 984 | CTL34 | Palmitoyl-L-carnitine | 44108.58321 | 6247.710188 | 13.25895193 | 0.095597433 |
| 991 | CTL35 | Palmitoyl-L-carnitine | 42839.63373 | 6281.567656 | 13.26487251 | 0.087883937 |
| 998 | CTL36 | Palmitoyl-L-carnitine | 30599.15063 | 4767.027721 | 13.26082242 | 0.078580409 |
| 1005 | PRC01 | Palmitoyl-L-carnitine | 19002.05871 | 2184.145191 | 13.23377367 | 0.120689692 |
| 1012 | PRC02 | Palmitoyl-L-carnitine | 21174.8942 | 2848.733589 | 13.23287043 | 0.106216222 |
| 1019 | PRC03 | Palmitoyl-L-carnitine | 24858.47888 | 3666.546856 | 13.24046663 | 0.098196244 |
| 1026 | PRC04 | Palmitoyl-L-carnitine | 41866.87 | 5653.59036 | 13.2395618 | 0.106463338 |
| 1033 | PRC05 | Palmitoyl-L-carnitine | 29519.1026 | 3373.201332 | 13.23879338 | 0.122896979 |
| 1040 | PRC06 | Palmitoyl-L-carnitine | 21630.34101 | 2487.448576 | 13.23993114 | 0.132552632 |
| 1047 | PRC07 | Palmitoyl-L-carnitine | 29324.73604 | 3926.531632 | 13.23777267 | 0.102920367 |
| 1054 | PRC08 | Palmitoyl-L-carnitine | 31927.55587 | 4072.52896 | 13.23952416 | 0.106674781 |

TABLE 7-continued

| Sample Index | Name | Component Name | Area | Height | Retention Time | Width at 50% |
|---|---|---|---|---|---|---|
| 1061 | PRC09 | Palmitoyl-L-carnitine | 45831.8314 | 5724.411886 | 13.23689573 | 0.112571502 |
| 1068 | PRC10 | Palmitoyl-L-carnitine | 67667.40487 | 9263.635671 | 13.25389598 | 0.104046322 |
| 1075 | PRC11 | Palmitoyl-L-carnitine | 40294.29591 | 6039.00172 | 13.25048993 | 0.097074397 |
| 1082 | PRC12 | Palmitoyl-L-carnitine | 47669.11669 | 6008.464591 | 13.26153404 | 0.107759251 |
| 1089 | PRC13 | Palmitoyl-L-carnitine | 39602.05134 | 5419.108014 | 13.25022909 | 0.100566694 |
| 1096 | PRC14 | Palmitoyl-L-carnitine | 38264.29141 | 5408.564727 | 13.2576827 | 0.104282594 |
| 1103 | PRC15 | Palmitoyl-L-carnitine | 23896.08537 | 3358.393149 | 13.25118487 | 0.099635966 |
| 1110 | PRC16 | Palmitoyl-L-carnitine | 92056.28273 | 12094.42242 | 13.25429473 | 0.105952763 |
| 1117 | PRC17 | Palmitoyl-L-carnitine | 30763.81294 | 4275.032689 | 13.24982643 | 0.097940138 |
| 1124 | PRC18 | Palmitoyl-L-carnitine | 23983.01538 | 3208.707132 | 13.26027012 | 0.104971737 |
| 1131 | PRC19 | Palmitoyl-L-carnitine | 5894.810423 | 912.388812 | 13.2590303 | 0.085548315 |
| 1138 | PRC20 | Palmitoyl-L-carnitine | 19631.32885 | 2752.277471 | 13.25469217 | 0.094534575 |
| 1145 | PRC21 | Palmitoyl-L-carnitine | 39040.91318 | 5539.630221 | 13.26796365 | 0.100990729 |
| 1152 | PRC22 | Palmitoyl-L-carnitine | 20719.23912 | 3219.226151 | 13.25691088 | 0.101312106 |
| 1159 | PRC23 | Palmitoyl-L-carnitine | 46152.78338 | 6279.319545 | 13.26066612 | 0.100701776 |
| 1166 | PRC24 | Palmitoyl-L-carnitine | 26610.50919 | 3694.470729 | 13.25854015 | 0.095754298 |
| 1173 | PRC25 | Palmitoyl-L-carnitine | 13547.32215 | 1965.233778 | 13.26767331 | 0.085293006 |
| 1180 | PRC26 | Palmitoyl-L-carnitine | 12836.91439 | 1781.529805 | 13.25814478 | 0.093326113 |
| 1187 | PRC27 | Palmitoyl-L-carnitine | 19351.41205 | 2331.451967 | 13.25771593 | 0.11465783 |
| 1194 | PRC28 | Palmitoyl-L-carnitine | 12598.20162 | 2225.351633 | 13.27233255 | 0.081309849 |
| 1201 | PRC29 | Palmitoyl-L-carnitine | 46534.93428 | 7818.551634 | 13.26344439 | 0.083315053 |
| 1208 | PRC30 | Palmitoyl-L-carnitine | 14651.22008 | 2192.164775 | 13.26567374 | 0.085083802 |
| 1215 | PRC31 | Palmitoyl-L-carnitine | 12298.9477 | 1999.724715 | 13.26208529 | 0.081422585 |
| 1222 | PRC32 | Palmitoyl-L-carnitine | 11823.26869 | 1791.974453 | 13.26511483 | 0.084478747 |
| 1229 | PRC33 | Palmitoyl-L-carnitine | 13006.948 | 2007.754581 | 13.2644911 | 0.085017238 |
| 1236 | PRC34 | Palmitoyl-L-carnitine | 24676.72462 | 3369.857352 | 13.26785295 | 0.099812917 |
| 1243 | PRC35 | Palmitoyl-L-carnitine | 27895.11924 | 4244.497162 | 13.27161826 | 0.090704756 |
| 1250 | PRC36 | Palmitoyl-L-carnitine | 14801.77746 | 2332.009824 | 13.2662462 | 0.094067309 |

In addition, Table 8 below shows the relative quantification values (mass peak areas) of 2PY in blood from cancer patient groups and a normal control, Table 9 below shows the relative quantification values (mass peak areas) of LPC16 in blood from cancer patient groups and a normal control, and Table 10 below shows the relative quantification values (mass peak areas) of LPC18 in blood from cancer patient groups and a normal control, which is the data of FIG. 3.

TABLE 8

| Sample Index | Name | Component Name | Area | Height | Retention Time | Width at 50% |
|---|---|---|---|---|---|---|
| 5 | Hu_Normal_Serum_1_4_10 uL | Nudifloramide(2PY) | 28.13817793 | 6.483591177 | 4.314610317 | 0.071382784 |
| 12 | HC + MeOH_1_4_10 uL | Nudifloramide(2PY) | 22.06839757 | 4.300742251 | 4.527153684 | 0.086847464 |
| 19 | HC + Serum_1_4_10 uL | Nudifloramide(2PY) | 24.84256203 | 5.835065259 | 4.142960333 | 0.079063878 |
| 26 | OC + MeOH_1_4_10 uL | Nudifloramide(2PY) | 86.85947971 | 10.67060871 | 4.296431774 | 0.132466176 |
| 33 | OC + Serum_1_4_10 uL | Nudifloramide(2PY) | 27.63595742 | 5.356444302 | 4.403765604 | 0.094316202 |
| 40 | DC + MeOH_1_4_10 uL | Nudifloramide(2PY) | 42.51175464 | 6.788027177 | 4.055337233 | 0.101802721 |

TABLE 8-continued

| Index | Sample Name | Component Name | Area | Height | Retention Time | Width at 50% |
|---|---|---|---|---|---|---|
| 47 | DC + Serum_1_4_10 uL | Nudifloramide(2PY) | 26.16726197 | 6.978723023 | 4.374335261 | 0.060317783 |
| 54 | PC + Serum_1_4_10 uL | Nudifloramide(2PY) | 21.17705827 | 4.705489775 | 4.113474733 | 0.070883633 |
| 61 | PC + Serum_sup_10 uL | Nudifloramide(2PY) | 67.29562172 | 8.338216287 | 4.368407221 | 0.142712344 |
| 68 | 2PY_0100 | Nudifloramide(2PY) | 5761.818304 | 236.5145862 | 4.299788246 | 0.340306782 |
| 75 | Serum + 2PY_0100 | Nudifloramide(2PY) | 1815.848062 | 255.791478 | 4.432740893 | 0.10642113 |
| 82 | LPC16_0100 | Nudifloramide(2PY) | 7.943185302 | 3.090717135 | 4.2898246 | 0.040883254 |
| 89 | Serum + LPC16_0100 | Nudifloramide(2PY) | 1049.467785 | 138.9092187 | 4.311739516 | 0.111404091 |
| 96 | LPC18_0100 | Nudifloramide(2PY) | 16.13788984 | 2.784170846 | 4.538402568 | 0.125498038 |
| 103 | Serum + LPC18_0100 | Nudifloramide(2PY) | 713.612233 | 96.71448735 | 4.318728893 | 0.10715535 |
| 110 | 06-1(1_4) | Nudifloramide(2PY) | 10138.64144 | 1143.545283 | 4.321353332 | 0.119259549 |
| 117 | 06-2(1_4) | Nudifloramide(2PY) | 16085.29464 | 1724.276615 | 4.320809069 | 0.126631941 |
| 124 | 07-1(1_4) | Nudifloramide(2PY) | 7206.152772 | 875.4540308 | 4.361761358 | 0.111177922 |
| 131 | 07-2(1_4) | Nudifloramide(2PY) | 7869.187962 | 1018.100537 | 4.3878756 | 0.109149884 |
| 138 | 08-1(1_4) | Nudifloramide(2PY) | 4319.980905 | 539.1224614 | 4.389517375 | 0.105246043 |
| 145 | 08-2(1_4) | Nudifloramide(2PY) | 2501.580288 | 265.4499605 | 4.368365818 | 0.12027531 |
| 152 | 09-1(1_4) | Nudifloramide(2PY) | 8872.316793 | 1021.027352 | 4.388439964 | 0.114021713 |
| 159 | 09-2(1_4) | Nudifloramide(2PY) | 8627.956705 | 924.8482087 | 4.362236758 | 0.136068944 |
| 166 | 10-1(1_4) | Nudifloramide(2PY) | 5575.000116 | 559.8780813 | 4.385815399 | 0.138419166 |
| 173 | 10-2(1_4) | Nudifloramide(2PY) | 10427.48717 | 1037.216804 | 4.284431923 | 0.130961739 |
| 180 | 11-1(1_4) | Nudifloramide(2PY) | 1656.707668 | 190.4111085 | 4.374164648 | 0.130803963 |
| 187 | 11-2(1_4) | Nudifloramide(2PY) | 1991.499878 | 270.5019062 | 4.351540041 | 0.103283821 |
| 194 | 12-1(1_4) | Nudifloramide(2PY) | 4416.192946 | 388.8401933 | 4.423603522 | 0.133754103 |
| 201 | 12-2(1_4) | Nudifloramide(2PY) | 2792.947216 | 286.0761491 | 4.30501305 | 0.115497307 |
| 208 | 13-1(1_4) | Nudifloramide(2PY) | 1133.506391 | 166.8260371 | 4.3148006 | 0.100363271 |
| 215 | 13-2(1_4) | Nudifloramide(2PY) | 4321.869078 | 426.1725121 | 4.326856507 | 0.116571098 |
| 222 | 14-1(1_4) | Nudifloramide(2PY) | 3886.456018 | 342.7714187 | 4.347246814 | 0.165905069 |
| 229 | 14-2(1_4) | Nudifloramide(2PY) | 2718.099777 | 414.5785353 | 4.333371887 | 0.091968117 |
| 236 | 15-1(1_4) | Nudifloramide(2PY) | 4292.213823 | 537.3167631 | 4.32816092 | 0.098729604 |
| 243 | 15-2(1_4) | Nudifloramide(2PY) | 10779.03649 | 1292.842102 | 4.32085096 | 0.112556297 |
| 250 | BDC01 | Nudifloramide(2PY) | 12465.67165 | 758.5480165 | 4.242644096 | 0.209924843 |
| 257 | BDC02 | Nudifloramide(2PY) | 15055.78753 | 1006.642335 | 4.259913522 | 0.18601276 |
| 264 | BDC03 | Nudifloramide(2PY) | 4108.863612 | 307.6536399 | 4.283177683 | 0.181232321 |
| 271 | BDC04 | Nudifloramide(2PY) | 5411.33248 | 334.8616724 | 4.244023586 | 0.2149447 |
| 278 | BDC05 | Nudifloramide(2PY) | 3892.729152 | 312.089904 | 4.263674778 | 0.172457282 |
| 285 | BDC06 | Nudifloramide(2PY) | 2050.928992 | 144.2998576 | 4.256329495 | 0.195956701 |
| 292 | BDC07 | Nudifloramide(2PY) | 5090.67274 | 305.052046 | 4.210142418 | 0.226247287 |
| 299 | BDC08 | Nudifloramide(2PY) | 8768.18686 | 609.96813 | 4.272438732 | 0.181471154 |
| 306 | BDC09 | Nudifloramide(2PY) | 7056.193313 | 518.6826984 | 4.276348937 | 0.178823733 |
| 313 | BDC10 | Nudifloramide(2PY) | 4024.499013 | 262.7829277 | 4.273573931 | 0.202442748 |
| 320 | BDC11 | Nudifloramide(2PY) | 12374.56141 | 793.4535341 | 4.248401372 | 0.208309532 |
| 327 | BDC12 | Nudifloramide(2PY) | 12385.83717 | 868.9970855 | 4.300690246 | 0.187330857 |
| 334 | BDC13 | Nudifloramide(2PY) | 9247.287818 | 524.8664342 | 4.247171367 | 0.233078696 |
| 341 | BDC14 | Nudifloramide(2PY) | 20873.47259 | 1333.129706 | 4.255259966 | 0.198558936 |
| 348 | BDC15 | Nudifloramide(2PY) | 15403.76288 | 1093.472152 | 4.265528405 | 0.197565149 |
| 355 | BDC16 | Nudifloramide(2PY) | 3726.532024 | 267.119153 | 4.253334208 | 0.203164624 |
| 362 | BDC17 | Nudifloramide(2PY) | 14327.57413 | 1059.538171 | 4.265163244 | 0.190712465 |
| 369 | BDC18 | Nudifloramide(2PY) | 3230.296806 | 252.2033629 | 4.255263729 | 0.176889935 |
| 376 | BDC19 | Nudifloramide(2PY) | 10619.10468 | 660.6352352 | 4.228525355 | 0.204049882 |
| 383 | BDC20 | Nudifloramide(2PY) | 1927.64101 | 141.5338434 | 4.218648532 | 0.19416254 |
| 390 | BDC21 | Nudifloramide(2PY) | 6161.01271 | 427.0941402 | 4.252921705 | 0.208538019 |
| 397 | BDC22 | Nudifloramide(2PY) | 2948.079202 | 191.5478136 | 4.236444455 | 0.198654189 |
| 404 | BDC23 | Nudifloramide(2PY) | 1149.138935 | 92.28208882 | 4.229626834 | 0.196336621 |
| 411 | BDC24 | Nudifloramide(2PY) | 8847.530028 | 620.3169984 | 4.223362509 | 0.19002221 |
| 418 | BDC25 | Nudifloramide(2PY) | 17430.66536 | 1009.209256 | 4.252466123 | 0.233209018 |
| 425 | BDC26 | Nudifloramide(2PY) | 4423.704504 | 285.6922136 | 4.214940768 | 0.224133867 |
| 432 | BDC27 | Nudifloramide(2PY) | 2467.758889 | 198.1375508 | 4.269293706 | 0.223464842 |
| 439 | BDC28 | Nudifloramide(2PY) | 3195.894515 | 380.0564075 | 4.187454068 | 0.12696828 |
| 446 | BDC29 | Nudifloramide(2PY) | 3691.165798 | 274.494547 | 4.22727482 | 0.2026702 |
| 453 | BDC30 | Nudifloramide(2PY) | 1907.993173 | 186.7477968 | 4.266808133 | 0.179202654 |
| 460 | BDC31 | Nudifloramide(2PY) | 2234.266036 | 179.4761488 | 4.244374604 | 0.190281406 |
| 467 | BDC32 | Nudifloramide(2PY) | 4576.099673 | 505.4935913 | 4.231663912 | 0.138503227 |
| 474 | BDC33 | Nudifloramide(2PY) | 11157.08914 | 793.1569473 | 4.27359988 | 0.239683547 |
| 481 | BDC34 | Nudifloramide(2PY) | 876.2642499 | 127.6827473 | 4.267082667 | 0.084168721 |
| 488 | BDC35 | Nudifloramide(2PY) | 4372.371074 | 310.2128399 | 4.284448888 | 0.216421976 |
| 495 | BDC36 | Nudifloramide(2PY) | 2311.999951 | 181.0280495 | 4.266615811 | 0.185174112 |
| 502 | CRC01 | Nudifloramide(2PY) | 32443.90897 | 2269.77461 | 4.272226961 | 0.198439622 |
| 509 | CRC02 | Nudifloramide(2PY) | 28285.46495 | 1940.886152 | 4.251944262 | 0.190881472 |
| 516 | CRC03 | Nudifloramide(2PY) | 14594.21258 | 1127.059562 | 4.304264822 | 0.164074537 |
| 523 | CRC04 | Nudifloramide(2PY) | 26720.57286 | 1475.413186 | 4.209203503 | 0.230964501 |
| 530 | CRC05 | Nudifloramide(2PY) | 4599.70272 | 335.0141097 | 4.239278575 | 0.196446044 |
| 537 | CRC06 | Nudifloramide(2PY) | 4776.215621 | 336.5303359 | 4.225795048 | 0.204556038 |
| 544 | CRC07 | Nudifloramide(2PY) | 3704.950074 | 233.7191724 | 4.235359732 | 0.228964017 |
| 551 | CRC08 | Nudifloramide(2PY) | 12456.7843 | 845.2447548 | 4.246927291 | 0.191816915 |
| 558 | CRC09 | Nudifloramide(2PY) | 4785.274944 | 333.6811833 | 4.211260895 | 0.186931475 |
| 565 | CRC10 | Nudifloramide(2PY) | 3638.815227 | 285.990093 | 4.287446221 | 0.186464489 |
| 572 | CRC11 | Nudifloramide(2PY) | 901.1863743 | 69.81217228 | 4.267854903 | 0.156790034 |
| 579 | CRC12 | Nudifloramide(2PY) | 4713.472098 | 307.2689818 | 4.249266617 | 0.200075086 |

TABLE 8-continued

| Index | Sample Name | Component Name | Area | Height | Retention Time | Width at 50% |
|---|---|---|---|---|---|---|
| 586 | CRC13 | Nudifloramide(2PY) | 13148.42489 | 916.7417548 | 4.262390277 | 0.193832744 |
| 593 | CRC14 | Nudifloramide(2PY) | 1809.213403 | 141.8605084 | 4.256495992 | 0.18347459 |
| 600 | CRC15 | Nudifloramide(2PY) | 1506.13526 | 98.72264482 | 4.2642381 | 0.211070622 |
| 607 | CRC16 | Nudifloramide(2PY) | 3374.583108 | 273.4486401 | 4.262912866 | 0.179358609 |
| 614 | CRC17 | Nudifloramide(2PY) | 4064.251063 | 275.297934 | 4.262269123 | 0.204210742 |
| 621 | CRC18 | Nudifloramide(2PY) | 5298.095605 | 385.5716356 | 4.282745276 | 0.195633119 |
| 628 | CRC19 | Nudifloramide(2PY) | 2224.738337 | 160.0718008 | 4.259272016 | 0.183880413 |
| 635 | CRC20 | Nudifloramide(2PY) | 5213.739852 | 353.5209038 | 4.267295614 | 0.20710432 |
| 642 | CRC21 | Nudifloramide(2PY) | 3531.505608 | 223.8061458 | 4.221776283 | 0.256526307 |
| 649 | CRC22 | Nudifloramide(2PY) | 2552.430465 | 183.9405053 | 4.258008212 | 0.1988339 |
| 656 | CRC23 | Nudifloramide(2PY) | 4304.875365 | 303.9000681 | 4.2694285 | 0.186378223 |
| 663 | CRC24 | Nudifloramide(2PY) | 12779.06771 | 858.4481004 | 4.244000504 | 0.217318331 |
| 670 | CRC25 | Nudifloramide(2PY) | 19183.1223 | 1310.945582 | 4.305074072 | 0.212468909 |
| 677 | CRC26 | Nudifloramide(2PY) | 15933.67037 | 1121.91709 | 4.341232756 | 0.185822026 |
| 684 | CRC27 | Nudifloramide(2PY) | 10737.06668 | 803.7915728 | 4.26373144 | 0.172811368 |
| 691 | CRC28 | Nudifloramide(2PY) | 6881.818064 | 711.8455306 | 4.213077233 | 0.157279022 |
| 698 | CRC29 | Nudifloramide(2PY) | 5299.369524 | 558.8988106 | 4.31170441 | 0.112681541 |
| 705 | CRC30 | Nudifloramide(2PY) | 4537.420822 | 342.6169598 | 4.243181166 | 0.188559315 |
| 712 | CRC31 | Nudifloramide(2PY) | 4074.186083 | 237.8812342 | 4.246606607 | 0.260512479 |
| 719 | CRC32 | Nudifloramide(2PY) | 8368.892565 | 491.3501385 | 4.211721036 | 0.238757375 |
| 726 | CRC33 | Nudifloramide(2PY) | 6601.031216 | 627.0492816 | 4.261504373 | 0.16152217 |
| 733 | CRC34 | Nudifloramide(2PY) | 4727.901317 | 436.9573268 | 4.3021803 | 0.161124526 |
| 740 | CRC35 | Nudifloramide(2PY) | 4262.046464 | 441.5189668 | 4.277608678 | 0.138783482 |
| 747 | CRC36 | Nudifloramide(2PY) | 5056.721603 | 497.8274235 | 4.195573968 | 0.17173134 |
| 754 | CTL01 | Nudifloramide(2PY) | 3281.101109 | 254.7386794 | 4.269175161 | 0.183263031 |
| 761 | CTL02 | Nudifloramide(2PY) | 7062.325823 | 472.3060073 | 4.254210989 | 0.198683382 |
| 768 | CTL03 | Nudifloramide(2PY) | 2302.832243 | 179.680196 | 4.287208402 | 0.173290866 |
| 775 | CTL04 | Nudifloramide(2PY) | 6076.449198 | 408.9184953 | 4.262463067 | 0.191642006 |
| 782 | CTL05 | Nudifloramide(2PY) | 6304.980305 | 423.9869156 | 4.254590383 | 0.19825088 |
| 789 | CTL06 | Nudifloramide(2PY) | 3073.96489 | 240.0078085 | 4.310011933 | 0.183111938 |
| 796 | CTL07 | Nudifloramide(2PY) | 3565.95358 | 238.4244225 | 4.283033265 | 0.195586755 |
| 803 | CTL08 | Nudifloramide(2PY) | 5559.236824 | 382.0146765 | 4.255783972 | 0.186235263 |
| 810 | CTL09 | Nudifloramide(2PY) | 5622.836177 | 354.3914091 | 4.23790458 | 0.199023755 |
| 817 | CTL10 | Nudifloramide(2PY) | 16695.74729 | 1031.615884 | 4.250293128 | 0.201269182 |
| 824 | CTL11 | Nudifloramide(2PY) | 6591.713483 | 429.698505 | 4.245526592 | 0.210529855 |
| 831 | CTL12 | Nudifloramide(2PY) | 6897.278006 | 491.9244041 | 4.239901456 | 0.197889088 |
| 838 | CTL13 | Nudifloramide(2PY) | 6212.072059 | 424.9775609 | 4.247693093 | 0.198114943 |
| 845 | CTL14 | Nudifloramide(2PY) | 10053.02912 | 592.7286258 | 4.236276963 | 0.226115292 |
| 852 | CTL15 | Nudifloramide(2PY) | 9117.254782 | 646.1125146 | 4.279669607 | 0.202445452 |
| 859 | CTL16 | Nudifloramide(2PY) | 4564.514714 | 284.4617405 | 4.213165411 | 0.22462304 |
| 866 | CTL17 | Nudifloramide(2PY) | 7165.664224 | 443.2389752 | 4.220396111 | 0.2226479 |
| 873 | CTL18 | Nudifloramide(2PY) | 4321.874589 | 434.4993304 | 4.410508304 | 0.132453737 |
| 880 | CTL19 | Nudifloramide(2PY) | 24949.6588 | 1588.334259 | 4.275621238 | 0.206396248 |
| 887 | CTL20 | Nudifloramide(2PY) | 5985.895348 | 413.973201 | 4.218930306 | 0.186051523 |
| 894 | CTL21 | Nudifloramide(2PY) | 8547.433495 | 607.1872435 | 4.241630165 | 0.202293157 |
| 901 | CTL22 | Nudifloramide(2PY) | 4456.06285 | 298.2715504 | 4.259449648 | 0.194448387 |
| 908 | CTL23 | Nudifloramide(2PY) | 6651.498991 | 499.2634409 | 4.265807555 | 0.182898084 |
| 915 | CTL24 | Nudifloramide(2PY) | 6632.449297 | 539.5463459 | 4.262591134 | 0.16498495 |
| 922 | CTL25 | Nudifloramide(2PY) | 5889.479838 | 392.0023953 | 4.281240728 | 0.20663962 |
| 929 | CTL26 | Nudifloramide(2PY) | 3043.134694 | 205.854146 | 4.248533084 | 0.200948769 |
| 936 | CTL27 | Nudifloramide(2PY) | 8259.039081 | 604.4604453 | 4.246693693 | 0.198061061 |
| 943 | CTL28 | Nudifloramide(2PY) | 4639.888505 | 338.4025732 | 4.276588921 | 0.184487854 |
| 950 | CTL29 | Nudifloramide(2PY) | 7614.657283 | 583.8537959 | 4.2979504 | 0.196918595 |
| 957 | CTL30 | Nudifloramide(2PY) | 3534.677178 | 399.8883826 | 4.283250619 | 0.133146731 |
| 964 | CTL31 | Nudifloramide(2PY) | 4981.861466 | 578.7492615 | 4.315512913 | 0.109088752 |
| 971 | CTL32 | Nudifloramide(2PY) | 1568.660441 | 202.1825715 | 4.298573878 | 0.124347671 |
| 978 | CTL33 | Nudifloramide(2PY) | 4662.819796 | 381.7665286 | 4.305609823 | 0.180493777 |
| 985 | CTL34 | Nudifloramide(2PY) | 1698.427097 | 205.9147875 | 4.293346409 | 0.119398478 |
| 992 | CTL35 | Nudifloramide(2PY) | 2090.889247 | 149.2365411 | 4.235942936 | 0.143324594 |
| 999 | CTL36 | Nudifloramide(2PY) | 3129.109759 | 262.9166083 | 4.258048054 | 0.15892313 |
| 1006 | PRC01 | Nudifloramide(2PY) | 4969.628235 | 281.7334275 | 4.229429147 | 0.218811622 |
| 1013 | PRC02 | Nudifloramide(2PY) | 519.3739415 | 58.80963755 | 4.191571275 | 0.152165726 |
| 1020 | PRC03 | Nudifloramide(2PY) | 1758.235288 | 203.1626643 | 4.259095823 | 0.108180953 |
| 1027 | PRC04 | Nudifloramide(2PY) | 2798.243792 | 193.112262 | 4.244620518 | 0.182926733 |
| 1034 | PRC05 | Nudifloramide(2PY) | 9252.87059 | 570.2734897 | 4.240287282 | 0.201513691 |
| 1041 | PRC06 | Nudifloramide(2PY) | 2094.078115 | 148.5761122 | 4.226139976 | 0.196563092 |
| 1048 | PRC07 | Nudifloramide(2PY) | 11038.18208 | 756.5736085 | 4.25446989 | 0.192004981 |
| 1055 | PRC08 | Nudifloramide(2PY) | 3688.17342 | 245.3320488 | 4.258891303 | 0.201227807 |
| 1062 | PRC09 | Nudifloramide(2PY) | 3005.516089 | 182.2134622 | 4.250131028 | 0.231893807 |
| 1069 | PRC10 | Nudifloramide(2PY) | 17836.81021 | 1203.754682 | 4.250216794 | 0.196364157 |
| 1076 | PRC11 | Nudifloramide(2PY) | 4452.123085 | 336.0633557 | 4.254119024 | 0.175168564 |
| 1083 | PRC12 | Nudifloramide(2PY) | 3543.255414 | 241.1190502 | 4.243754821 | 0.20984887 |
| 1090 | PRC13 | Nudifloramide(2PY) | 3273.472278 | 210.542751 | 4.265146949 | 0.218651132 |
| 1097 | PRC14 | Nudifloramide(2PY) | 3500.235886 | 253.4486388 | 4.229765077 | 0.192628076 |
| 1104 | PRC15 | Nudifloramide(2PY) | 2135.018553 | 163.4750783 | 4.256375112 | 0.178579835 |
| 1111 | PRC16 | Nudifloramide(2PY) | 6046.167893 | 418.8627767 | 4.256001966 | 0.195785787 |
| 1118 | PRC17 | Nudifloramide(2PY) | 1547.953933 | 128.095931 | 4.268366004 | 0.199704516 |

TABLE 8-continued

| Sample Index | Sample Name | Component Name | Area | Height | Retention Time | Width at 50% |
|---|---|---|---|---|---|---|
| 1125 | PRC18 | Nudifloramide(2PY) | 1289.921345 | 94.21855339 | 4.258261729 | 0.222085861 |
| 1132 | PRC19 | Nudifloramide(2PY) | 5365.739937 | 375.642589 | 4.283206704 | 0.166531118 |
| 1139 | PRC20 | Nudifloramide(2PY) | 1564.350117 | 113.842245 | 4.254024703 | 0.197355915 |
| 1146 | PRC21 | Nudifloramide(2PY) | 5046.91279 | 360.8573345 | 4.247843623 | 0.213425354 |
| 1153 | PRC22 | Nudifloramide(2PY) | 3728.721223 | 266.7609232 | 4.249159956 | 0.193078832 |
| 1160 | PRC23 | Nudifloramide(2PY) | 2120.423513 | 138.7165722 | 4.246581355 | 0.246011508 |
| 1167 | PRC24 | Nudifloramide(2PY) | 2005.067166 | 172.4987268 | 4.272414475 | 0.161725426 |
| 1174 | PRC25 | Nudifloramide(2PY) | 1984.517977 | 215.0472237 | 4.203696845 | 0.121709863 |
| 1181 | PRC26 | Nudifloramide(2PY) | 1391.343239 | 138.9281 | 4.240354534 | 0.19304253 |
| 1188 | PRC27 | Nudifloramide(2PY) | 2999.285525 | 233.9698726 | 4.245204046 | 0.173607998 |
| 1195 | PRC28 | Nudifloramide(2PY) | 2527.888505 | 265.9270996 | 4.267432412 | 0.130297971 |
| 1202 | PRC29 | Nudifloramide(2PY) | 2415.634178 | 238.1704562 | 4.186791251 | 0.15519452 |
| 1209 | PRC30 | Nudifloramide(2PY) | 1333.966827 | 113.0505996 | 4.227792634 | 0.19763221 |
| 1216 | PRC31 | Nudifloramide(2PY) | 1170.849445 | 138.3861705 | 4.275430174 | 0.120602009 |
| 1223 | PRC32 | Nudifloramide(2PY) | 1031.679265 | 82.45392467 | 4.289092789 | 0.189794394 |
| 1230 | PRC33 | Nudifloramide(2PY) | 2548.106664 | 351.2528228 | 4.294254277 | 0.148235376 |
| 1237 | PRC34 | Nudifloramide(2PY) | 2401.867716 | 167.6607896 | 4.258603528 | 0.234177052 |
| 1244 | PRC35 | Nudifloramide(2PY) | 965.2395674 | 171.2009238 | 4.290382757 | 0.08319129 |

TABLE 9

| Sample Index | Sample Name | Component Name | Area | Height | Retention Time | Width at 50% |
|---|---|---|---|---|---|---|
| 6 | Hu_Normal_Serum_1_4_10 uL | LPC(16:0) | 7931375.602 | 610498.864 | 14.90147424 | 0.152796795 |
| 13 | HC + MeOH_1_4_10 uL | LPC(16:0) | 5367.416972 | 298.1866429 | 14.87299797 | 0.149349866 |
| 20 | HC + Serum_1_4_10 uL | LPC(16:0) | 9777988.842 | 742465.5282 | 14.89280524 | 0.155639797 |
| 27 | OC + MeOH_1_4_10 uL | LPC(16:0) | 3621.343487 | 214.4664675 | 14.85920209 | 0.153193558 |
| 34 | OC + Serum_1_4_10 uL | LPC(16:0) | 8465811.333 | 640623.2689 | 14.88926687 | 0.157192216 |
| 41 | DC + MeOH_1_4_10 uL | LPC(16:0) | 8188.271358 | 510.7381777 | 14.87143929 | 0.164428359 |
| 48 | DC + Serum_1_4_10 uL | LPC(16:0) | 2865303.961 | 235300.7614 | 14.87624658 | 0.13840505 |
| 55 | PC + MeOH_1_4_10 uL | LPC(16:0) | 17256347.7 | 1234851.589 | 14.88532335 | 0.167381542 |
| 62 | PC + Serum_sup_10 uL | LPC(16:0) | 85769399.33 | 4679816.773 | 14.88988356 | 0.194736203 |
| 69 | 2PY_0100 | LPC(16:0) | 14.88995258 | 2.302169394 | 14.73970026 | 0.103267954 |
| 76 | Serum + 2PY_0100 | LPC(16:0) | 3524404.749 | 377990.3119 | 14.97654443 | 0.121508735 |
| 83 | LPC16_0100 | LPC(16:0) | 2633.946849 | 417.9518896 | 14.98044922 | 0.080873608 |
| 90 | Serum + LPC16_0100 | LPC(16:0) | 1681136.731 | 185230.6519 | 14.96871656 | 0.126445614 |
| 97 | LPC18_0100 | LPC(16:0) | 222.5226612 | 9.264260295 | 15.08475047 | 0.556110483 |
| 104 | Serum + LPC18_0100 | LPC(16:0) | 1768986.221 | 185452.7137 | 14.98330928 | 0.119951576 |
| 111 | 06-1(1_4) | LPC(16:0) | 7326437.939 | 642987.5513 | 14.8996268 | 0.15552983 |
| 118 | 06-2(1_4) | LPC(16:0) | 4921693.904 | 455372.4952 | 14.89707541 | 0.146731042 |
| 125 | 07-1(1_4) | LPC(16:0) | 6544267.584 | 574154.2291 | 14.89936531 | 0.150704626 |
| 132 | 07-2(1_4) | LPC(16:0) | 4207217.005 | 369500.0709 | 14.90313507 | 0.152037647 |
| 139 | 08-1(1_4) | LPC(16:0) | 6960008.652 | 606350.1083 | 14.89351781 | 0.146902693 |
| 146 | 08-2(1_4) | LPC(16:0) | 7184530.761 | 596144.9612 | 14.90133285 | 0.147668694 |
| 153 | 09-1(1_4) | LPC(16:0) | 7754727.73 | 655745.5935 | 14.90118011 | 0.151849785 |
| 160 | 09-2(1_4) | LPC(16:0) | 8217428.337 | 663961.0254 | 14.89999718 | 0.160508183 |
| 167 | 10-1(1_4) | LPC(16:0) | 3561368.112 | 297928.3461 | 14.90989365 | 0.159844953 |
| 174 | 10-2(1_4) | LPC(16:0) | 2778978.623 | 252606.5263 | 14.89236181 | 0.147045651 |
| 181 | 11-1(1_4) | LPC(16:0) | 4649725.431 | 376659.7737 | 14.88889184 | 0.157465312 |
| 188 | 11-2(1_4) | LPC(16:0) | 7245194.693 | 547060.4965 | 14.8919749 | 0.17053971 |
| 195 | 12-1(1_4) | LPC(16:0) | 9555346.157 | 690424.4544 | 14.90353294 | 0.174461558 |
| 202 | 12-2(1_4) | LPC(16:0) | 8991219.535 | 709365.3747 | 14.90120153 | 0.160212809 |
| 209 | 13-1(1_4) | LPC(16:0) | 7565452.026 | 621696.2124 | 14.90050051 | 0.148364489 |
| 216 | 13-2(1_4) | LPC(16:0) | 8312710.375 | 601222.0214 | 14.89509312 | 0.172784489 |
| 223 | 14-1(1_4) | LPC(16:0) | 8863983.526 | 676387.8316 | 14.89586336 | 0.157849347 |
| 230 | 14-2(1_4) | LPC(16:0) | 5305240.455 | 417293.2783 | 14.88326524 | 0.164848767 |
| 237 | 15-1(1_4) | LPC(16:0) | 6515086.872 | 495281.3094 | 14.89963385 | 0.171448162 |
| 244 | 15-2(1_4) | LPC(16:0) | 8335147.656 | 622246.5579 | 14.90051621 | 0.169617907 |
| 251 | BDC01 | LPC(16:0) | 6648676.843 | 396852.7594 | 14.86371025 | 0.171748929 |
| 258 | BDC02 | LPC(16:0) | 6436313.867 | 508415.2919 | 14.87430026 | 0.143986671 |
| 265 | BDC03 | LPC(16:0) | 4837751.941 | 345866.1489 | 14.87032757 | 0.165271161 |
| 272 | BDC04 | LPC(16:0) | 6353072.409 | 414351.8493 | 14.86137145 | 0.168542314 |
| 279 | BDC05 | LPC(16:0) | 3813935.222 | 304100.0119 | 14.87708529 | 0.137302716 |
| 286 | BDC06 | LPC(16:0) | 13237624.15 | 799339.3436 | 14.86465247 | 0.177693184 |
| 293 | BDC07 | LPC(16:0) | 11976190.58 | 634851.1882 | 14.8637398 | 0.20558177 |
| 300 | BDC08 | LPC(16:0) | 8701787.077 | 552782.4756 | 14.85963506 | 0.162408503 |
| 307 | BDC09 | LPC(16:0) | 11284359.75 | 680460.6221 | 14.86030207 | 0.179883426 |
| 314 | BDC10 | LPC(16:0) | 9093937.779 | 474588.6421 | 14.85920457 | 0.182188626 |
| 321 | BDC11 | LPC(16:0) | 19609392.74 | 1254544.833 | 14.86110747 | 0.140688344 |
| 328 | BDC12 | LPC(16:0) | 7749774.053 | 366324.4804 | 14.86100887 | 0.252656535 |
| 335 | BDC13 | LPC(16:0) | 7316809.254 | 403527.6282 | 14.8647233 | 0.175124088 |
| 342 | BDC14 | LPC(16:0) | 9079108.953 | 457803.3143 | 14.87668877 | 0.170215131 |
| 349 | BDC15 | LPC(16:0) | 14534168.33 | 936051.9053 | 14.86328019 | 0.152037639 |

TABLE 9-continued

| Index | Sample Name | Component Name | Area | Height | Retention Time | Width at 50% |
|---|---|---|---|---|---|---|
| 356 | BDC16 | LPC(16:0) | 7800852.091 | 380736.643 | 14.85782913 | 0.182101735 |
| 363 | BDC17 | LPC(16:0) | 14899140.31 | 965448.1269 | 14.87089717 | 0.145479712 |
| 370 | BDC18 | LPC(16:0) | 9990030.489 | 540209.6187 | 14.86162937 | 0.173859219 |
| 377 | BDC19 | LPC(16:0) | 5815876.681 | 408301.035 | 14.86367587 | 0.124178549 |
| 384 | BDC20 | LPC(16:0) | 7028581.484 | 462698.5293 | 14.84854308 | 0.128474266 |
| 391 | BDC21 | LPC(16:0) | 3729154.877 | 234660.9858 | 14.87381475 | 0.133089961 |
| 398 | BDC22 | LPC(16:0) | 4334879.267 | 294213.3666 | 14.8892892 | 0.13670168 |
| 405 | BDC23 | LPC(16:0) | 3613293.021 | 194039.9393 | 14.86161673 | 0.161968358 |
| 412 | BDC24 | LPC(16:0) | 4445320.072 | 229291.0727 | 14.86791372 | 0.194605965 |
| 419 | BDC25 | LPC(16:0) | 791208.522 | 41544.40608 | 14.87676502 | 0.202522718 |
| 426 | BDC26 | LPC(16:0) | 5273148.191 | 274428.1142 | 14.87340087 | 0.167631988 |
| 433 | BDC27 | LPC(16:0) | 6399393.728 | 442926.4571 | 14.8891398 | 0.14530932 |
| 440 | BDC28 | LPC(16:0) | 3030318.948 | 236890.1312 | 14.86579269 | 0.105319706 |
| 447 | BDC29 | LPC(16:0) | 4075313.196 | 299303.7769 | 14.85753578 | 0.136332291 |
| 454 | BDC30 | LPC(16:0) | 2786373.175 | 185347.1333 | 14.85837969 | 0.114446042 |
| 461 | BDC31 | LPC(16:0) | 3856262.256 | 278027.5217 | 14.84826411 | 0.109335264 |
| 468 | BDC32 | LPC(16:0) | 3579500.205 | 238733.7507 | 14.86520918 | 0.129649493 |
| 475 | BDC33 | LPC(16:0) | 2351987.148 | 133232.3263 | 14.86660815 | 0.158781295 |
| 482 | BDC34 | LPC(16:0) | 1665546.707 | 101114.981 | 14.86585958 | 0.130890747 |
| 489 | BDC35 | LPC(16:0) | 2691126.935 | 223896.0161 | 14.86954702 | 0.125247243 |
| 496 | BDC36 | LPC(16:0) | 829092.6767 | 47797.96203 | 14.87448095 | 0.158109035 |
| 503 | CRC01 | LPC(16:0) | 18568754.42 | 957475.8828 | 14.86788935 | 0.200035046 |
| 510 | CRC02 | LPC(16:0) | 45295966.34 | 2541532.046 | 14.86172859 | 0.173373077 |
| 517 | CRC03 | LPC(16:0) | 11644346.93 | 687202.6357 | 14.87163596 | 0.157047865 |
| 524 | CRC04 | LPC(16:0) | 14304808.8 | 848451.0048 | 14.8593024 | 0.174833447 |
| 531 | CRC05 | LPC(16:0) | 20231049.47 | 1010854.552 | 14.86114147 | 0.228471883 |
| 538 | CRC06 | LPC(16:0) | 11086055.23 | 607676.2127 | 14.86822466 | 0.184715106 |
| 545 | CRC07 | LPC(16:0) | 22945082.68 | 1225120.965 | 14.86320401 | 0.204073435 |
| 552 | CRC08 | LPC(16:0) | 12810129.5 | 615511.1806 | 14.86006349 | 0.32643286 |
| 559 | CRC09 | LPC(16:0) | 21850202.57 | 948152.9514 | 14.85510115 | 0.371082701 |
| 566 | CRC10 | LPC(16:0) | 5525080.44 | 281018.2417 | 14.85467336 | 0.212243433 |
| 573 | CRC11 | LPC(16:0) | 18433740.72 | 1229279.309 | 14.8594676 | 0.163662509 |
| 580 | CRC12 | LPC(16:0) | 3068008.124 | 196846.0737 | 14.86616658 | 0.1513909 |
| 587 | CRC13 | LPC(16:0) | 6577086.195 | 378657.6917 | 14.87304937 | 0.172206617 |
| 594 | CRC14 | LPC(16:0) | 6119418.812 | 312038.5847 | 14.87283708 | 0.193931285 |
| 601 | CRC15 | LPC(16:0) | 12455291.84 | 775037.2159 | 14.86815209 | 0.166313402 |
| 608 | CRC16 | LPC(16:0) | 11301988.31 | 763762.5044 | 14.86280424 | 0.140420007 |
| 615 | CRC17 | LPC(16:0) | 6443454.564 | 317288.6209 | 14.86373712 | 0.189425508 |
| 622 | CRC18 | LPC(16:0) | 7859950.674 | 463378.4332 | 14.8592208 | 0.156142681 |
| 629 | CRC19 | LPC(16:0) | 4553237.419 | 242220.3074 | 14.8586584 | 0.181370208 |
| 636 | CRC20 | LPC(16:0) | 3857144.549 | 187824.7908 | 14.86076133 | 0.155592196 |
| 643 | CRC21 | LPC(16:0) | 4184591.79 | 240713.3044 | 14.89379014 | 0.153781584 |
| 650 | CRC22 | LPC(16:0) | 2781289.969 | 179782.5114 | 14.87084254 | 0.138013957 |
| 657 | CRC23 | LPC(16:0) | 3395308.092 | 146400.9857 | 14.85185655 | 0.202419165 |
| 664 | CRC24 | LPC(16:0) | 6658891.321 | 529562.2633 | 14.87746296 | 0.127378576 |
| 671 | CRC25 | LPC(16:0) | 12278758.89 | 802927.5911 | 14.8668057 | 0.152793454 |
| 678 | CRC26 | LPC(16:0) | 3652713.681 | 213354.6891 | 14.85501605 | 0.15782181 |
| 685 | CRC27 | LPC(16:0) | 4698807.967 | 231820.3996 | 14.85991758 | 0.166700458 |
| 692 | CRC28 | LPC(16:0) | 3386092.019 | 232159.5996 | 14.84338771 | 0.125736151 |
| 699 | CRC29 | LPC(16:0) | 2288325.413 | 136600.8725 | 14.84443183 | 0.128013153 |
| 706 | CRC30 | LPC(16:0) | 2419701.291 | 111794.6902 | 14.85142875 | 0.182449991 |
| 713 | CRC31 | LPC(16:0) | 2645723.784 | 149417.537 | 14.83534442 | 0.14158904 |
| 720 | CRC32 | LPC(16:0) | 1989403.945 | 110662.2153 | 14.85565934 | 0.152195949 |
| 727 | CRC33 | LPC(16:0) | 2435067.79 | 150565.0847 | 14.85922089 | 0.141715149 |
| 734 | CRC34 | LPC(16:0) | 1539563.599 | 83447.06796 | 14.86368728 | 0.121193167 |
| 741 | CRC35 | LPC(16:0) | 2338537.757 | 139856.2604 | 14.86078356 | 0.130044944 |
| 748 | CRC36 | LPC(16:0) | 7443398.798 | 422968.5262 | 14.84516369 | 0.166547773 |
| 755 | CTL01 | LPC(16:0) | 14024405.38 | 718746.326 | 14.87313061 | 0.189600485 |
| 762 | CTL02 | LPC(16:0) | 15986072.99 | 920462.096 | 14.85542121 | 0.188012528 |
| 769 | CTL03 | LPC(16:0) | 15233278.68 | 934689.0111 | 14.87478202 | 0.167704222 |
| 776 | CTL04 | LPC(16:0) | 27851813.25 | 1461617.166 | 14.85960691 | 0.214092184 |
| 783 | CTL05 | LPC(16:0) | 11256440.26 | 504833.6119 | 14.85762835 | 0.384773189 |
| 790 | CTL06 | LPC(16:0) | 13479611.12 | 738133.2463 | 14.87068359 | 0.178797676 |
| 797 | CTL07 | LPC(16:0) | 9127824.129 | 512579.0757 | 14.86852864 | 0.158123413 |
| 804 | CTL08 | LPC(16:0) | 18710665.23 | 1211164.59 | 14.85738648 | 0.159583449 |
| 811 | CTL09 | LPC(16:0) | 12185334.3 | 629056.9502 | 14.87389346 | 0.213209797 |
| 818 | CTL10 | LPC(16:0) | 14927041.11 | 760373.4892 | 14.86039827 | 0.18439404 |
| 825 | CTL11 | LPC(16:0) | 15039335.35 | 771100.273 | 14.85562882 | 0.208226373 |
| 832 | CTL12 | LPC(16:0) | 14591923.59 | 714077.0999 | 14.87105358 | 0.193596409 |
| 839 | CTL13 | LPC(16:0) | 11233422.9 | 620346.0589 | 14.85792323 | 0.191419725 |
| 846 | CTL14 | LPC(16:0) | 12539932.5 | 691620.9566 | 14.87135972 | 0.190916478 |
| 853 | CTL15 | LPC(16:0) | 8530624.251 | 371576.6177 | 14.85726938 | 0.256962675 |
| 860 | CTL16 | LPC(16:0) | 12872075.41 | 744156.0877 | 14.85248731 | 0.177360404 |
| 867 | CTL17 | LPC(16:0) | 9542762.299 | 482393.8481 | 14.85980297 | 0.18257024 |
| 874 | CTL18 | LPC(16:0) | 10406801.43 | 532549.2752 | 14.8708536 | 0.161319024 |
| 881 | CTL19 | LPC(16:0) | 11093904.96 | 622981.7321 | 14.8647575 | 0.162913191 |
| 888 | CTL20 | LPC(16:0) | 12541861.75 | 710767.6008 | 14.84163057 | 0.138595759 |

TABLE 9-continued

| Sample Index | Name | Component Name | Area | Height | Retention Time | Width at 50% |
|---|---|---|---|---|---|---|
| 895 | CTL21 | LPC(16:0) | 9249977.181 | 538615.6035 | 14.86637765 | 0.152535213 |
| 902 | CTL22 | LPC(16:0) | 9816530.612 | 543245.0432 | 14.86001881 | 0.158578117 |
| 909 | CTL23 | LPC(16:0) | 21466083.2 | 1509908.504 | 14.84878282 | 0.147644469 |
| 916 | CTL24 | LPC(16:0) | 5223714.636 | 333443.4342 | 14.83650408 | 0.113694771 |
| 923 | CTL25 | LPC(16:0) | 7312000.172 | 416401.7225 | 14.86774787 | 0.158041143 |
| 930 | CTL26 | LPC(16:0) | 6515997.845 | 384009.1785 | 14.86417299 | 0.1539036 |
| 937 | CTL27 | LPC(16:0) | 6966981.113 | 366856.6809 | 14.85045085 | 0.170961345 |
| 944 | CTL28 | LPC(16:0) | 3937517.26 | 185556.2059 | 14.85972125 | 0.20503513 |
| 951 | CTL29 | LPC(16:0) | 5503134.737 | 325833.1808 | 14.8617183 | 0.140147684 |
| 958 | CTL30 | LPC(16:0) | 6325624.256 | 300294.4722 | 14.85481058 | 0.213362896 |
| 965 | CTL31 | LPC(16:0) | 5691034.385 | 380991.6433 | 14.84345974 | 0.118755219 |
| 972 | CTL32 | LPC(16:0) | 2390250.64 | 149130.1702 | 14.85430737 | 0.137032397 |
| 979 | CTL33 | LPC(16:0) | 4019408.083 | 240682.7734 | 14.8555207 | 0.130500325 |
| 986 | CTL34 | LPC(16:0) | 3320247.979 | 212080.5039 | 14.85630445 | 0.148823959 |
| 993 | CTL35 | LPC(16:0) | 3759764.722 | 232728.5105 | 14.87114761 | 0.158405397 |
| 1000 | CTL36 | LPC(16:0) | 3227481.348 | 201358.1402 | 14.85688728 | 0.131285257 |
| 1007 | PRC01 | LPC(16:0) | 6959965.378 | 386310.6403 | 14.87319093 | 0.177920204 |
| 1014 | PRC02 | LPC(16:0) | 6479117.396 | 411600.8284 | 14.88227978 | 0.151051813 |
| 1021 | PRC03 | LPC(16:0) | 9280217.959 | 562289.3415 | 14.86574529 | 0.172034657 |
| 1028 | PRC04 | LPC(16:0) | 15478160.85 | 1174670.251 | 14.85879734 | 0.144397899 |
| 1035 | PRC05 | LPC(16:0) | 8770127.244 | 469196.2177 | 14.86769136 | 0.170721086 |
| 1042 | PRC06 | LPC(16:0) | 7327712.531 | 371955.9886 | 14.86252363 | 0.207677623 |
| 1049 | PRC07 | LPC(16:0) | 14034334.07 | 799949.6103 | 14.85510379 | 0.198279276 |
| 1056 | PRC08 | LPC(16:0) | 19603746.95 | 1172152.011 | 14.85819368 | 0.16210089 |
| 1063 | PRC09 | LPC(16:0) | 14883347.45 | 889627.4941 | 14.856276 | 0.151532124 |
| 1070 | PRC10 | LPC(16:0) | 10678480.88 | 640437.6667 | 14.86983847 | 0.161472818 |
| 1077 | PRC11 | LPC(16:0) | 8194358.157 | 422534.2458 | 14.86594179 | 0.179998954 |
| 1084 | PRC12 | LPC(16:0) | 6601710.772 | 383508.5637 | 14.84986584 | 0.152843735 |
| 1091 | PRC13 | LPC(16:0) | 6202045.552 | 341882.7593 | 14.85856673 | 0.164596636 |
| 1098 | PRC14 | LPC(16:0) | 7567407.559 | 453078.5261 | 14.86854963 | 0.149492929 |
| 1105 | PRC15 | LPC(16:0) | 4635294.368 | 272021.5246 | 14.87469781 | 0.150835857 |
| 1112 | PRC16 | LPC(16:0) | 11533945.35 | 730181.2662 | 14.85914601 | 0.153756118 |
| 1119 | PRC17 | LPC(16:0) | 3465451.281 | 156619.2378 | 14.86537532 | 0.192633776 |
| 1126 | PRC18 | LPC(16:0) | 4748595.815 | 259221.5338 | 14.85685943 | 0.142788953 |
| 1133 | PRC19 | LPC(16:0) | 2500900.621 | 220345.1037 | 14.86532346 | 0.09661021 |
| 1140 | PRC20 | LPC(16:0) | 3958233.431 | 282139.3527 | 14.87717798 | 0.106227995 |
| 1147 | PRC21 | LPC(16:0) | 8098319.794 | 622054.9193 | 14.85121081 | 0.120701027 |
| 1154 | PRC22 | LPC(16:0) | 4865703.458 | 308433.7229 | 14.85620927 | 0.12638461 |
| 1161 | PRC23 | LPC(16:0) | 5551625.85 | 279880.5721 | 14.85890886 | 0.166755968 |
| 1168 | PRC24 | LPC(16:0) | 4311848.355 | 212334.4313 | 14.87324898 | 0.17234447 |
| 1175 | PRC25 | LPC(16:0) | 4461875.732 | 304326.8877 | 14.85903633 | 0.138627349 |
| 1182 | PRC26 | LPC(16:0) | 3637942.759 | 265753.2516 | 14.8514005 | 0.108116551 |
| 1189 | PRC27 | LPC(16:0) | 2328111.08 | 193030.9268 | 14.85107446 | 0.105606497 |
| 1196 | PRC28 | LPC(16:0) | 2883794.343 | 173233.9356 | 14.84902479 | 0.149713614 |
| 1203 | PRC29 | LPC(16:0) | 4175544.704 | 311973.0068 | 14.84412912 | 0.16754409 |
| 1210 | PRC30 | LPC(16:0) | 2085356.988 | 132545.9962 | 14.87093296 | 0.136785631 |
| 1217 | PRC31 | LPC(16:0) | 2533656.886 | 182955.9104 | 14.86143435 | 0.135018159 |
| 1224 | PRC32 | LPC(16:0) | 2147481.008 | 203532.7107 | 14.87816731 | 0.079964476 |
| 1231 | PRC33 | LPC(16:0) | 1688069.389 | 132385.944 | 14.87093431 | 0.087455116 |
| 1238 | PRC34 | LPC(16:0) | 3508875.342 | 256074.3538 | 14.84681343 | 0.12453703 |
| 1245 | PRC35 | LPC(16:0) | 3460351.324 | 224720.0187 | 14.87192209 | 0.127671863 |
| 1252 | PRC36 | LPC(16:0) | 2322481.606 | 152573.2655 | 14.86652735 | 0.110287244 |

TABLE 10

| Sample Index | Name | Component Name | Area | Height | Retention Time | Width at 50% |
|---|---|---|---|---|---|---|
| 7 | Hu_Normal_Serum_1_4_10 uL | LPC(18:0) | 2936182.872 | 208441.1527 | 16.31676075 | 0.160490444 |
| 14 | HC + MeOH_1_4_10 uL | LPC(18:0) | 4007.49133 | 123.4591183 | 16.28250648 | 0.252392716 |
| 21 | HC + Serum_1_4_10 uL | LPC(18:0) | 3841235.397 | 254245.8419 | 16.30836611 | 0.169500168 |
| 28 | OC + MeOH_1_4_10 uL | LPC(18:0) | 2476.578874 | 77.62611697 | 16.25264212 | 0.223721352 |
| 35 | OC + Serum_1_4_10 uL | LPC(18:0) | 3748435.767 | 256101.2753 | 16.30504714 | 0.178407694 |
| 42 | DC + MeOH_1_4_10 uL | LPC(18:0) | 5881.687402 | 187.9887292 | 16.28186965 | 0.268407319 |
| 49 | DC + Serum_1_4_10 uL | LPC(18:0) | 937818.4708 | 68513.2568 | 16.30392033 | 0.157180027 |
| 56 | PC + Serum_1_4_10 uL | LPC(18:0) | 6577921.938 | 375216.0135 | 16.28671884 | 0.20494875 |
| 63 | PC + Serum_sup_10 uL | LPC(18:0) | 37572755.43 | 1953158.303 | 16.28896394 | 0.21047572 |
| 70 | 2PY_0100 | LPC(18:0) | 361.4366533 | 15.81778762 | 16.25021138 | 0.353961974 |
| 77 | Serum + 2PY_0100 | LPC(18:0) | 1376062.962 | 163045.072 | 16.31736588 | 0.116960656 |
| 84 | LPC16_0100 | LPC(18:0) | 121.1429078 | 9.220842985 | 16.10473401 | 0.233504089 |
| 91 | Serum + LPC16_0100 | LPC(18:0) | 404588.647 | 44038.34347 | 16.30449332 | 0.12840025 |
| 98 | LPC18_0100 | LPC(18:0) | 20696.91621 | 2634.455736 | 16.32747329 | 0.112048524 |
| 105 | Serum + LPC18_0100 | LPC(18:0) | 496147.6975 | 58925.5171 | 16.31952353 | 0.117057832 |
| 112 | 06-1(1_4) | LPC(18:0) | 1550883.604 | 126615.9799 | 16.29859372 | 0.159513686 |

TABLE 10-continued

| Index | Sample Name | Component Name | Area | Height | Retention Time | Width at 50% |
|---|---|---|---|---|---|---|
| 119 | 06-2(1_4) | LPC(18:0) | 995300.7162 | 79569.64794 | 16.30640882 | 0.163811789 |
| 126 | 07-1(1_4) | LPC(18:0) | 1366150.995 | 107592.8698 | 16.30288174 | 0.162287586 |
| 133 | 07-2(1_4) | LPC(18:0) | 734045.5768 | 55897.90281 | 16.30907533 | 0.161859123 |
| 140 | 08-1(1_4) | LPC(18:0) | 1625177.25 | 140236.3871 | 16.29156168 | 0.151313777 |
| 147 | 08-2(1_4) | LPC(18:0) | 1361734.396 | 119014.0639 | 16.30022114 | 0.148883137 |
| 154 | 09-1(1_4) | LPC(18:0) | 2088124.092 | 168702.0059 | 16.3013778 | 0.15048608 |
| 161 | 09-2(1_4) | LPC(18:0) | 2245216.642 | 186682.4178 | 16.28961089 | 0.163541505 |
| 168 | 10-1(1_4) | LPC(18:0) | 891551.3591 | 67660.32972 | 16.30761746 | 0.166465958 |
| 175 | 10-2(1_4) | LPC(18:0) | 469664.1458 | 32124.60098 | 16.30643915 | 0.190521144 |
| 182 | 11-1(1_4) | LPC(18:0) | 797375.7037 | 59092.92128 | 16.29918833 | 0.171026663 |
| 189 | 11-2(1_4) | LPC(18:0) | 1417387.693 | 99457.66938 | 16.2872118 | 0.178696225 |
| 196 | 12-1(1_4) | LPC(18:0) | 2881652.189 | 208081.2529 | 16.29419563 | 0.17412189 |
| 203 | 12-2(1_4) | LPC(18:0) | 2255206.831 | 165902.4104 | 16.29641967 | 0.166408641 |
| 210 | 13-1(1_4) | LPC(18:0) | 2315991.664 | 165362.9968 | 16.30620898 | 0.174874624 |
| 217 | 13-2(1_4) | LPC(18:0) | 2913704.523 | 195101.9217 | 16.29922243 | 0.19362441 |
| 224 | 14-1(1_4) | LPC(18:0) | 2907912.863 | 208754.2326 | 16.29818973 | 0.171597469 |
| 231 | 14-2(1_4) | LPC(18:0) | 1505206.485 | 106882.4143 | 16.29458884 | 0.175518885 |
| 238 | 15-1(1_4) | LPC(18:0) | 1739304.826 | 125536.2795 | 16.29913568 | 0.172084143 |
| 245 | 15-2(1_4) | LPC(18:0) | 2012187.053 | 147099.5908 | 16.2957218 | 0.1689936 |
| 252 | BDC01 | LPC(18:0) | 2885574.872 | 163918.3491 | 16.25666867 | 0.190604091 |
| 259 | BDC02 | LPC(18:0) | 3276754.3 | 220572.5701 | 16.26614478 | 0.167279737 |
| 266 | BDC03 | LPC(18:0) | 1906294.676 | 121017.7547 | 16.264212 | 0.176785019 |
| 273 | BDC04 | LPC(18:0) | 2068323.139 | 125189.7957 | 16.2604369 | 0.177059931 |
| 280 | BDC05 | LPC(18:0) | 1702874.726 | 138042.0345 | 16.28228981 | 0.158006973 |
| 287 | BDC06 | LPC(18:0) | 8522742.703 | 419615.7541 | 16.25160833 | 0.245288844 |
| 294 | BDC07 | LPC(18:0) | 5188327.619 | 269744.799 | 16.25356897 | 0.186292167 |
| 301 | BDC08 | LPC(18:0) | 3808250.534 | 182173.9774 | 16.24379845 | 0.267944151 |
| 308 | BDC09 | LPC(18:0) | 6038276.659 | 325471.4165 | 16.26020893 | 0.21356248 |
| 315 | BDC10 | LPC(18:0) | 3700016.031 | 181633.4444 | 16.22380872 | 0.213492459 |
| 322 | BDC11 | LPC(18:0) | 8489760.656 | 309621.0085 | 16.18551247 | 0.441949405 |
| 329 | BDC12 | LPC(18:0) | 4502527.841 | 204567.6512 | 16.27187111 | 0.282704024 |
| 336 | BDC13 | LPC(18:0) | 3949218.895 | 196576.1698 | 16.25482105 | 0.220821259 |
| 343 | BDC14 | LPC(18:0) | 5511552.105 | 220034.3906 | 16.24745205 | 0.278199508 |
| 350 | BDC15 | LPC(18:0) | 8083549.497 | 325616.181 | 16.25406304 | 0.341291736 |
| 357 | BDC16 | LPC(18:0) | 3645836.485 | 183809.653 | 16.26427748 | 0.193264933 |
| 364 | BDC17 | LPC(18:0) | 7635337.264 | 336148.7139 | 16.24748614 | 0.213057648 |
| 371 | BDC18 | LPC(18:0) | 6218068.66 | 262400.261 | 16.25359093 | 0.269549121 |
| 378 | BDC19 | LPC(18:0) | 3563098.429 | 185947.6635 | 16.26712176 | 0.1417967 |
| 385 | BDC20 | LPC(18:0) | 4765247.719 | 176855.9201 | 16.24043646 | 0.29901866 |
| 392 | BDC21 | LPC(18:0) | 2210643.482 | 108124.2885 | 16.25948825 | 0.191636951 |
| 399 | BDC22 | LPC(18:0) | 2586313.687 | 118834.6557 | 16.28046866 | 0.166675419 |
| 406 | BDC23 | LPC(18:0) | 2988912.208 | 114696.899 | 16.2754005 | 0.263556724 |
| 413 | BDC24 | LPC(18:0) | 3062695.943 | 175382.5974 | 16.24623333 | 0.1200922 |
| 420 | BDC25 | LPC(18:0) | 311493.7757 | 23169.5029 | 16.26594015 | 0.152008989 |
| 427 | BDC26 | LPC(18:0) | 4203998.152 | 174826.9932 | 16.24786256 | 0.194466457 |
| 434 | BDC27 | LPC(18:0) | 3855698.505 | 163158.7742 | 16.25174578 | 0.224425845 |
| 441 | BDC28 | LPC(18:0) | 2428231.32 | 88014.84651 | 16.25256365 | 0.212021047 |
| 448 | BDC29 | LPC(18:0) | 2130199.316 | 130134.7109 | 16.28685723 | 0.106873693 |
| 455 | BDC30 | LPC(18:0) | 1610002.769 | 81902.14239 | 16.27806242 | 0.180537183 |
| 462 | BDC31 | LPC(18:0) | 2152089.323 | 89395.54068 | 16.2567813 | 0.225255844 |
| 469 | BDC32 | LPC(18:0) | 2096392.126 | 83286.54516 | 16.27106946 | 0.335980983 |
| 476 | BDC33 | LPC(18:0) | 1496825.124 | 62649.43461 | 16.27134684 | 0.264749538 |
| 483 | BDC34 | LPC(18:0) | 1078305.723 | 50471.54162 | 16.26555795 | 0.243204168 |
| 490 | BDC35 | LPC(18:0) | 1995843.661 | 98905.28337 | 16.22760654 | 0.195543441 |
| 497 | BDC36 | LPC(18:0) | 428719.7898 | 27132.81087 | 16.27439583 | 0.177838051 |
| 504 | CRC01 | LPC(18:0) | 8796114.633 | 365891.7372 | 16.24330083 | 0.284140097 |
| 511 | CRC02 | LPC(18:0) | 16310797.03 | 585089.8894 | 16.19369965 | 0.428152603 |
| 518 | CRC03 | LPC(18:0) | 5349255.833 | 245018.7887 | 16.25162238 | 0.239170292 |
| 525 | CRC04 | LPC(18:0) | 6386115.908 | 297149.049 | 16.25131727 | 0.22918695 |
| 532 | CRC05 | LPC(18:0) | 10554671.63 | 443586.1275 | 16.2402129 | 0.315022754 |
| 539 | CRC06 | LPC(18:0) | 5251193.9 | 257307.5811 | 16.24203664 | 0.218355573 |
| 546 | CRC07 | LPC(18:0) | 10042558.23 | 419466.4279 | 16.23889463 | 0.295630268 |
| 553 | CRC08 | LPC(18:0) | 4328037.347 | 205899.554 | 16.25815003 | 0.230679293 |
| 560 | CRC09 | LPC(18:0) | 8406195.757 | 339409.3738 | 16.22168225 | 0.384716488 |
| 567 | CRC10 | LPC(18:0) | 3081207.513 | 179419.4021 | 16.2655512 | 0.190687277 |
| 574 | CRC11 | LPC(18:0) | 7917878.626 | 379896.3298 | 16.25563609 | 0.215728491 |
| 581 | CRC12 | LPC(18:0) | 1536456.144 | 102519.7648 | 16.27955371 | 0.173433582 |
| 588 | CRC13 | LPC(18:0) | 2864907.39 | 146481.407 | 16.28079945 | 0.243073745 |
| 595 | CRC14 | LPC(18:0) | 3268669.674 | 180337.4569 | 16.24828767 | 0.182919482 |
| 602 | CRC15 | LPC(18:0) | 5876361.594 | 232710.4689 | 16.25496576 | 0.280625252 |
| 609 | CRC16 | LPC(18:0) | 6375533.108 | 234502.6366 | 16.22740621 | 0.333435065 |
| 616 | CRC17 | LPC(18:0) | 4734622.488 | 183549.3556 | 16.25090123 | 0.296749978 |
| 623 | CRC18 | LPC(18:0) | 4806653.194 | 184789.3621 | 16.26149259 | 0.290696699 |
| 630 | CRC19 | LPC(18:0) | 3107904.287 | 158316.4058 | 16.23386764 | 0.165744911 |
| 637 | CRC20 | LPC(18:0) | 2441488.633 | 94276.97522 | 16.27736533 | 0.401278592 |
| 644 | CRC21 | LPC(18:0) | 2502518.594 | 95683.33393 | 16.27029051 | 0.305626288 |
| 651 | CRC22 | LPC(18:0) | 2481341.6 | 91982.86023 | 16.26767641 | 0.324825628 |

TABLE 10-continued

| Index | Sample Name | Component Name | Area | Height | Retention Time | Width at 50% |
|---|---|---|---|---|---|---|
| 658 | CRC23 | LPC(18:0) | 1998021.658 | 86185.39788 | 16.26195824 | 0.236499163 |
| 665 | CRC24 | LPC(18:0) | 3435164.895 | 132696.2374 | 16.26201776 | 0.251046724 |
| 672 | CRC25 | LPC(18:0) | 7376595.055 | 381046.0624 | 16.28320422 | 0.160765977 |
| 679 | CRC26 | LPC(18:0) | 2171479.865 | 91837.81295 | 16.27857928 | 0.243588039 |
| 686 | CRC27 | LPC(18:0) | 3115052.394 | 108814.9709 | 16.2547089 | 0.331088405 |
| 693 | CRC28 | LPC(18:0) | 2105757.992 | 81537.04253 | 16.2706833 | 0.208143256 |
| 700 | CRC29 | LPC(18:0) | 1160480.623 | 49605.23443 | 16.26682209 | 0.272692371 |
| 707 | CRC30 | LPC(18:0) | 1585599.581 | 59923.44018 | 16.24003349 | 0.325291508 |
| 714 | CRC31 | LPC(18:0) | 1907289.726 | 92761.38565 | 16.24105937 | 0.168314014 |
| 721 | CRC32 | LPC(18:0) | 1191220.22 | 52774.16267 | 16.26507865 | 0.207626897 |
| 728 | CRC33 | LPC(18:0) | 2106825.209 | 67356.00284 | 16.26532538 | 0.333540767 |
| 735 | CRC34 | LPC(18:0) | 1076816.396 | 45929.05225 | 16.26531721 | 0.251736246 |
| 742 | CRC35 | LPC(18:0) | 1391684.283 | 47948.46119 | 16.2495796 | 0.470901396 |
| 749 | CRC36 | LPC(18:0) | 4698550.59 | 192395.3125 | 16.24304868 | 0.200387605 |
| 756 | CTL01 | LPC(18:0) | 6230642.157 | 264915.4695 | 16.27221554 | 0.26064539 |
| 763 | CTL02 | LPC(18:0) | 5390117.32 | 228429.2929 | 16.24292472 | 0.265754547 |
| 770 | CTL03 | LPC(18:0) | 6643374.959 | 324973.1279 | 16.26623278 | 0.198704109 |
| 777 | CTL04 | LPC(18:0) | 14224425.24 | 688042.2603 | 16.24228335 | 0.221408021 |
| 784 | CTL05 | LPC(18:0) | 4984365.82 | 208506.9143 | 16.24912898 | 0.323232564 |
| 791 | CTL06 | LPC(18:0) | 5889800.726 | 270732.3373 | 16.26011156 | 0.245553004 |
| 798 | CTL07 | LPC(18:0) | 4092534.818 | 172815.9268 | 16.23767647 | 0.355293665 |
| 805 | CTL08 | LPC(18:0) | 8039957.68 | 357026.2173 | 16.22995187 | 0.26640064 |
| 812 | CTL09 | LPC(18:0) | 5311158.639 | 267018.0573 | 16.2482536 | 0.21707731 |
| 819 | CTL10 | LPC(18:0) | 8144432.001 | 280111.6689 | 16.18732556 | 0.457507919 |
| 826 | CTL11 | LPC(18:0) | 10402237.27 | 431358.438 | 16.23615208 | 0.286201396 |
| 833 | CTL12 | LPC(18:0) | 9281857.963 | 350778.4215 | 16.21331291 | 0.400113301 |
| 840 | CTL13 | LPC(18:0) | 5510455.082 | 263623.779 | 16.24501396 | 0.229663747 |
| 847 | CTL14 | LPC(18:0) | 7029280.867 | 306221.7668 | 16.25111379 | 0.252906989 |
| 854 | CTL15 | LPC(18:0) | 4937957.105 | 174488.3981 | 16.19642449 | 0.440014292 |
| 861 | CTL16 | LPC(18:0) | 6729691.512 | 260288.668 | 16.18375633 | 0.388328865 |
| 868 | CTL17 | LPC(18:0) | 5612555.671 | 216060.5575 | 16.18565236 | 0.403404167 |
| 875 | CTL18 | LPC(18:0) | 7804379.268 | 244992.8546 | 16.17858331 | 0.496182648 |
| 882 | CTL19 | LPC(18:0) | 6506495.772 | 275164.5254 | 16.25086174 | 0.204029061 |
| 889 | CTL20 | LPC(18:0) | 7973728.382 | 267483.7133 | 16.24308773 | 0.276939285 |
| 896 | CTL21 | LPC(18:0) | 4724663.818 | 205878.2802 | 16.24374829 | 0.212619157 |
| 903 | CTL22 | LPC(18:0) | 5717140.985 | 245316.0369 | 16.2476184 | 0.199324658 |
| 910 | CTL23 | LPC(18:0) | 10778081.32 | 436843.3333 | 16.22874858 | 0.19034292 |
| 917 | CTL24 | LPC(18:0) | 3580658.89 | 177483.9144 | 16.25357983 | 0.170868823 |
| 924 | CTL25 | LPC(18:0) | 3605823.032 | 133915.8104 | 16.24336881 | 0.289617818 |
| 931 | CTL26 | LPC(18:0) | 4880073.683 | 183638.3133 | 16.25688218 | 0.201385041 |
| 938 | CTL27 | LPC(18:0) | 3765870.54 | 133766.6746 | 16.25887081 | 0.418676318 |
| 945 | CTL28 | LPC(18:0) | 2677046.702 | 104442.3213 | 16.24310534 | 0.217912806 |
| 952 | CTL29 | LPC(18:0) | 3194196.909 | 125281.8687 | 16.24010966 | 0.216252438 |
| 959 | CTL30 | LPC(18:0) | 3478637.85 | 157319.9721 | 16.23665441 | 0.220981045 |
| 966 | CTL31 | LPC(18:0) | 3135023.72 | 140004.0126 | 16.24220148 | 0.236859983 |
| 973 | CTL32 | LPC(18:0) | 2137667.596 | 81917.67566 | 16.25232222 | 0.284084593 |
| 980 | CTL33 | LPC(18:0) | 2625808.581 | 156318.309 | 16.25175177 | 0.092496131 |
| 987 | CTL34 | LPC(18:0) | 2852616.669 | 151046.1222 | 16.22461749 | 0.147138023 |
| 994 | CTL35 | LPC(18:0) | 2378494.736 | 100097.6057 | 16.25760131 | 0.220076666 |
| 1001 | CTL36 | LPC(18:0) | 2022805.557 | 91435.19237 | 16.25102218 | 0.187796401 |
| 1008 | PRC01 | LPC(18:0) | 3051744.32 | 138042.4643 | 16.24874236 | 0.322400937 |
| 1015 | PRC02 | LPC(18:0) | 3227788.918 | 187641.4516 | 16.26703869 | 0.170192161 |
| 1022 | PRC03 | LPC(18:0) | 5708937.574 | 300376.3819 | 16.25211125 | 0.208999897 |
| 1029 | PRC04 | LPC(18:0) | 9166562.329 | 485048.6822 | 16.25521718 | 0.21673399 |
| 1036 | PRC05 | LPC(18:0) | 4297421.04 | 203545.8464 | 16.2667295 | 0.224157969 |
| 1043 | PRC06 | LPC(18:0) | 4943511.995 | 205551.7818 | 16.2295875 | 0.360536848 |
| 1050 | PRC07 | LPC(18:0) | 7820028.968 | 421139.7083 | 16.24790342 | 0.204629761 |
| 1057 | PRC08 | LPC(18:0) | 8056721.986 | 318871.7604 | 16.22161364 | 0.306657322 |
| 1064 | PRC09 | LPC(18:0) | 6227133.315 | 254928.4993 | 16.24714054 | 0.261552508 |
| 1071 | PRC10 | LPC(18:0) | 6681433.098 | 321527.2903 | 16.24273074 | 0.178394662 |
| 1078 | PRC11 | LPC(18:0) | 4336401.75 | 198002.5653 | 16.24353677 | 0.20219018 |
| 1085 | PRC12 | LPC(18:0) | 3172826.393 | 135958.048 | 16.27079521 | 0.224361515 |
| 1092 | PRC13 | LPC(18:0) | 4140148.817 | 177712.4432 | 16.2543074 | 0.218783989 |
| 1099 | PRC14 | LPC(18:0) | 4904099.14 | 231127.2057 | 16.24873847 | 0.188648367 |
| 1106 | PRC15 | LPC(18:0) | 3013266.286 | 161610.2973 | 16.26439009 | 0.18982392 |
| 1113 | PRC16 | LPC(18:0) | 8100768.324 | 280759.624 | 16.25630903 | 0.29130511 |
| 1120 | PRC17 | LPC(18:0) | 2016622.13 | 111907.1978 | 16.26291665 | 0.210621548 |
| 1127 | PRC18 | LPC(18:0) | 3611312.832 | 146976.3615 | 16.25572565 | 0.245934367 |
| 1134 | PRC19 | LPC(18:0) | 1438700.843 | 70602.35109 | 16.26919661 | 0.240034978 |
| 1141 | PRC20 | LPC(18:0) | 2092248.777 | 88849.85898 | 16.26070585 | 0.275247377 |
| 1148 | PRC21 | LPC(18:0) | 3893958.393 | 172504.5609 | 16.24593715 | 0.171401739 |
| 1155 | PRC22 | LPC(18:0) | 2810906.96 | 151413.2422 | 16.24565686 | 0.147993684 |
| 1162 | PRC23 | LPC(18:0) | 3357757.386 | 148934.1017 | 16.23435015 | 0.226467333 |
| 1169 | PRC24 | LPC(18:0) | 2478067.591 | 98430.52793 | 16.23661378 | 0.323857125 |
| 1176 | PRC25 | LPC(18:0) | 2975895.056 | 156782.0198 | 16.25059078 | 0.138163556 |
| 1183 | PRC26 | LPC(18:0) | 1960082.087 | 100523.725 | 16.2578487 | 0.141234315 |
| 1190 | PRC27 | LPC(18:0) | 1911800.611 | 71962.50682 | 16.25367291 | 0.346127858 |

TABLE 10-continued

| Sample Index | Sample Name | Component Name | Area | Height | Retention Time | Width at 50% |
|---|---|---|---|---|---|---|
| 1197 | PRC28 | LPC(18:0) | 1972730.988 | 126562.3627 | 16.24025106 | 0.142523455 |
| 1204 | PRC29 | LPC(18:0) | 2134949.247 | 109953.3202 | 16.26478625 | 0.158307205 |
| 1211 | PRC30 | LPC(18:0) | 751235.2703 | 38105.96798 | 16.25136351 | 0.21123295 |
| 1218 | PRC31 | LPC(18:0) | 1897678.444 | 80871.21202 | 16.240028 | 0.178950925 |
| 1225 | PRC32 | LPC(18:0) | 1327861.4 | 69089.84954 | 16.27482402 | 0.14781383 |
| 1232 | PRC33 | LPC(18:0) | 869361.2515 | 37411.4864 | 16.26440145 | 0.249068065 |
| 1239 | PRC34 | LPC(18:0) | 2234289.352 | 89113.68609 | 16.26135642 | 0.224220391 |
| 1246 | PRC35 | LPC(18:0) | 1740219.152 | 90152.06765 | 16.26547321 | 0.143685825 |
| 1253 | PRC36 | LPC(18:0) | 1607900.284 | 86851.834 | 16.23317969 | 0.150455101 |

In Tables 4 to 10, in Sample Name, CTL stands for a normal control, LC for lung cancer, BDC for bile duct cancer, CRC for colorectal cancer, and PRC for pancreatic cancer.

Example 2. Diagnosis of Breast Cancer, Gastric Cancer, Brain Tumors, Renal Cancer, Liver Cancer and Cervical Cancer Plasma Collection Plasmas were collected from a normal control, and breast cancer, gastric cancer, brain tumor, renal cancer, liver cancer and cervical cancer patients.

Preparation of Concentration Measurement 0.95 ml of water, 2 ml of methanol and 0.9 ml of dichloromethane were added to 50 µl of serum, well mixed with shaking, and maintained on ice for 30 minutes. 1 ml of water and 0.9 ml of dichloromethane were added again and well mixed, followed by centrifugation at room temperature for 10 minutes at 1,500 rpm. After centrifugation, the resulting supernatant was isolated and dried using nitrogen gas.

Measurement of Metabolite (Marker) Concentration

The dried metabolite extract was dissolved in 0.1% formic acid, and analyzed using liquid chromatography-mass spectrometry (LC-MS).

The LC instrument used herein was an Eksigent Ultra LC 110-XL system, and the MS instrument used herein was an AB Sciex Triple TOF 5600+ system. The MS instrument was equipped with a DuoSpray ion source.

First, an analyte was put into an analyzer through an Atlantis T3 Sentry Guard Cartridge (3 mm, 2.1 10 mm; Waters) connected to the Eksigent Ultra LC 110-XL system, and isolated in an Atlantis T3 column (3 mm, 2.1 100 mm; Waters).

As a solvent, a two-step linear gradient (solvent A, 0.1% FA in water; solvent B, 100% acetonitrile; with 1% solvent B for 2 min, 1 to 30% B for 6 min, 30 to 90% B for 8 min, 90% B for 4 min, 90 to 1% B for 1 min and 9 min in 1% B) was used.

The MS instrument performed tandem mass spectrometry (SIS/UIS) of the 10 most frequent parent ions (mass tolerance, 50 mDa collision energy, 35%), along with one full scan (50 to 1,200 m/z range).

The absolute quantification values of metabolites corresponding to dodecanoyl-carnitine (DC) and octanoyl-carnitine (OC) were obtained, and are shown in Table 11 below.

TABLE 11

| | Normal control | Breast cancer patient | Gastric cancer patient | Brain tumor patient | Renal cancer patient | Liver cancer patient | Cervical cancer patient |
|---|---|---|---|---|---|---|---|
| DC (ng/mL) | 26.75 | 13.71 | 8.47 | 2.76 | 0.21 | 17.90 | 2.44 |
| OC (ng/mL) | 46.65 | 20.08 | 23.55 | 6.19 | 1.22 | 26.84 | 6.88 |

Analysis Result

Table 11 and FIG. 4 show the absolute quantification values of DC and OC in sera from cancer patient groups and a normal control. The absolute quantification values of DC and OC in sera were obtained by mass spectrometry.

It can be seen that both DC and OC are present at relatively lower amounts in sera from the breast cancer, gastric cancer, brain tumors, renal cancer, liver cancer and cervical cancer patient groups compared to the normal control.

Therefore, it can be assumed that, as well as DC and OC, hexanoyl-carnitine (HC) and palmitoyl-carnitine (PC) belonging to homogeneous acyl-carnitines (ACs) be present at relatively lower amounts in sera from the breast cancer, gastric cancer, brain tumors, renal cancer, liver cancer, cervical cancer patient groups compared to the normal control.

That is, it can be confirmed that ACs including DC, HC, OC and PC are present at relatively lower amounts in sera from the breast cancer, gastric cancer, brain tumors, renal cancer, liver cancer, cervical cancer patient groups compared to the normal control.

The present invention may have various modifications and various examples, and thus specific examples are illustrated in the drawings and described in detail in the detailed description. However, it should be understood that the present invention is not limited to specific embodiments, and includes all modifications, equivalents or alternatives within the idea and technical scope of the present invention. In the description of the present invention, detailed description of the related art will be omitted if it is determined that the gist of the present invention can be obscured.

The terms "first" and "second" may be used to describe various components, but the components should not be limited by these terms. The terms are used only to distinguish one component from another component.

The terms used herein are used only to explain describe specific examples, not to limit the present invention. Singular expressions include plural referents unless the context clearly indicated indicates otherwise. The terms "include" and "have" used herein designate the presence of characteristics, numbers, steps, operations, components or members described in the specification or a combination thereof, and it should be understood that the possibility of the presence or addition of one or more other characteristics, numbers, steps, operations, components, members or a combination thereof is not excluded in advance.

The spatially relative terms, "below, beneath or lower," and "above or upper" may be used to easily describe the correlation between one element or component and another element or component as shown in the drawings. The spatially relative should be understood as terms including different orientations of a device during use or operation in addition to the directions shown in the drawings. For example, when an element shown in a drawing is turned over, a first element below (or beneath) second element may be placed above (or upper) the second element. Therefore, the exemplary term, below (or beneath) may include both downward and upward directions. The element may be oriented in different directions, and thus the spatially relative terms may be interpreted according to orientation.

The expression indicating a part, for example, "unit" or "part" used herein means that the corresponding component indicates a device having a specific function, software having a specific function, or the combination of the device and software having the corresponding function, but the present invention is not necessarily limited to the expressed function. This expression is merely provided to help overall understanding of the present invention, and various alterations and modifications be made from the description by those of ordinary skill in the art to which the present invention belongs.

A method according to one embodiment of the present invention may be implemented in the form of program instructions which are able to be executed by various computer means and recorded on a computer-readable medium. The computer-readable medium may include program instructions, data files and data structures alone or in combination. The program instructions recorded on the medium may be specifically designed and configured for the present invention, or may be known to those of ordinary skill in the computer software field. Examples of the computer-readable recording media include magnetic media such as hard disks, floppy disks and magnetic tapes, optical media such as CD-ROMs and DVDs, magneto-optical media such as a floppy disk, and hardware devices specially configured to store and execute program instructions such as a ROM, RAM and flash memory. Examples of program instructions include not only machine language code such as that made by a complier, but also high-level language code that can be executed by a computer using an interpreter. The hardware devices may be configured to operate as one or more software modules to execute the operations of the present invention, and vice versa.

The present invention has been described above for the purposes of steps of a method representing the performance of specific functions thereof and the relationships therebetween. The boundaries and order of the functional components and steps of the method were arbitrarily defined herein for convenience of description. Alternative boundaries and orders may be defined as long as the specific functions and relationships are properly performed. Therefore, any of the alternative boundaries and orders are in the scope and spirit of the claimed invention. In addition, the boundaries of these functional components have been arbitrarily defined for convenience of description. Alternative boundaries can be defined as long as certain important functions are properly performed. Likewise, blocks in a flowchart may be arbitrarily defined herein to represent any significant functionality. For extended use, the block boundaries and order of the flow chart may be defined, and still perform any important function. Thus, alternative definitions of functional components and both of the blocks and order of a flow chart are in the scope and spirit of the present invention claimed.

The present invention may also be described at least partially in terms of one or more embodiments. Embodiments of the present invention are used herein to show the present invention, an aspect, characteristic, concept, and/or example thereof. Physical embodiments of an apparatus for implementing the present invention, a material for preparation, a machine, and/or a process may include one or more aspects, characteristics, concepts and examples, which are described with reference to one or more embodiments described herein. Moreover, throughout the entire drawings, embodiments may incorporate functions, steps and modules named identically or similarly, which can use the same or different reference numerals, and likewise, the functions, steps and modules may be the same or similar functions, steps, modules or the like.

As described above, the present invention has been described with reference to specific details and limited examples and drawings, which however are merely provided to help in a more general understanding of the present invention, and the present invention is not limited to the examples. Various modifications and variations are possible from these descriptions by those of ordinary skill in the art to which the present invention belongs.

The above-described embodiments are merely examples for describing the present invention, and the present invention is not limited thereto. Since the present invention can be implemented various modifications by those of ordinary skill in the art, the technical scope of the present invention should be defined by the appended claims.

INDUSTRIAL APPLICABILITY

According to the present invention, solid cancers may be diagnosed with a short analysis time and high accuracy using an apparatus for diagnosing solid cancers including lung cancer, pancreatic cancer, bile duct cancer, colorectal cancer, breast cancer, gastric cancer, brain tumors, renal cancer, liver cancer and cervical cancer and a method of providing information for solid cancer diagnosis.

The invention claimed is:
1. An apparatus for diagnosing cancers, comprising:
a concentration measurement unit for measuring a dodecanoyl-L-carnitine (DC) concentration from a biological sample;
a pre-processing unit for pre-processing the measured concentration; and
a diagnosis unit for determining information for cancer diagnosis by linear discriminant analysis (LDA) using the pre-processed concentration,
wherein the apparatus also measures the concentrations of hexanoyl-L-carnitine (HC), octanoyl-L-carnitine (OC), palmitoyl-L-carnitine (PC), nudifloramide (2PY), lysophosphatidylcholine 16:0 (LPC16) and lysophosphatidylcholine 18:0 (LPC18).

2. The apparatus of claim 1, wherein the diagnosis unit operates based on concentrations of DC, HC, OC and PC, based on the concentrations of DC, HC, OC, PC, 2PY, LPC16 and LPC18, the concentrations are mass peak areas, and which comprises a determination unit for determining the information for cancer diagnosis by LDA with the mass peak area.

3. The apparatus of claim 1, wherein the diagnosis unit determines information for cancer diagnosis by an arithmetic operation using the pre-processed concentration.

4. The apparatus of claim 1, wherein the concentrations are obtained by liquid chromatography-mass spectrometry (LC-MS), and an instrument for mass spectrometry used herein-is any one of Triple TOF, Triple Quadrupole and MALDI TOF capable of measuring quantity.

5. The apparatus of claim 1, wherein the cancer is any one of solid cancers including lung cancer, pancreatic cancer, bile duct cancer, colorectal cancer, breast cancer, gastric cancer, brain tumors, renal cancer, liver cancer and cervical cancer.

* * * * *